United States Patent
Takahashi et al.

(10) Patent No.: US 6,792,043 B1
(45) Date of Patent: Sep. 14, 2004

(54) METHOD, APPARATUS AND PROGRAM PRODUCTS FOR RETRIEVING MOVING IMAGE

(75) Inventors: Katsunao Takahashi, Tokyo (JP); Nobuyoshi Terashima, Kanagawa (JP); Hideyoshi Tominaga, Tokyo (JP)

(73) Assignees: Telecommunications Advancement Organization of Japan, Tokyo (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/421,264

(22) Filed: Oct. 20, 1999

(30) Foreign Application Priority Data

Oct. 23, 1998 (JP) .......................................... 10-319890

(51) Int. Cl.[7] ................................................ H04N 1/66
(52) U.S. Cl. ................................................ 375/240.01
(58) Field of Search .......................... 375/240, 240.24; 348/172, 450, 451, 699, 700, 97; 386/69; H04B 1/66

(56) References Cited

U.S. PATENT DOCUMENTS

| | | | |
|---|---|---|---|
| 5,631,697 A | * 5/1997 | Nishimura et al. | ......... 348/172 |
| 5,805,746 A | 9/1998 | Miyatake et al. | |
| 6,208,693 B1 | * 3/2001 | Chen et al. | ............ 375/240.24 |
| 6,400,890 B1 | * 6/2002 | Ngagasaka et al. | ........... 386/69 |

FOREIGN PATENT DOCUMENTS

| | | |
|---|---|---|
| EP | 0 780 776 | 6/1997 |
| JP | 7-46517 | 2/1995 |
| JP | 07046517 A | 2/1995 |
| JP | 7-152779 | 6/1995 |
| JP | 07152779 A | 6/1995 |
| JP | 7-236153 | 9/1995 |
| JP | 07236153 A | 9/1995 |
| WO | WO 97/40454 | 10/1997 |

OTHER PUBLICATIONS

Zhang et al., "An Integrated System for Content–Based Video Retrieval and Browsing" Pattern Recognition, 1997. Vol. 30(4), pp. 643–658.

Yeo et al. "Retrieving and Visualizing Video" Communications of the ACM, Dec. 1997. Vol. 40(12) pp. 52.

* cited by examiner

*Primary Examiner*—Tung T. Vo
(74) *Attorney, Agent, or Firm*—Morrison & Foerster LLP

(57) ABSTRACT

An apparatus for retrieving moving image according to the present invention has an extracting unit for extracting the information of the feature quantity of the moving image from the fixed moving image data, an extracting unit for extracting the information of the unique identification of the moving image to identify the moving image according to the information of the feature quantity of the moving image, and a retrieving unit for retrieving and identifying the fixed moving image from the object moving image for retrieving by comparing the information of the unique identification of the moving image with the information of the unique identification of the moving image beforehand extracted from the object moving image. Therefore, the information of the unique identification of the moving image for retrieving the moving image depends on the content of the moving image can be extracted, consequently, the identical moving image can be retrieved and identified from the moving image by using the information of the unique identification of the moving image at high speed.

12 Claims, 70 Drawing Sheets

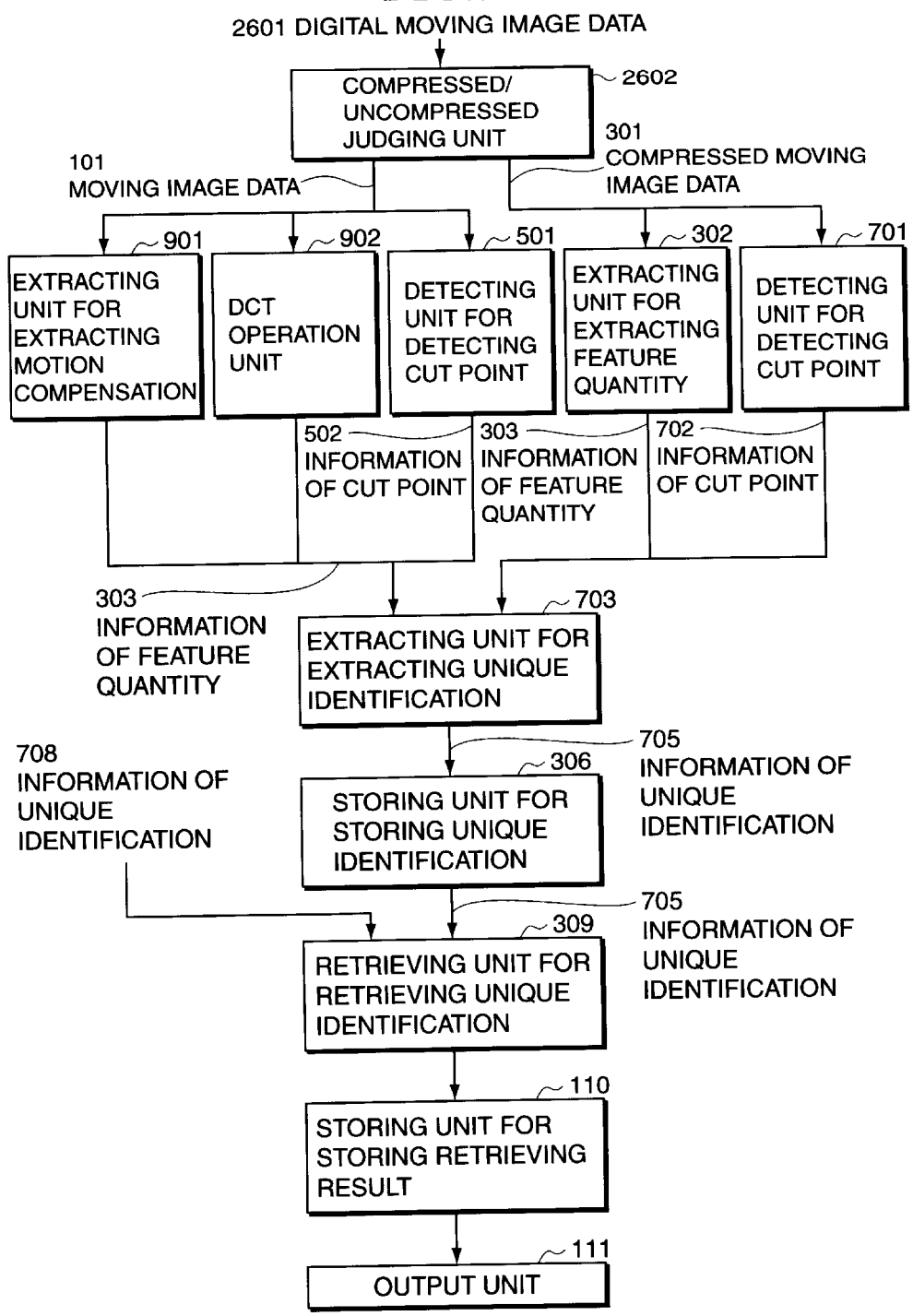

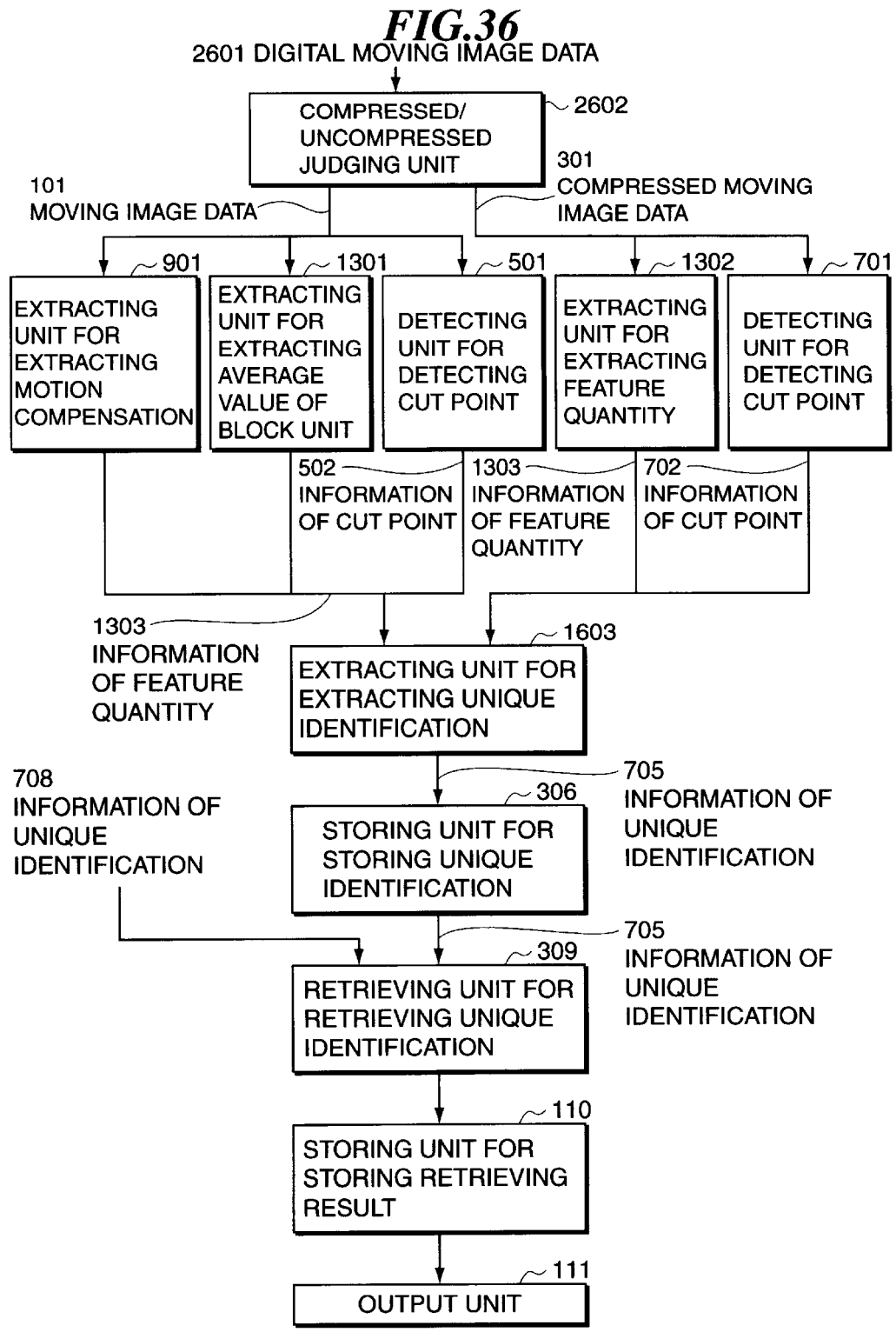

METHOD, APPARATUS AND PROGRAM PRODUCTS FOR RETRIEVING MOVING IMAGE

FIELD OF THE INVENTION

This invention relates to a method and an apparatus for retrieving moving image, which retrieve and identify fixed moving image from some moving image. And more particularly to, a method and an apparatus for retrieving moving image, in which the information of the unique identification of moving image which depends on the content of the moving image is extracted and registered, the registered moving image is retrieved and identified earlier than video rate from moving image such as moving image archives sent in broadcasting and the like.

BACKGROUND OF THE INVENTION

It is well known that there are various technologies on the international standard encoding system such as MPEG (Motion Picture Experts Group) as the information compressing technology for storing and transmitting moving image. It becomes possible that moving image is sufficiently handled even in the PC (Personal Computer), if the encoded moving image compressed by this international standard encoding system is used. The technology for monitoring the specific moving image by using the PC, for example monitoring a television commercial (identifying moving image), is ever studied and is developed.

As the conventional method for retrieving moving image, there are several methods for retrieving moving image, for example a method using the keyword retrieval, a method using the visual discrimination by the visual observation of the user, and a method using the number of continuous frames on the shot of moving image disclosed in Japanese Patent Publication No. JP7-46517.

According to the method using the keyword retrieval, moving image is given a classification code, a title, the content of the moving image, various relation information and so on as the information of keyword index, then the moving image is retrieved and identified by retrieving this keyword.

And, according to the method using the visual discrimination by the visual observation of the user, the user memorizes moving image that the user intends to retrieve and to identify then the moving image is retrieved and identified by the user inspecting visually all moving images.

And, according to the apparatus disclosed in Japanese Patent Publication No. JP7-46517, the number of continuous frames on each shot is searched between cut points by the means for detecting cut point, then moving image is retrieved by using the column of the number of continuous frames as index information.

And, in the real time discrimination method of image scene based on the time series coding of cutting (Nagasaka others, April, 1996 Inst. of Electronics, Inf. and Commun. Engineering paper magazine D-II Vol.J79-D-II No.4 pp. 531–537), the frame image of a cut point is extracted, and average color information is calculated by dividing the frame into 2×2 and encoding, and the encoded information is arranged in the time series and applied to the discrimination (retrieval) of image scene.

And, there is an apparatus for retrieving the cut point of moving image disclosed in Japanese Patent Publication No. JP7-236153 as an apparatus for retrieving moving image by detecting the cut point of the moving image. In this apparatus for retrieving the cut point of moving image disclosed in Japanese Patent Publication No. JP7-236153, the time variation of luminance difference between frames of the reduction image which is made from prepared reduction image and the mean value component data of the information of compressed and encoded moving image and the time variation of color difference histogram correlation value are used in order to obtain a cut point at high speed from moving image.

And, there is an apparatus for processing moving image disclosed in Japanese Patent Publication No. JP7-152779 as an apparatus for detecting the characteristic frame of moving image. In this apparatus for processing moving image disclosed in Japanese Patent Publication No. JP7-152779, the low frequency part of DCT (Discrete Cosine Transform) component is used in order to detect characteristic frame that is used for as index information (retrieving information), for example a cut point frame, a motionless frame, a character frame, a specific color frame, etc., from compressed moving image data including the DCT operation.

In the conventional methods and apparatuses for retrieving moving image, however, there are disadvantages as follows.

That is to say, in the conventional method for retrieving moving image by the keyword retrieval, there is a disadvantage that the considerable cost for registering keyword index information is taken, because to beforehand register the keyword index information is necessary. And more, there is a disadvantage with the case in which keyword index information differs even in the case of retrieving of identical moving image by the user, because the feeling of moving image of each user who retrieves moving image and the way of understanding are different. Moreover, there is a disadvantage that the time for choosing the keyword index of the desire is taken, even the system for inputting keyword index in which the user who retrieves moving image from keyword index information presented by a list type is made to choose the keyword index of the desire.

And, in the conventional method for retrieving moving image using the visual discrimination by the visual observation of the user, there is a disadvantage that hands are taken and the cost is high, because it is the method in which the user who retrieves moving image memorizes moving image that the user intends to retrieve and identify, and the user retrieves and identifies the moving image of the desire by observing all moving images.

And, in the method for retrieving moving image using the number of continuous frames on the shot which constitutes moving image disclosed in Japanese Patent Publication JP7-46517, there is a disadvantage that it might be misunderstood that moving image is identical with moving image for retrieving, if the number of continuous frames of the moving image agrees even if the content of the moving image differs from the moving image for retrieving, because the number of continuous frames is not index information reflecting the content of the meaning of moving image.

And, in the conventional real time discrimination method of image scene based on the time series coding of cutting, there is a disadvantage that the time for the extracting process of a cut point frame is taken and the cost also rises, because it is necessary to accurately extract a cut point frame in order to obtain a right collation result.

And, in the apparatus for retrieving the cut point of moving image disclosed in Japanese Patent Publication No. JP7-236153, there is a disadvantage that it is impossible to retrieve and identify moving image of the desire automatically, because the detection of a cut point in moving image is a purpose, and it is only to detect a cut point by regarding the time variation of luminance difference and the time variation of color difference histogram correlation value.

In the apparatus for processing moving image disclosed in Japanese Patent Publication No. JP7-152779, there is a disadvantage that time is taken due to the complicated process and the cost is high. Because the interim result which corresponds to the result of DCT operation by the process for reconstructing image data from compressed image data is made to be signals of the information of the feature quantity of moving image index, at least a kind of moving image index is detected from this signals of the information of the feature quantity of moving image index, and the sum of difference value with the moving image index of examined image is processed at the threshold, and then moving image is detected as index image by the result of this threshold processing.

SUMMARY OF THE INVENTION

Accordingly, it is an object of the invention to provide a method and an apparatus for retrieving moving image, in which the information of the unique identification of moving image used for retrieving in accordance with the content of the moving image can be automatically extracted even in the computer with small resources such as PC, and in which moving image can be retrieved and identified automatically by using the information of the unique identification of moving image.

According to the first feature of the invention, an apparatus for retrieving moving image to retrieve pre-determined moving image from object moving image, comprises first extracting means for extracting the information of the feature quantity of each frame from the pre-determined moving image, second extracting means for extracting the information of the unique identification of moving image to identify the moving image in accordance with the information of the feature quantity, extracted by the first extracting means, and retrieving means for retrieving the pre-determined moving image from the object moving image by comparing the information of the unique identification, extracted by the second extracting means, with the information of the unique identification prepared in accordance with the object moving image.

According to the second feature of the invention, a method for retrieving moving image to retrieve pre-determined moving image from object moving image, comprises the steps of (A) extracting the information of the feature quantity of each frame from the pre-determined moving image, (B) extracting the information of the unique identification of moving image to identify the moving image in accordance with the information of the feature quantity, extracted by said step (A), and (C) retrieving the pre-determined moving image from the object moving image by comparing the information of the unique identification, extracted by the step (B), with the information of the unique identification prepared in accordance with the object moving image.

According to the third feature of the invention, a program for retrieving moving image to retrieve pre-determined moving image from object moving image, which is executed by computer system, comprises the steps of (A) extracting the information of the feature quantity of each frame from the pre-determined moving image, (B) extracting the information of the unique identification of moving image to identify the moving image in accordance with the information of the feature quantity, extracted by the step (A), and (C) retrieving the pre-determined moving image from the object moving image by comparing the information of the unique identification, extracted by the step (B), with the information of the unique identification prepared in accordance with the object moving image.

BRIEF DESCRIPTION OF THE DRAWINGS

The invention will be described in more detail in conjunction with the appended drawings, wherein:

FIG. 32 is a block diagram showing the apparatus for retrieving moving image according to the present invention;

FIG. 36 is a block diagram showing the apparatus for retrieving moving image according to the present invention;

DETAILED DESCRIPTION OF THE PREFERRED EMBODIMENTS

Figure 1:
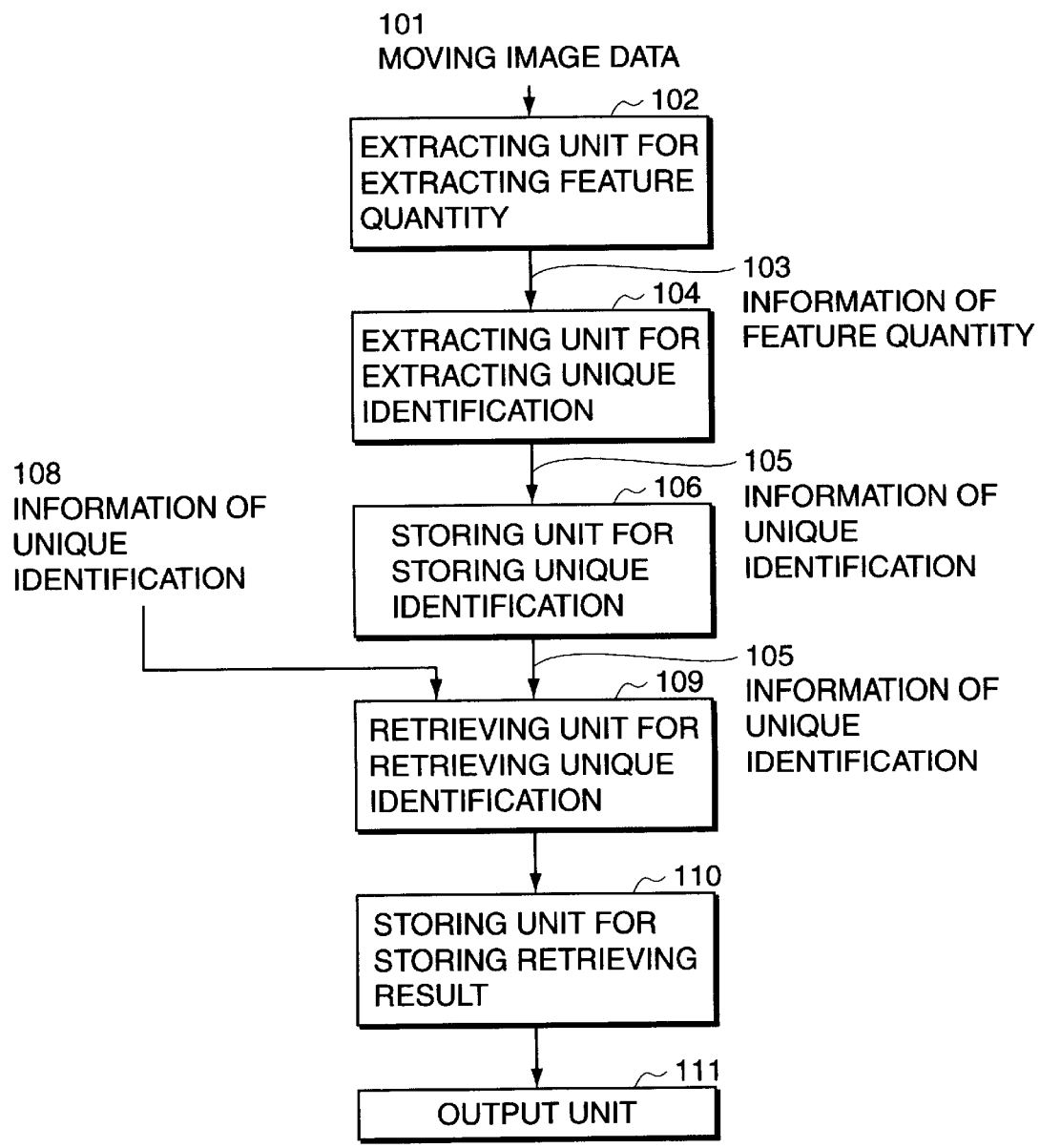
FIG. 1 is a block diagram showing the apparatus for retrieving moving image according to the present invention.

In the following, a method and an apparatus for retrieving moving image, and a recording medium according to the invention are explained in details referring to the drawings.

An apparatus and a method for retrieving moving image in the first preferred embodiment according to the invention will be explained in FIGS. 1, 2A and 2B.

FIG. 1 is a block diagram showing an apparatus for retrieving moving image according to the present invention. In FIG. 1, the apparatus for retrieving moving image comprises an extracting unit 102 for extracting information 103 of the feature quantity of moving image, which includes physical information of the feature quantity of moving image such as information of luminance and color difference (Y, Cb, Cr) of each frame and/or information of color (R, G, B) of each frame, from moving image data 101, an extracting unit 104 for arranging at least one physical information included in the information 103 (such as the information of the luminance and the color difference (Y, Cb, Cr) of each frame and/or the information of the color (R, G, B) of each frame) on the time axis and for extracting information 105 of the unique identification of moving image to identify the moving image from the arrangement of the physical information on the time axis, a storing unit 106 for storing the information 105 of the unique identification of the moving image extracted by the extracting unit 104, a retrieving unit 109 for retrieving identical information with the information 105 of the unique identification of the moving image stored in the storing unit 106 from information 108 of the unique identification of moving image beforehand extracted from other moving image data, a storing unit 110 for storing the retrieving result provided by the retrieving unit 109, and an output unit 111 for displaying and/or printing the retrieving result stored in the storing unit 110. On the apparatus for retrieving the moving image according to the present invention constituted like the above, an operation will be explained in the following.

Figure 2A:
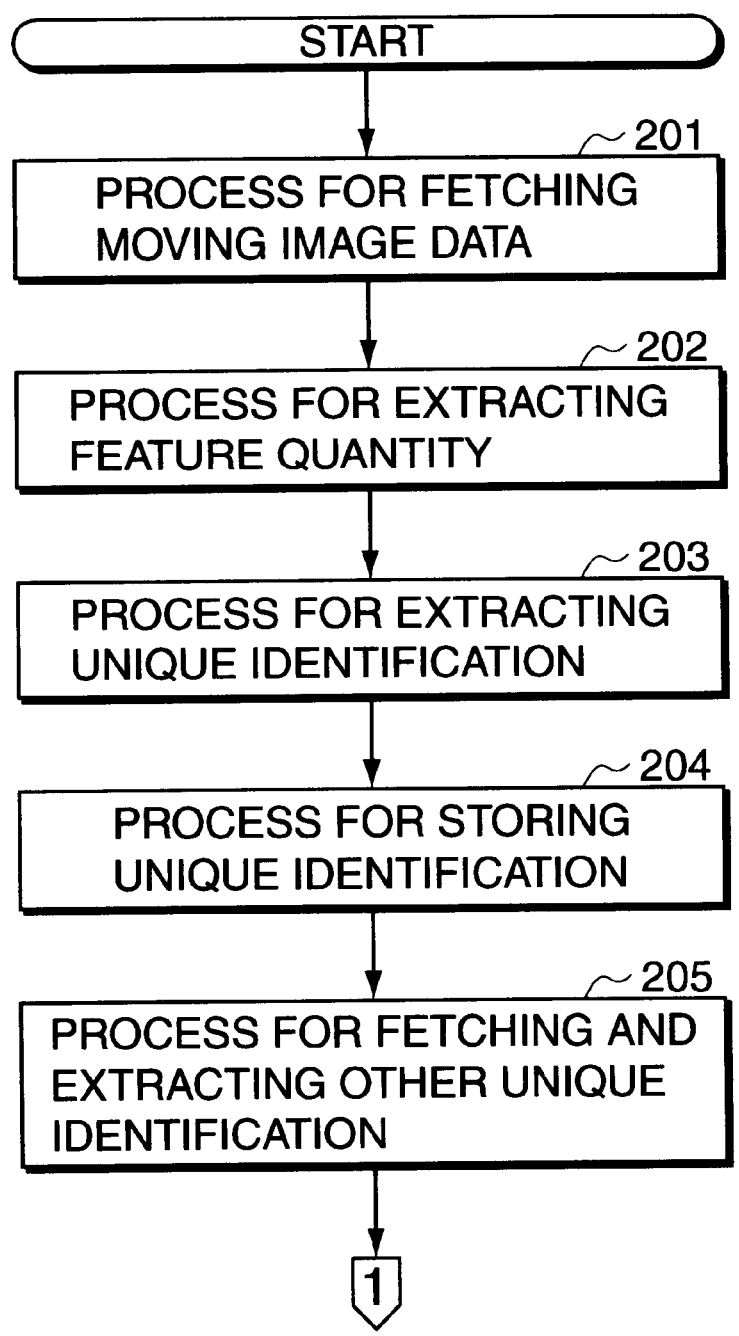
FIG. 2A is a flowchart of the process in the apparatus for retrieving moving image according to the present invention.
Figure 2B:
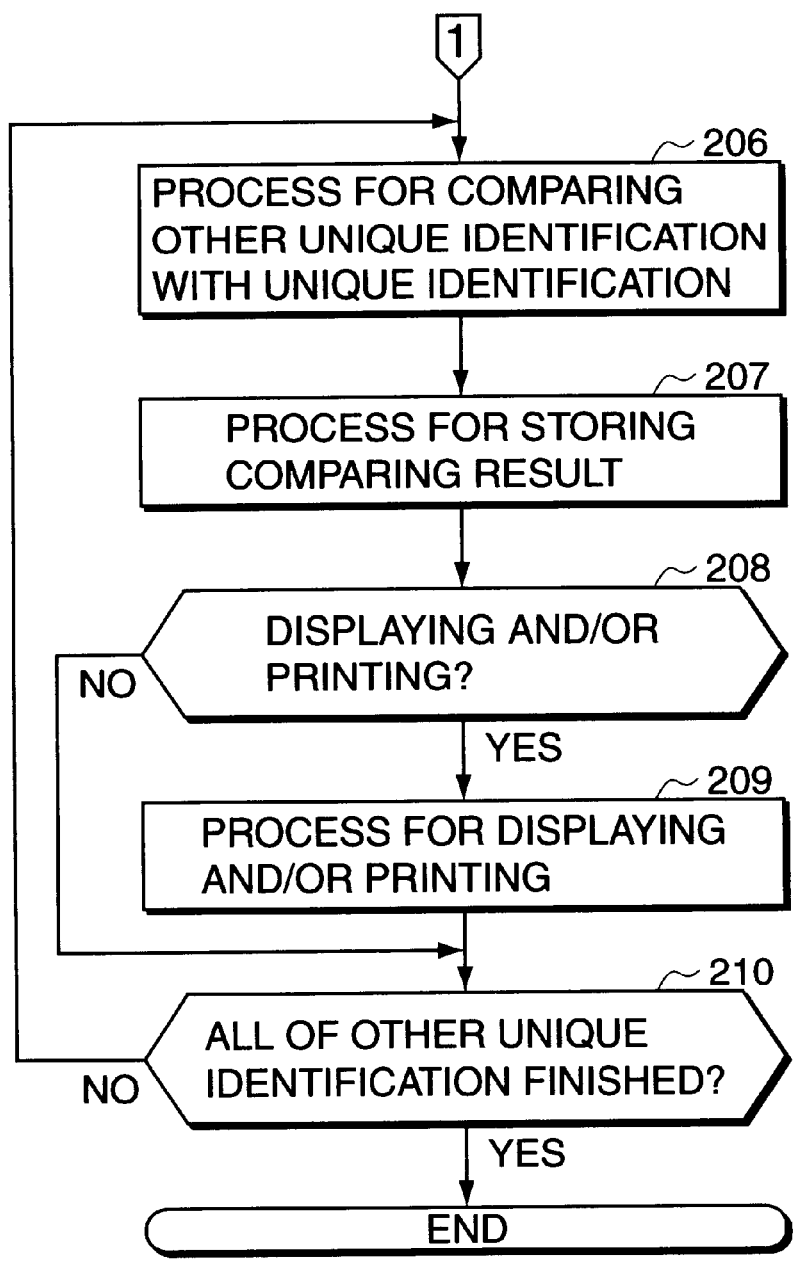
FIG. 2B is a flowchart of the process in the apparatus for retrieving moving image according to the present invention.

FIGS. 2A and 2B are flowcharts of the process in the apparatus for retrieving the moving image according to the present invention described in FIG. 1. In FIGS. 1, 2A and 2B, at first the extracting unit 102 for extracting the information of the feature quantity of the moving image fetches the moving image data 101 to be a retrieval key for identifying the moving image (in the step 201). Next, the extracting unit 102 extracts the information 103 of the feature quantity of the moving image, which includes the physical information of the feature quantity of the moving image such as the information of the luminance and the color difference (Y, Cb, Cr) of each frame and/or the information of the color (R, G, B) of each frame, from the moving image data 101 (in the step 202).

Next, the extracting unit 104 for extracting the information of the unique identification of the moving image arranges at least one value from values of the physical information of the feature quantity of the moving image (such as the information of the luminance and the color difference (Y, Cb, Cr) of each frame and/or the information of the color (R, G, B) of each frame) based on the information 103, mean value of the values, total value of the values and/or difference value of the values on the time axis. Then, the extracting unit 104 picks out all values arranged on the time axis, or some values from the values arranged on the time axis at uniform intervals or irregular intervals. And then, the extracting unit 104 extracts the picked out values as the information 105 of the unique identification of the moving image to be used for identifying the moving image (in the step 203).

The storing unit 106 for storing the information of the unique identification of the moving image stores the information 105 of the unique identification of the moving image extracted by the extracting unit 104 (in the step 204).

On the other hand, the information 108 of the unique identification of the moving image is extracted from other moving image data (the object moving image data for retrieving) (in the step 205). This extracting process can be executed by the processing equal to the foregoing steps 201 to 204.

Then, the retrieving unit 109 for retrieving the information of the unique identification of the moving image compares the information 105 of the unique identification of the moving image stored in the storing unit 106 with the information 108 of the unique identification of the moving image extracted from the other moving image data (in the step 206).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 206 to 209 is executed for all of the information 108 of the unique identification of the moving image extracted from the other moving image data (in the step 210).

The apparatus and the method for retrieving the moving image according to the invention are explained the above. The above mentioned extracting unit 104 arranges at least one value from values of the physical information of the feature quantity of the moving image (such as the information of the luminance and the color difference (Y, Cb, Cr) of each frame and the information of the color (R, G, B) of each frame) based on the information 103 of the feature quantity of the moving image, mean value of the values, total value of the values and/or difference value of the values on the time axis, and picks out all values arranged on the time axis, or some values from the values arranged on the time axis at uniform intervals or irregular intervals, and then extracts the picked out values as the information 105 of the unique identification of the moving image to be used for identifying the moving image. However, the above mentioned extracting unit 104 may arrange at least one value from values of a part or multiple parts of the physical information of the feature quantity of the moving image (such as the information of the luminance and the color difference (Y, Cb, Cr) of each frame and the information of the color (R, G, B) of each frame) based on the information 103 of the feature quantity of the moving image, mean value of the values, total value of the values and/or difference value of the values on the time axis, and pick out all values arranged on the time axis, or some values from the values arranged on the time axis at uniform intervals or irregular intervals, and then extract the picked out values as the information 105 of the unique identification of the moving image to be used for identifying the moving image. That is to say, values of information of feature quantity of moving image in each block unit may be calculated by dividing a frame into several blocks, and the information 105 of the unique identification of the moving image may be extracted by using all of the above mentioned values of the information of the feature quantity of the moving image. And also, the information 105 of the unique identification of the moving image may be extracted by using some values of the information of the feature quantity of the moving image. As such embodiment, for example, values of the information of the feature quantity of the moving image, which are calculated from blocks that are located on the part except for the part of time display and the part of around frame (the part with unevenness), are used.

And more, the extracting unit 104 may calculate values after executing the weighting on the physical information of the feature quantity of the moving image (such as the information of the luminance and the color difference (Y, Cb, Cr) of each frame and/or the information of the color (R, G, B) of each frame) based on the information 103, then may apply the values, mean value of the values, total value of the values and/or difference value of the values.

Moreover, the extracting unit 104 may calculate values of the physical information of the feature quantity of the moving image, mean value of the values, total value of the values and/or difference value of the values, and then may quantize the calculated values.

As mentioned above, according to the first embodiment of the invention, information of the unique identification of moving image for retrieving moving image depends on the content of the moving image can be extracted, consequently, identical moving image can be retrieved and identified from the moving image by using the information of the unique identification of the moving image at high speed.

An apparatus and a method for retrieving moving image in the second preferred embodiment according to the invention will be explained in FIGS. 3, 4A and 4B.

Figure 3:
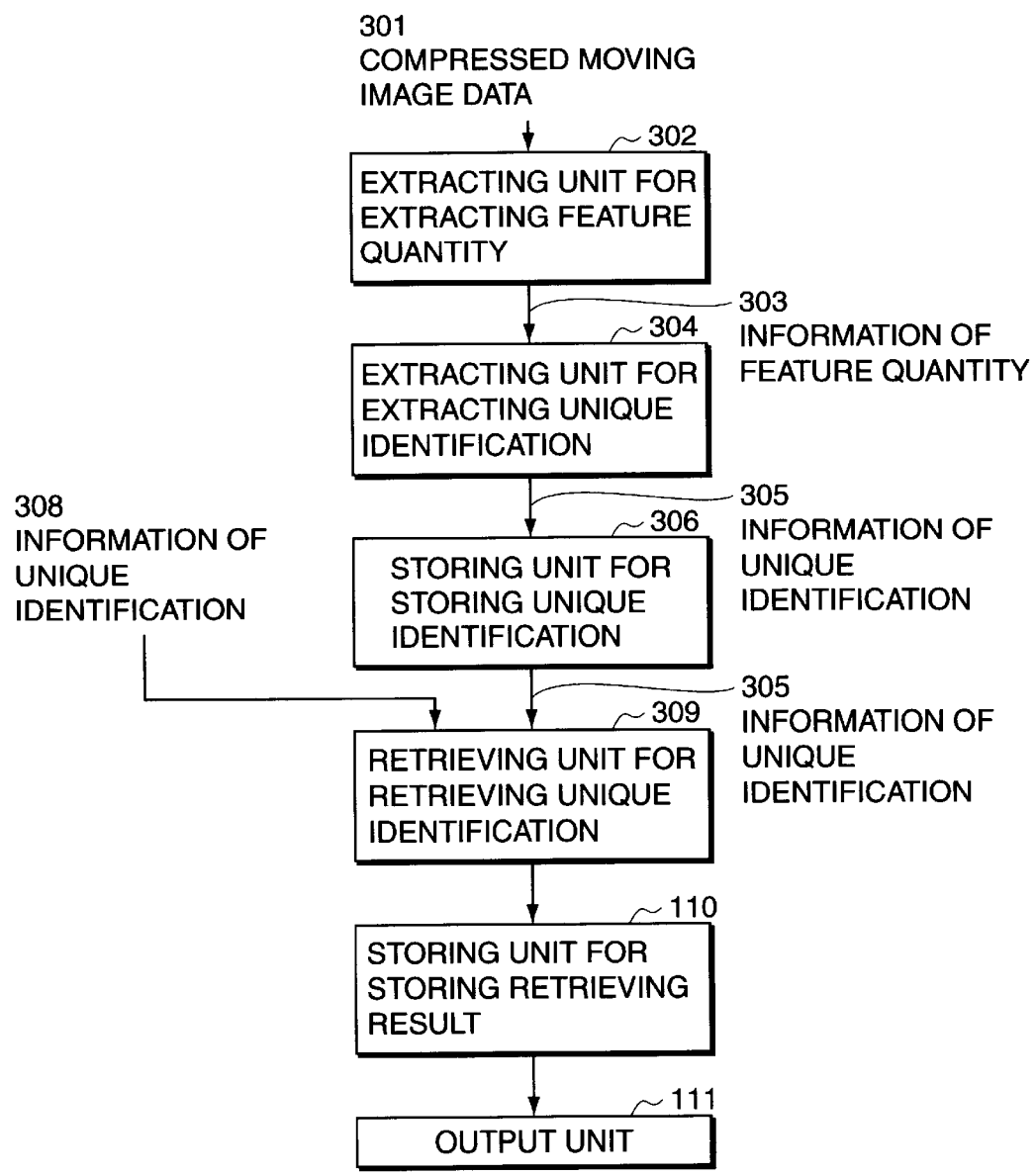
FIG. 3 is a block diagram showing the apparatus for retrieving moving image according to the present invention.

FIG. 3 is a block diagram showing an apparatus for retrieving moving image according to the present invention. Still, an identical code is appended to the thing having the identical composition in FIG. 3 with FIG. 1. In FIG. 3, the apparatus for retrieving moving image comprises an extracting unit 302 for extracting information 303 of the feature quantity of compressed moving image, which includes DCT (Discrete Cosine Transform) coefficients of each frame and information of motion compensation of each frame, from compressed moving image data 301 provided by the standard compression encoding process for moving image such as MPEG, an extracting unit 304 for arranging at least one information of feature quantity from the DCT coefficients of each frame and the information of the motion compensation of each frame, which are included in the information 303, on the time axis and for extracting information 305 of the unique identification of compressed moving image to identify the compressed moving image from the arrangement of the information of the feature quantity on the time axis, a storing unit 306 for storing the information 305 of the unique identification of the compressed moving image extracted by the extracting unit 304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 4A:
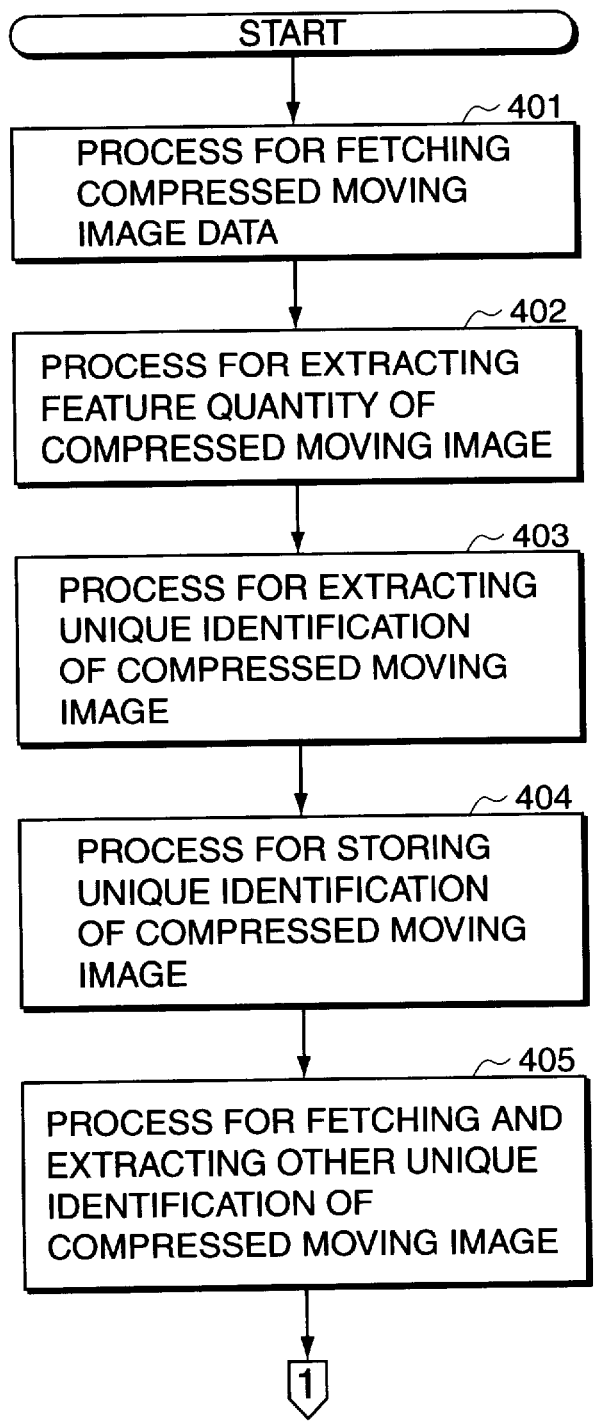
FIG. 4A is a flowchart of the process in the apparatus for retrieving moving image according to the present invention.
Figure 4B:
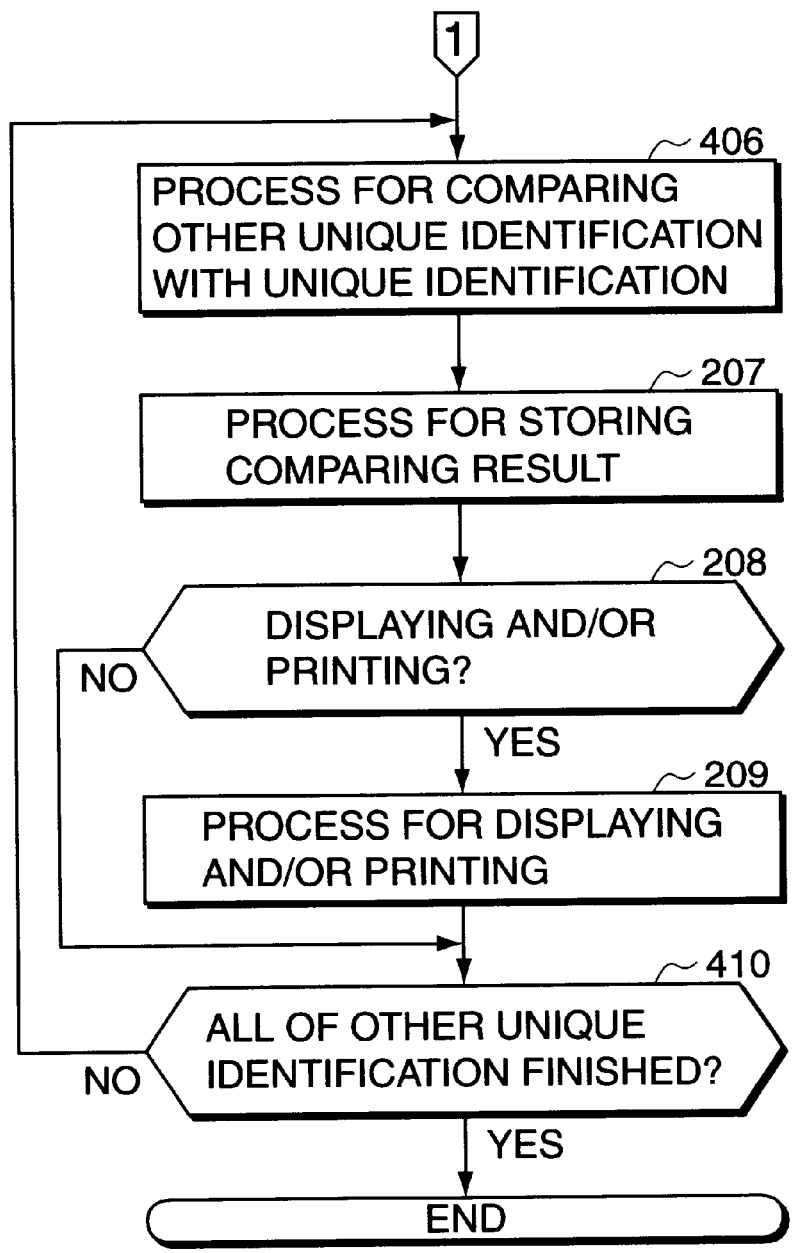
FIG. 4B is a flowchart of the process in the apparatus for retrieving moving image according to the present invention.

FIGS. 4A and 4B are flowcharts of the process in the apparatus for retrieving the moving image according to the present invention described in FIG. 3. Still, an identical step number is appended to the step having the identical process in FIGS. 4A and 4B with FIGS. 2A and 2B. In FIGS. 3, 4A and 4B, at first the extracting unit 302 for extracting the information of the feature quantity of the compressed moving image fetches the compressed moving image data 301 to be a retrieval key for identifying the compressed moving image (in the step 401). Next, the extracting unit 302 extracts the information 303 of the feature quantity of the compressed moving image, which includes the DCT coefficients of each frame and the information of the motion compensation of each frame, from the compressed moving image data 301 (in the step 402).

Next, the extracting unit 304 for extracting the information of the unique identification of the compressed moving image calculates values of physical information of the feature quantity of the compressed moving image from the DCT coefficients of each frame, which is included in the information 303, mean value of the values, total value of the values and/or difference value of the values. On the other hand, the extracting unit 304 calculates values such as a motion vector, a mean motion vector between frames before and behind, a total motion vector, a difference vector and/or a motion vector on a whole frame from the information of the motion compensation. And the extracting unit 304 arranges at least one value from the above mentioned values on the time axis and then picks out all values arranged on the time axis, or some values from the values arranged on the time axis at uniform intervals or irregular intervals. And then, the extracting unit 304 extracts the picked out values as the information 305 of the unique identification of the compressed moving image to be used for identifying the compressed moving image (in the step 403).

The storing unit 306 for storing the information of the unique identification of the compressed moving image stores the information 305 of the unique identification of the compressed moving image extracted by the extracting unit 304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 401 to 404.

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

The apparatus and the method for retrieving the moving image according to the invention are explained the above. The above mentioned extracting unit 304 calculates values of the physical information of the feature quantity of the compressed moving image from the DCT coefficients of each frame, which is included in the information 303, mean value of the values, total value of the values and/or difference value of the values, and values such as a motion vector, a mean motion vector between frames before and behind, a total motion vector, a difference vector and/or a motion vector on the whole frame from the information of the motion compensation. And the above mentioned extracting unit 304 arranges at least one value from the above mentioned values and then picks out all values arranged on the time axis, or some values from the values arranged on the time axis at uniform intervals or irregular intervals. And then, the above mentioned extracting unit 304 extracts the picked out values as the information 305 of the unique identification of the compressed moving image to be used for identifying the compressed moving image. However, the above mentioned extracting unit 304 may calculate values of a part or multiple parts of the physical information of the feature quantity of the compressed moving image from the DCT coefficients of each frame, which is included in the information 303, mean value of the values, total value of the values and/or difference value of the values, and values such as a motion vector, a mean motion vector between frames before and behind, a total motion vector, a difference vector and/or a motion vector on the whole frame from a part or multiple parts of the information of the motion compensation. That is to say, values of information of feature quantity of moving image in each block unit may be calculated by dividing a frame into several blocks, and the information 305 of the unique identification of the moving image may be extracted by using all of the above mentioned values of the information of the feature quantity of the moving image. And also, the information 305 of the unique identification of the moving image may be extracted by using some values of the information of the feature quantity of the moving image. As such embodiment, for example, values of the information of the feature quantity of the moving image, which are calculated from blocks that are located on the part except for the part of time display and the part of around frame (the part with unevenness), are used.

And more, the extracting unit 304 may execute the weighting on the physical information of the feature quantity of the compressed moving image from the DCT coefficients of each frame, which is included in the information 303, then may calculate values from the weighted information of the feature quantity of the compressed moving image, mean value of the values, total value of the values and/or difference value of the values. On the other hand, the extracting unit 304 may execute the weighting on the information of the motion compensation and may calculate a motion vector, a mean motion vector between frames before and behind, a total motion vector, a difference vector and/or a motion vector on a whole frame from the weighted information of the motion compensation.

Moreover, in the extracting unit 304, values provided by quantizing the above mentioned values of the physical information of the feature quantity of the compressed moving image and the like, and values provided by quantizing the above mentioned motion vectors, and the like may be applied.

As mentioned above, according to the second embodiment of the invention, information of the unique identification of moving image for retrieving moving image depends on the content of the compressed moving image provided by the standard compression encoding process for moving image such as MPEG can be extracted, consequently, identical moving image can be retrieved and identified from the moving image by using the information of the unique identification of the moving image at high speed.

An apparatus and a method for retrieving moving image in the third preferred embodiment according to the invention will be explained in FIGS. 5, 6A and 6B.

Figure 5:
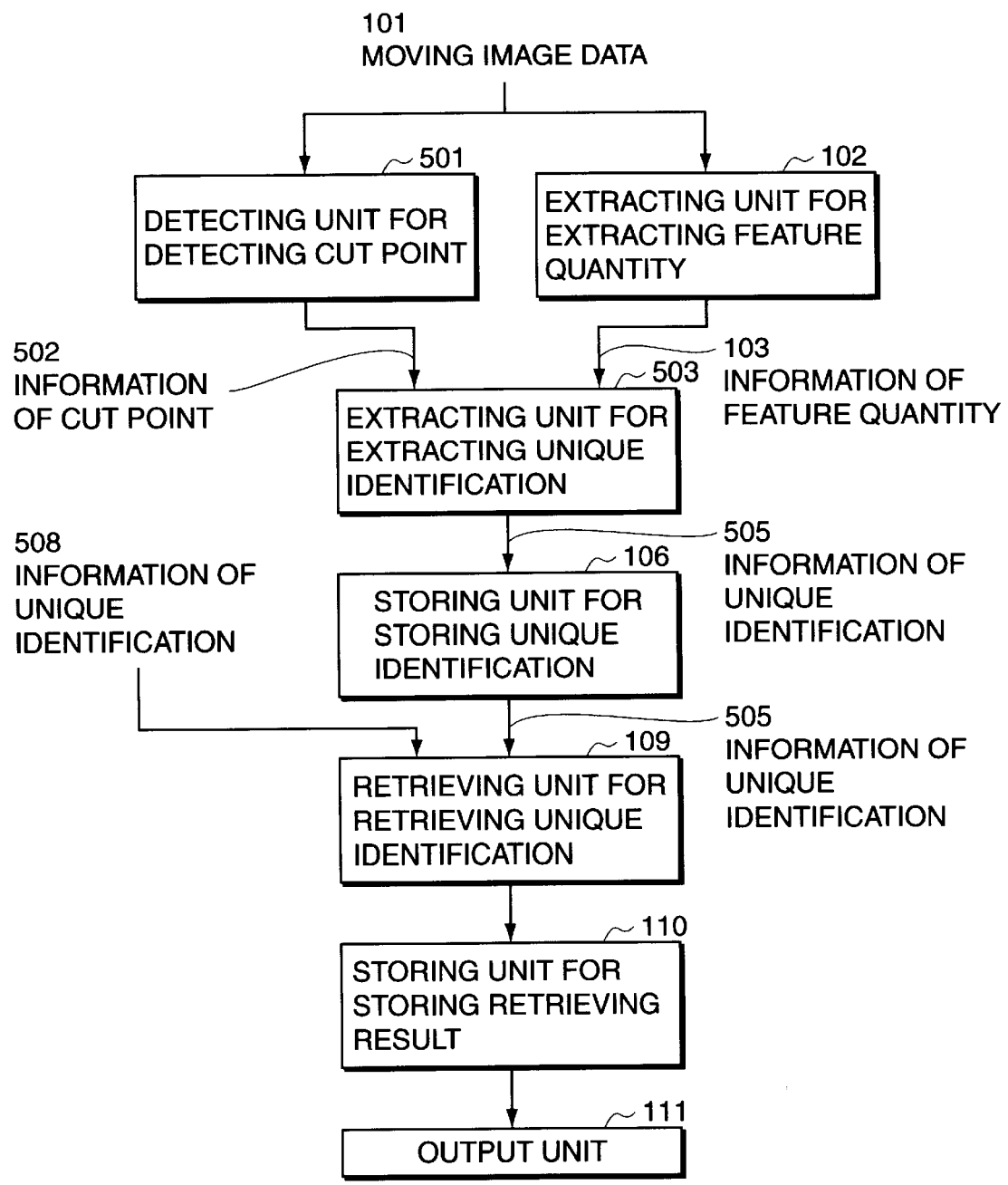
FIG. 5 is a block diagram showing the apparatus for retrieving moving image according to the present invention.

FIG. 5 is a block diagram showing an apparatus for retrieving moving image according to the present invention. Still, an identical code is appended to the thing having the identical composition in FIG. 5 with FIG. 1. In FIG. 5, the apparatus for retrieving moving image comprises an extracting unit 102 for extracting information 103 of the feature quantity of moving image, which includes physical information of the feature quantity of moving image such as information of luminance and color difference (Y, Cb, Cr) of each frame and/or information of color (R, G, B) of each frame, from moving image data 101, a detecting unit 501 for detecting a cut point of the moving image data 101 as information 502 of a cut point, an extracting unit 503 for arranging at least one physical information included in the information 103 (such as the information of the luminance and the color difference (Y, Cb, Cr) of each frame and/or the information of the color (R, G, B) of each frame) on the time axis and for extracting information 505 of the unique identification of moving image to identify the moving image in each shot unit of the moving image data 101 divided by using the information 502 of the cut point from the arrangement of the physical information on the time axis, a storing unit 106 for storing the information 505 of the unique identification of the moving image extracted by the extracting unit 503, a retrieving unit 109 for retrieving identical information with the information 505 of the unique identification of the moving image stored in the storing unit 106 from information 508 of the unique identification of moving image beforehand extracted from other moving image data, a storing unit 110 for storing the retrieving result provided by the retrieving unit 109, and an output unit 111 for displaying and/or printing the retrieving result stored in the storing unit 110. On the apparatus for retrieving the moving image according to the present invention constituted like the above, an operation will be explained in the following.

Figure 6A:
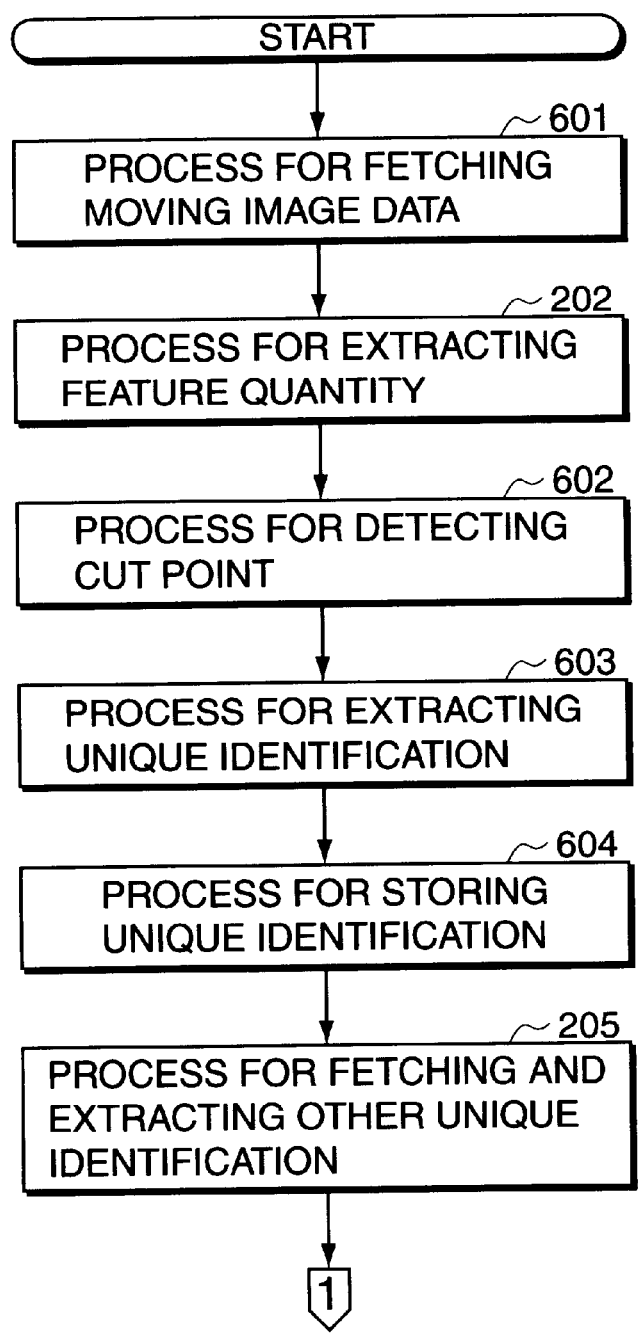
FIG. 6A is a flowchart of the process in the apparatus for retrieving moving image according to the present invention.
Figure 6B:
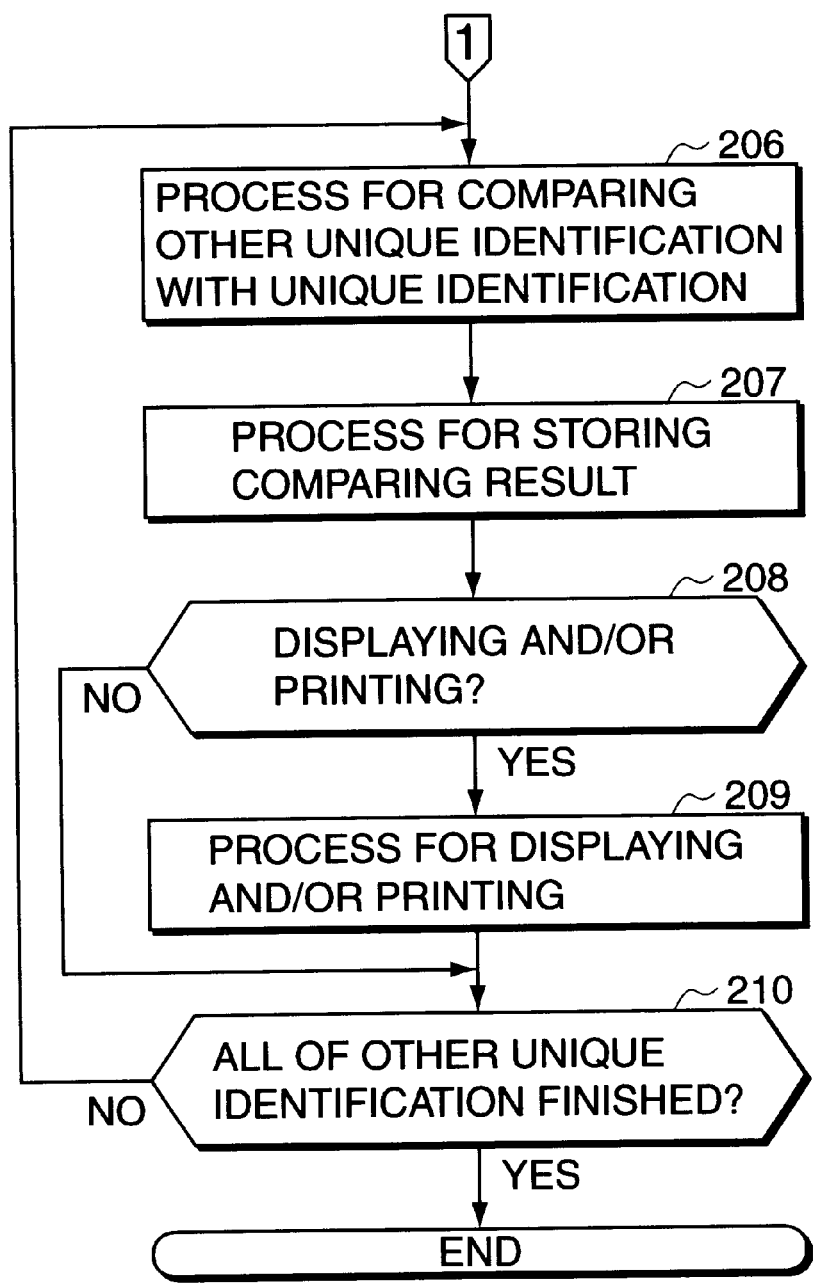
FIG. 6B is a flowchart of the process in the apparatus for retrieving moving image according to the present invention.

FIGS. 6A and 6B are flowcharts of the process in the apparatus for retrieving the moving image according to the present invention described in FIG. 5. Still, an identical step number is appended to the step having the identical process in FIGS. 6A and 6B with FIGS. 2A and 2B. In FIGS. 5, 6A and 6B, at first the extracting unit 102 for extracting the information of the feature quantity of the moving image and the detecting unit 501 for detecting the cut point fetch the moving image data 101 to be a retrieval key for identifying the moving image (in the step 601).

Next, the extracting unit 102 extracts the information 103 of the feature quantity of the moving image, which includes the physical information of the feature quantity of the moving image such as the information of the luminance and the color difference (Y, Cb, Cr) of each frame and/or the information of the color (R, G, B) of each frame, from the moving image data 101 (in the step 202).

And, the detecting unit 501 detects the cut point of the moving image data 101 as the information 502 of the cut point (in the step 602). This cut point of the moving image data 101 shows a point where the scene of the moving image data 101 changes or a point where the camera for photographing the moving image data 101 switches.

Next, the extracting unit 503 for extracting the information of the unique identification of the moving image arranges at least one value from values of the physical information of the feature quantity of the moving image (such as the information of the luminance and the color difference (Y, Cb, Cr) of each frame and/or the information of the color (R, G, B) of each frame) based on the information 103, mean value of the values, total value of the values and/or difference value of the values on the time axis. Then, the extracting unit 503 picks out all values arranged on the time axis, or some values from the values arranged on the time axis at uniform intervals or irregular intervals. And then, the extracting unit 503 extracts the picked out values in each shot unit of the moving image data 101 divided by the information 502 of the cut point as the information 505 of the unique identification of the moving image to be used for identifying the moving image (in the step 603).

The storing unit 106 for storing the information of the unique identification of the moving image stores the information 505 of the unique identification of the moving image extracted by the extracting unit 503 (in the step 604).

On the other hand, the information 508 of the unique identification of the moving image is extracted from other moving image data (the object moving image data for retrieving) (in the step 205). This extracting process can be executed by the processing equal to the foregoing steps 601 to 604.

Then, the retrieving unit 109 for retrieving the information of the unique identification of the moving image compares the information 505 of the unique identification of the moving image stored in the storing unit 106 with the information 508 of the unique identification of the moving image extracted from the other moving image data (in the step 206).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 206 to 209 is executed for all of the information 508 of the unique identification of the moving image extracted from the other moving image data (in the step 210).

The apparatus and the method for retrieving the moving image according to the invention are explained the above. The above mentioned extracting unit 503 for extracting the information of the unique identification of the moving image arranges at least one value from values of the physical information of the feature quantity of the moving image (such as the information of the luminance and the color difference (Y, Cb, Cr) of each frame and/or the information of the color (R, G, B) of each frame) based on the information 103 of the feature quantity of the moving image, mean value of the values, total value of the values and/or difference value of the values on the time axis. However, the extracting unit 503 may arranges at least one value from values of a part or multiple parts of the physical information of the feature quantity of the moving image (such as the information of the luminance and the color difference (Y, Cb, Cr) of each frame and/or the information of the color (R, G, B) of each frame) based on the information 103 of the feature quantity of the moving image, mean value of the values, total value of the values and/or difference value of the values on the time axis. That is to say, values of information of feature quantity of moving image in each block unit may be calculated by dividing a frame into several blocks, and the information 505 of the unique identification of the moving image may be extracted by using all of the above mentioned values of the information of the feature quantity of the moving image. And also, the information 505 of the unique identification of the moving image may be extracted by using some values of the information of the feature quantity of the moving image. As such embodiment, for example, values of the information of the feature quantity of the moving image, which are calculated from blocks that are located on the part except for the part of time display and the part of around frame (the part with unevenness), are used.

And more, the extracting unit 503 may calculate values after executing the weighting on the physical information of the feature quantity of the moving image (such as the information of the luminance and the color difference (Y, Cb, Cr) of each frame and/or the information of the color (R, G, B) of each frame) based on the information 103 of the feature quantity of the moving image, then may apply the values, mean value of the values, total value of the values and/or difference value of the values.

Moreover, the extracting unit 503 may calculate values of the physical information of the feature quantity of the moving image, mean value of the values, total value of the values and/or difference value of the values, and then may quantize the calculated values.

As mentioned above, according to the third embodiment of the invention, the information 505 of the unique identification of the moving image for retrieving the moving image depends on the content of the moving image can be extracted by the less information quantity with utilizing the time concept of a shot according to the information 502 of the cut point. And, identical moving image can be retrieved and identified from the moving image by using the information 505 of the unique identification of the moving image at the higher speed.

An apparatus and a method for retrieving moving image in the fourth preferred embodiment according to the invention will be explained in FIGS. 7, 8A and 8B.

Figure 7:
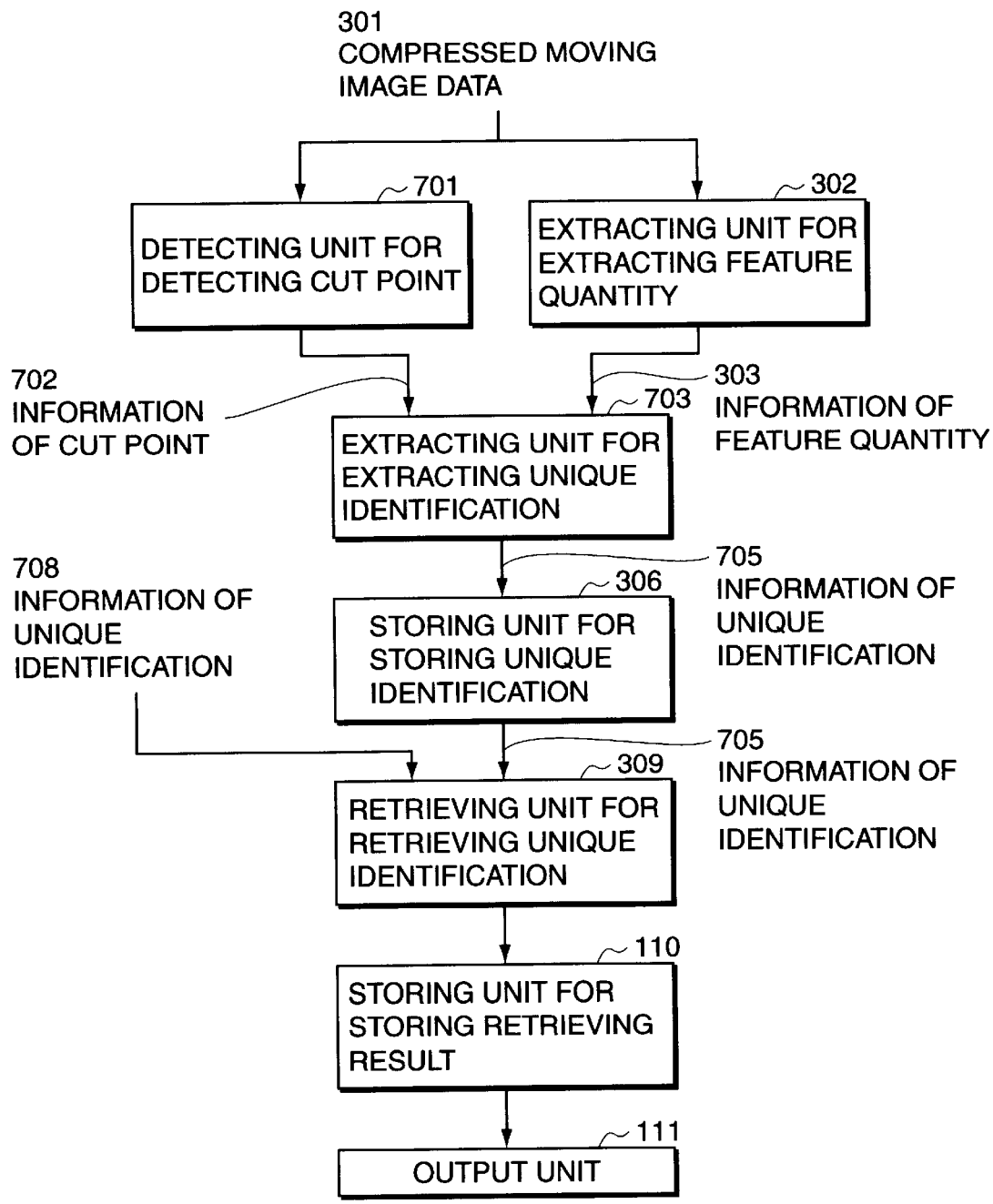
FIG. 7 is a block diagram showing the apparatus for retrieving moving image according to the present invention.

FIG. 7 is a block diagram showing an apparatus for retrieving moving image according to the present invention.

Still, an identical code is appended to the thing having the identical composition in FIG. 7 with FIG. 3. In FIG. 7, the apparatus for retrieving moving image comprises an extracting unit 302 for extracting information 303 of the feature quantity of compressed moving image, which includes DCT (Discrete Cosine Transform) coefficients of each frame and information of motion compensation of each frame, from compressed moving image data 301 provided by the standard compression encoding process for moving image such as MPEG, a detecting unit 701 for detecting a cut point of the compressed moving image data 301 as information 702 of a cut point, an extracting unit 703 for arranging at least one information of feature quantity from the DCT coefficients of each frame and the information of the motion compensation of each frame, which are included in the information 303, on the time axis and for extracting information 705 of the unique identification of compressed moving image to identify the compressed moving image from the arrangement of the information of the feature quantity on the time axis in each shot unit of the compressed moving image data 301 divided by using the information 702 of the cut point, a storing unit 306 for storing the information 705 of the unique identification of the compressed moving image extracted by the extracting unit 703, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 8A:
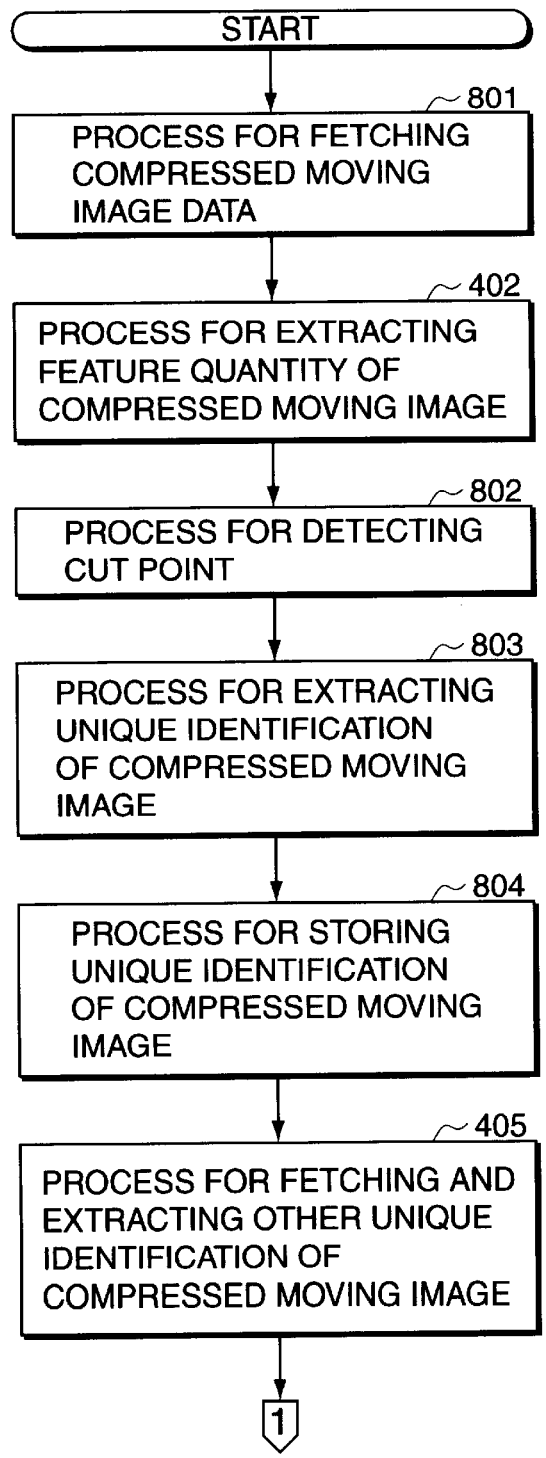
FIG. 8A is a flowchart of the process in the apparatus for retrieving moving image according to the present invention.
Figure 8B:
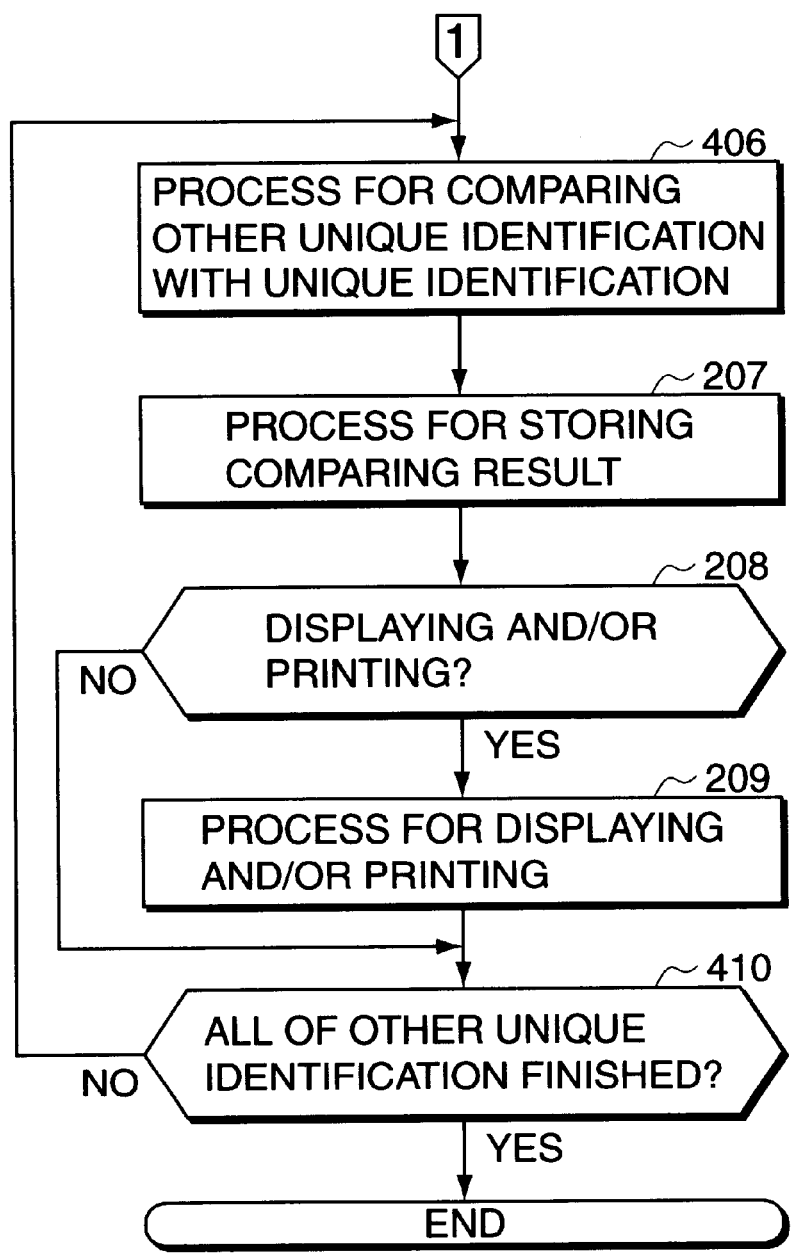
FIG. 8B is a flowchart of the process in the apparatus for retrieving moving image according to the present invention.

FIGS. 8A and 8B are flowcharts of the process in the apparatus for retrieving the moving image according to the present invention described in FIG. 7. Still, an identical step number is appended to the step having the identical process in FIGS. 8A and 8B with FIGS. 4A and 4B. In FIGS. 7, 8A and 8B, at first the extracting unit 302 for extracting the information of the feature quantity of the compressed moving image and the detecting unit 701 for detecting the cut point fetch the compressed moving image data 301 to be a retrieval key for identifying the compressed moving image (in the step 801). Next, the extracting unit 302 extracts the information 303 of the feature quantity of the compressed moving image, which includes the DCT coefficients of each frame and the information of the motion compensation of each frame, from the compressed moving image data 301 (in the step 402). And, the detecting unit 701 detects the cut point of the compressed moving image data 301 as the information 702 of the cut point (in the step 802).

Next, the extracting unit 703 for extracting the information of the unique identification of the compressed moving image calculates values of physical information of the feature quantity of the compressed moving image from the DCT coefficients of each frame, which is included in the information 303, mean value of the values, total value of the values and/or difference value of the values. On the other hand, the extracting unit 703 calculates values such as a motion vector, a mean motion vector between frames before and behind, a total motion vector, a difference vector and/or a motion vector on a whole frame from the information of the motion compensation. And the extracting unit 703 arranges at least one value from the above mentioned values on the time axis and then picks out all values arranged on the time axis, or some values from the values arranged on the time axis at uniform intervals or irregular intervals. And then, the extracting unit 703 extracts the picked out values in each shot unit of the compressed moving image data 301 divided by using the information 702 of the cut point as the information 705 of the unique identification of the compressed moving image to be used for identifying the compressed moving image (in the step 803).

The storing unit 306 for storing the information of the unique identification of the compressed moving image stores the information 705 of the unique identification of the compressed moving image extracted by the extracting unit 703 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 801 to 804.

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

The apparatus and the method for retrieving the moving image according to the invention are explained the above. The above mentioned extracting unit 703 calculates values of the physical information of the feature quantity of the compressed moving image from the DCT coefficients of each frame, which is included in the information 303, mean value of the values, total value of the values and/or difference value of the values, and values such as a motion vector, a mean motion vector between frames before and behind, a total motion vector, a difference vector and/or a motion vector on a whole frame from the information of the motion compensation. However, the extracting unit 703 may calculate values of a part or multiple parts of the physical information of the feature quantity of the compressed moving image from the DCT coefficients of each frame, which is included in the information 303, mean value of the values, total value of the values and/or difference value of the values, and values such as motion vector, a mean motion vector between frames before and behind, a total motion vector, a difference vector and/or a motion vector on the whole frame from a part or multiple parts of the information of the motion compensation. That is to say, values of information of feature quantity of moving image in each block unit may be calculated by dividing a frame into several blocks, and the information 705 of the unique identification of the moving image may be extracted by using all of the above mentioned values of the information of the feature quantity of the moving image. And also, the information 705 of the unique identification of the moving image may be extracted by using some values of the information of the feature quantity of the moving image. As such embodiment, for example, values of the information of the feature quantity of the moving image, which are calculated from blocks that are located on the part except for the part of time display and the part of around frame (the part with unevenness), are used.

And more, the extracting unit 703 may execute the weighting on the physical information of the feature quantity of the compressed moving image from the DCT coefficients of each frame, which is included in the information 303, then may calculate the above mentioned values from the weighted information of the feature quantity of the compressed moving image. On the other hand, the extracting unit 703 may execute the weighting on the information of the motion compensation and may calculate the above mentioned motion vectors from the weighted information of the motion compensation.

Moreover, in the extracting unit 703, values provided by quantizing the above mentioned values of the physical information of the feature quantity of the compressed moving image and values provided by quantizing the above mentioned motion vectors, and the like may be applied.

As mentioned above, according to the fourth embodiment of the invention, the information 705 of the unique identification of the compressed moving image for retrieving moving image depends on the content of the compressed moving image provided by the standard compression encoding process for moving image such as MPEG can be extracted by the less information quantity with utilizing the time concept of the shot according to the information 702 of the cut point. And, identical moving image can be retrieved and identified from the moving image by using the information 705 of the unique identification of the compressed moving image at the higher speed.

An apparatus and a method for retrieving moving image in the fifth preferred embodiment according to the invention will be explained in FIGS. 9, 10A and 10B.

Figure 9:
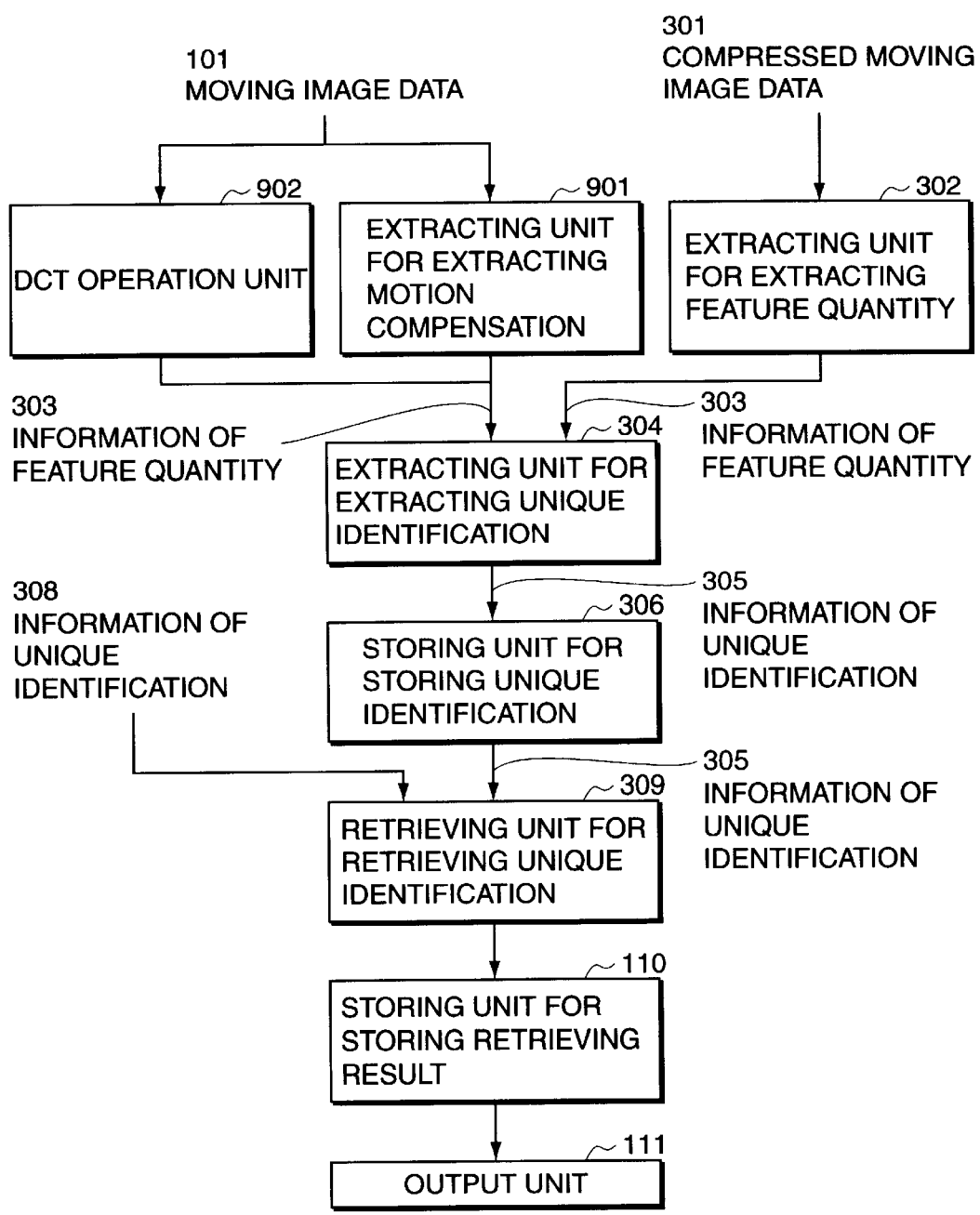
FIG. 9 is a block diagram showing the apparatus for retrieving moving image according to the present invention.

FIG. 9 is a block diagram showing an apparatus for retrieving moving image according to the present invention. Still, an identical code is appended to the thing having the identical composition in FIG. 9 with FIG. 1 and FIG. 3. In FIG. 9, the apparatus for retrieving moving image comprises an extracting unit 901 for extracting information of motion compensation in the M×N (M and N are natural numbers) pixels unit of moving image data 101, a DCT (Discrete Cosine Transform) operation unit 902 for obtaining a DCT coefficient by executing a DCT operation in the M'×N' (M' and N' are natural numbers) pixels unit of the moving image data 101, an extracting unit 302 for extracting information 303 of the feature quantity of compressed moving image, which includes DCT coefficients of each frame and information of motion compensation of each frame, from compressed moving image data 301 provided by the standard compression encoding process for moving image such as MPEG, an extracting unit 304 for arranging at least one information of feature quantity from the DCT coefficients of each frame and the information of the motion compensation of each frame, which are the information 303 extracted by the extracting unit 302, or by the extracting unit 901 and the DCT operation unit 902, on the time axis and for extracting information 305 of the unique identification of compressed moving image to identify the compressed moving image from the arrangement of the information of feature quantity on the time axis, a storing unit 306 for storing the information 305 of the unique identification of the compressed moving image extracted by the extracting unit 304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 10A:
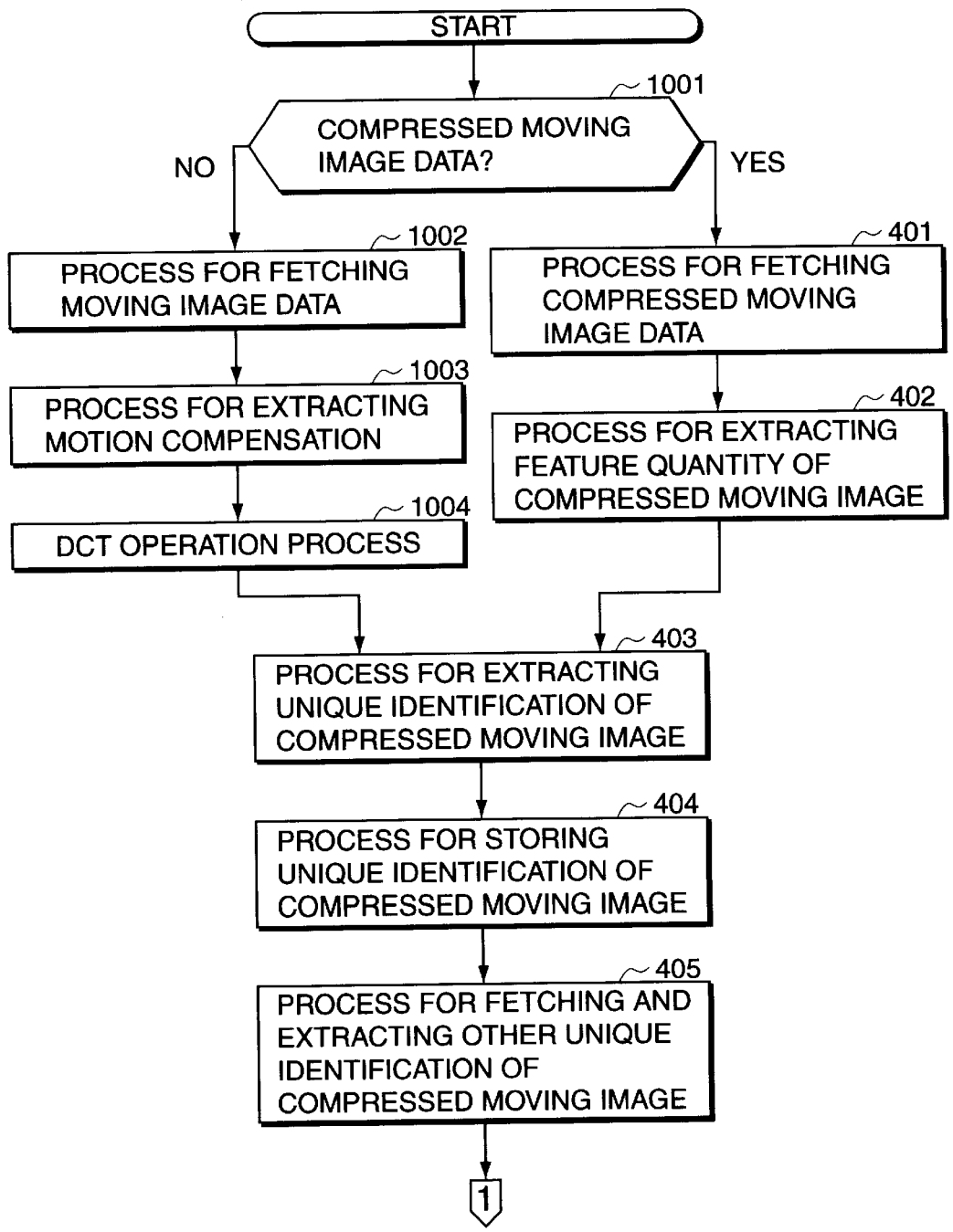
FIG. 10A is a flowchart of the process in the apparatus for retrieving moving image according to the present invention.
Figure 10B:
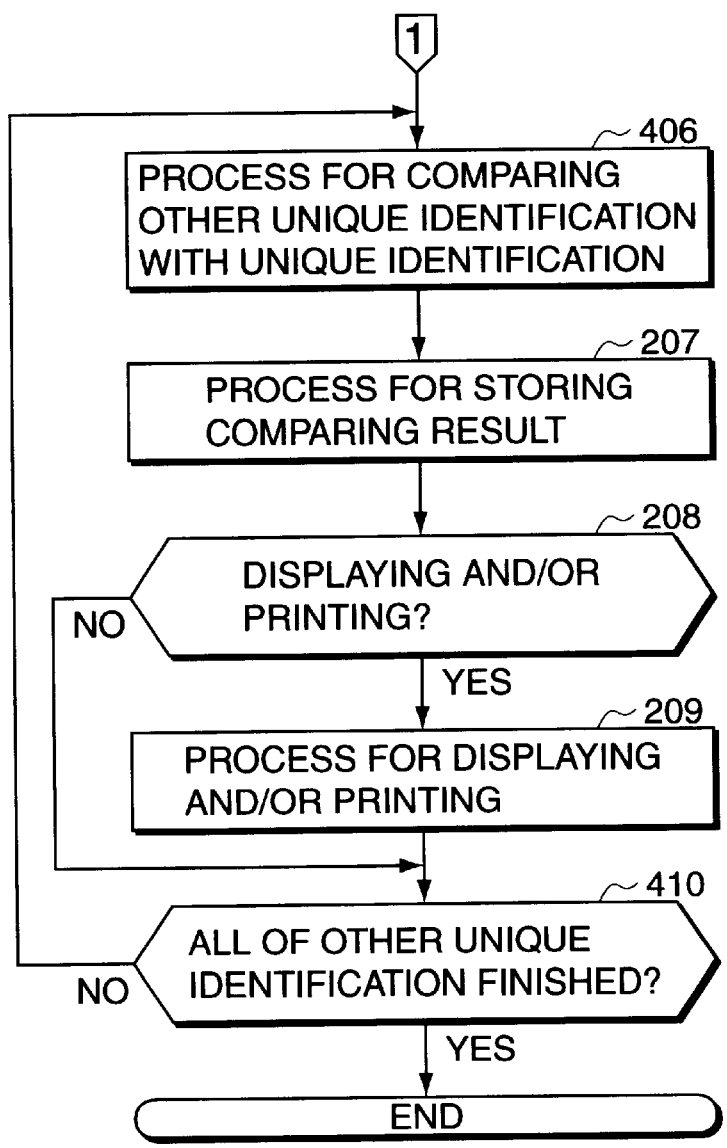
FIG. 10B is a flowchart of the process in the apparatus for retrieving moving image according to the present invention.

FIGS. 10A and 10B are flowcharts of the process in the apparatus for retrieving the moving image according to the present invention described in FIG. 9. Still, an identical step number is appended to the step having the identical process in FIGS. 10A and 10B with FIGS. 4A and 4B. In FIGS. 9, 10A and 10B, at first whether inputted moving image data is compressed is judged. (in the step 1001).

In case the inputted moving image data is the uncompressed moving image data 101, the extracting unit 901 for extracting the information of the motion compensation and the DCT operation unit 902 fetch the moving image data 101 to be a retrieval key for identifying the moving image (in the step 1002).

The extracting unit 901 divides each frame of the moving image data 101 into the M×N (M and N are natural numbers) pixels units, then calculates the information of the motion compensation in the M×N pixels unit (in the step 1003). On the other hand, the DCT operation unit 902 divides each frame of the moving image data 101 into the M'×N' (M' and N' are natural numbers) pixels units, then calculates the DCT coefficient by executing the DCT operation in the M'×N' pixels unit (in the step 1004).

The information of the motion compensation in the M×N pixels unit provided by the extracting unit 901 and the DCT coefficient in the M'×N' pixels unit provided by the DCT operation unit 902 are sent to the extracting unit 304 for extracting the information of the unique identification of the compressed moving image as the information 303 of the feature quantity of the compressed moving image.

On the other hand, in case the inputted moving image data is the compressed moving image data 301, the extracting unit 302 for extracting the information of the feature quantity of the compressed moving image fetches the compressed moving image data 301 to be a retrieval key for identifying the compressed moving image (in the step 401). And the extracting unit 302 extracts the information 303 of the feature quantity of the compressed moving image, which includes the DCT coefficients of each frame and the information of the motion compensation of each frame, from the compressed moving image data 301 (in the step 402).

Next, the extracting unit 304 for extracting the information of the unique identification of the compressed moving image calculates values of physical information of the feature quantity of the compressed moving image from the DCT coefficients of each frame, which is included in the information 303 extracted by extracting unit 302, or the extracting unit 901 and the DCT operation unit 902, mean value of the values, total value of the values and/or difference value of the values. On the other hand, the extracting unit 304 calculates values such as a motion vector, a mean motion vector between frames before and behind, a total motion vector, a difference vector and/or a motion vector on a whole frame from the information of the motion compensation. And the extracting unit 304 arranges at least one value from the above mentioned values on the time axis and then picks out all values arranged on the time axis, or some values from the values arranged on the time axis at uniform intervals or irregular intervals. And then, the extracting unit 304 extracts the picked out values as the information 305 of the unique identification of the compressed moving image to be used for identifying the compressed moving image (in the step 403).

The storing unit 306 for storing the information of the unique identification of the compressed moving image stores the information 305 of the unique identification of the compressed moving image extracted by the extracting unit 304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404.

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

The apparatus and the method for retrieving the moving image according to the invention are explained the above. The M×N pixels unit and the M'×N' pixels unit may be made to be a value equal to the pixel unit of the standard compression encoding system such as MPEG.

As mentioned above, according to the fifth embodiment of the invention, by executing the preprocessing (the steps 1003 and 1004) on the uncompressed moving image data 101, the information 305 of the unique identification of the compressed moving image for retrieving moving image depends on the content of the moving image 101 and the compressed moving image 301 can be extracted by the equal processing (the step 403). And identical moving image can be retrieved and identified from the moving image by using the information 305 of the unique identification of the compressed moving image at the higher speed.

An apparatus and a method for retrieving moving image in the sixth preferred embodiment according to the invention will be explained in FIGS. 11, 12A and 12B.

Figure 11:
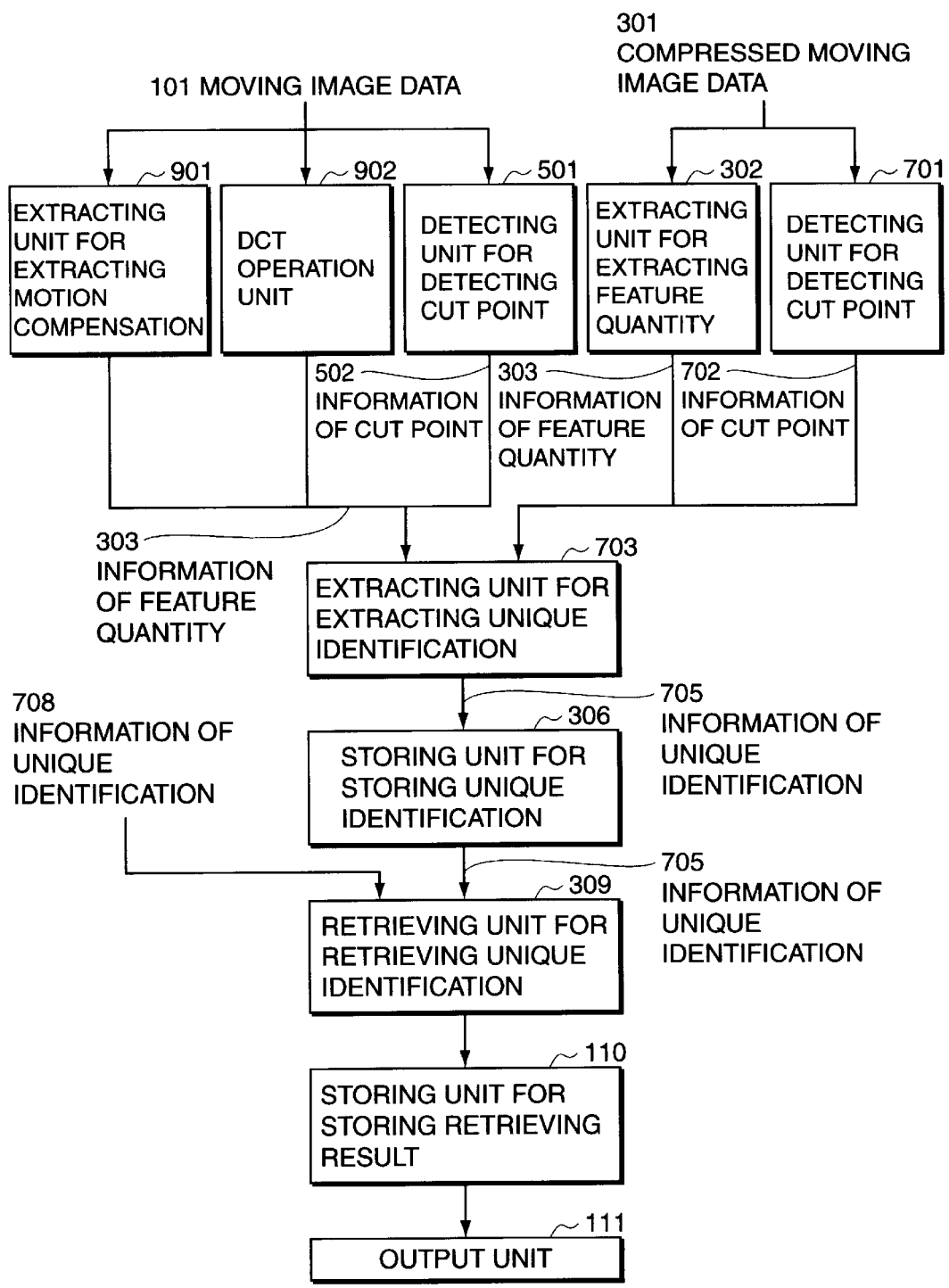
FIG. 11 is a block diagram showing the apparatus for retrieving moving image according to the present invention.

FIG. 11 is a block diagram showing an apparatus for retrieving moving image according to the present invention. Still, an identical code is appended to the thing having the identical composition in FIG. 11 with FIG. 5, FIG. 7 and FIG. 9. In FIG. 11, the apparatus for retrieving moving image comprises an extracting unit 901 for extracting information of motion compensation in the M×N (M and N are natural numbers) pixels unit of moving image data 101, a DCT (Discrete Cosine Transform) operation unit 902 for obtaining a DCT coefficient by executing a DCT operation in the M'×N' (M' and N' are natural numbers) pixels unit of the moving image data 101, a detecting unit 501 for detecting a cut point of the moving image data 101 as information 502 of a cut point, an extracting unit 302 for extracting information 303 of the feature quantity of compressed moving image, which includes DCT coefficients of each frame and information of motion compensation of each frame, from compressed moving image data 301 provided by the standard compression encoding process for moving image such as MPEG, a detecting unit 701 for detecting a cut point of the compressed moving image data 301 as information 702 of a cut point, an extracting unit 703 for arranging at least one information of feature quantity from the DCT coefficients of each frame and the information of the motion compensation of each frame, which are included in the information 303 extracted by the extracting unit 901 and the DCT operation unit 902, or the extracting unit 302, on the time axis and for extracting information 705 of the unique identification of compressed moving image to identify the compressed moving image from the arrangement of the information of the feature quantity on the time axis in each shot unit of the compressed moving image data 301 divided by using the information 702 of the cut point, a storing unit 306 for storing the information 705 of the unique identification of the compressed moving image extracted by the extracting unit 703, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 12A:
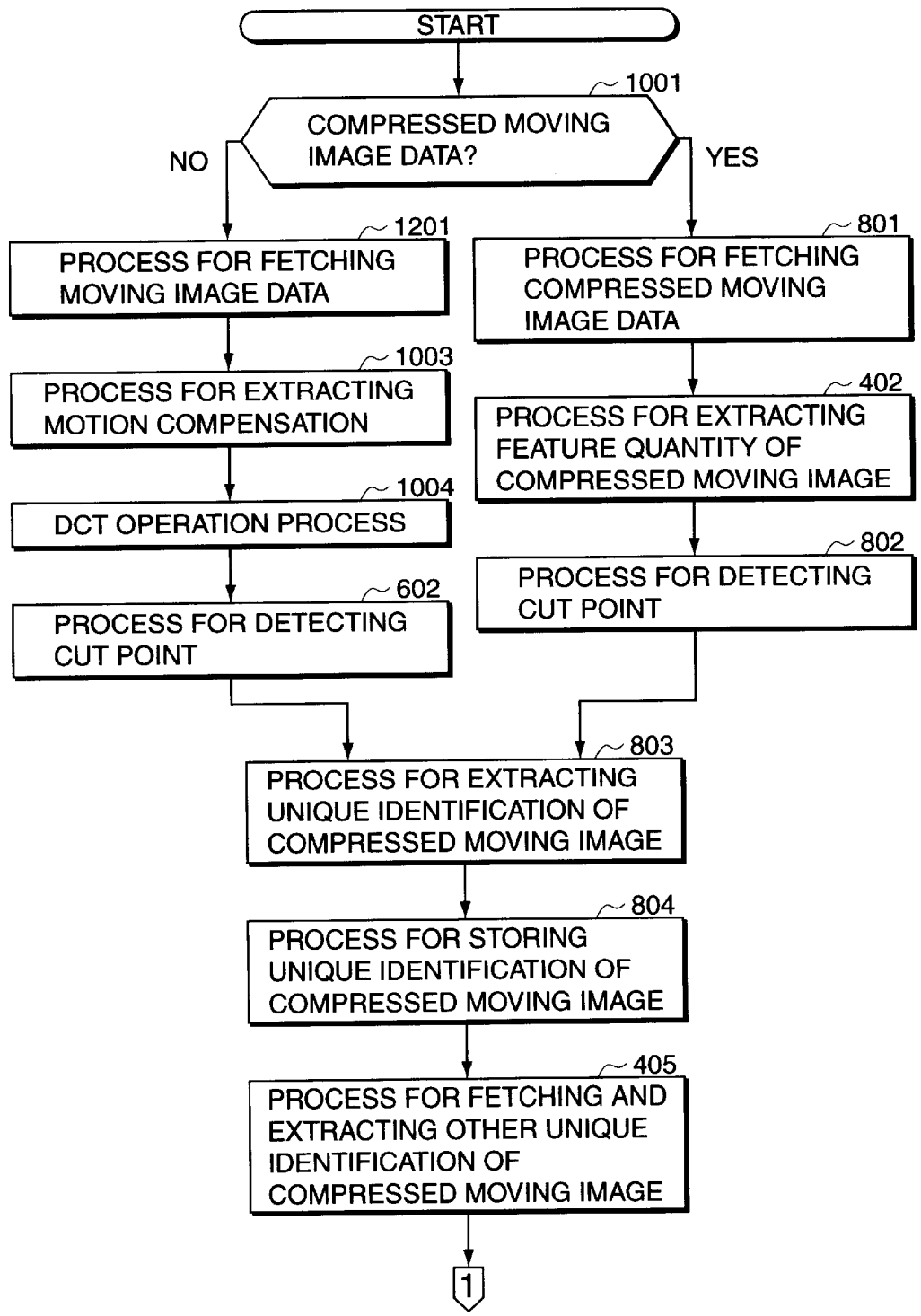
FIG. 12A is a flowchart of the process in the apparatus for retrieving moving image according to the present invention.
Figure 12B:
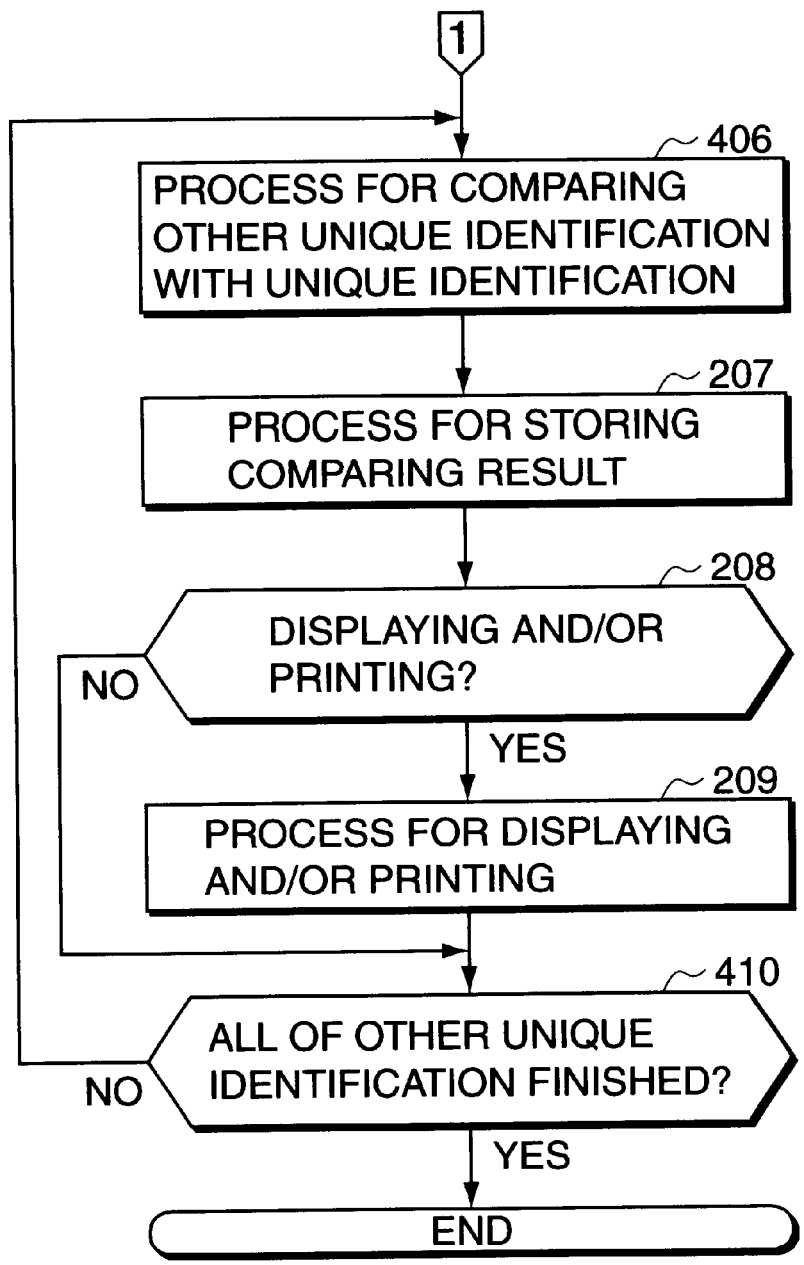
FIG. 12B is a flowchart of the process in the apparatus for retrieving moving image according to the present invention.

FIGS. 12A and 12B are flowcharts of the process in the apparatus for retrieving the moving image according to the present invention described in FIG. 11. Still, an identical step number is appended to the step having the identical process in FIGS. 12A and 12B with FIGS. 6A, 6B, 8A, 8B, 10A and 10B. In FIGS. 11, 12A and 12B, at first whether inputted moving image data is compressed is judged (in the step 1001).

In case the inputted moving image data is the uncompressed moving image data 101, the extracting unit 901 for extracting the information of the motion compensation, the DCT operation unit 902 and the detecting unit 501 for detecting the cut point fetch the moving image data 101 to be a retrieval key for identifying the moving image (in the step 1201).

The extracting unit 901 divides each frame of the moving image data 101 into the M×N (M and N are natural numbers) pixels units, then calculates the information of the motion compensation in the M×N pixels unit (in the step 1003). On the other hand, the DCT operation unit 902 divides each frame of the moving image data 101 into the M'×N' (M' and N' are natural numbers) pixels units, then calculates the DCT coefficient by executing the DCT operation in the M'×N' pixels unit (in the step 1004).

And, the detecting unit 501 detects the cut point of the moving image data 101 as the information 502 of the cut point (in the step 602).

The information of the motion compensation in the M×N pixels unit provided by the extracting unit 901 and the DCT coefficient in the M'×N' pixels unit provided by the DCT operation unit 902 are sent to the extracting unit 703 for extracting the information of the unique identification of the compressed moving image with the information 502 of the cut point detected by the detecting unit 501 as the information 303 of the feature quantity of the compressed moving image.

On the other hand, in case the inputted moving image data is the compressed moving image data 301, the extracting unit 302 for extracting the information of the feature quantity of the compressed moving image and the detecting unit 701 for detecting the cut point fetch the compressed moving image data 301 to be a retrieval key for identifying the compressed moving image (in the step 801). Next, the extracting unit 302 extracts the information 303 of the feature quantity of the compressed moving image, which includes the DCT coefficients of each frame and the information of the motion compensation of each frame, from the compressed moving image data 301 (in the step 402). And, the detecting unit 701 detects the cut point of the compressed moving image data 301 as the information 702 of the cut point (in the step 802).

Next, the extracting unit 703 for extracting the information of the unique identification of the compressed moving image calculates values of physical information of the feature quantity of the compressed moving image from the DCT coefficients of each frame, which is included in the information 303, mean value of the values, total value of the values and/or difference value of the values. On the other hand, the extracting unit 703 calculates values such as a motion vector, a mean motion vector between frames before and behind, a total motion vector, a difference vector and/or a motion vector on a whole frame from the information of the motion compensation. And the extracting unit 703 arranges at least one value from the above mentioned values on the time axis and then picks out all values arranged on the time axis, or some values from the values arranged on the time axis at uniform intervals or irregular intervals. And then, the extracting unit 703 extracts the picked out values in each shot unit of the moving image data 101 divided by using the information 502 or in each shot unit of the compressed moving image data 301 divided by using the information 702 as the information 705 of the unique identification of the compressed moving image to be used for identifying the compressed moving image (in the step 803).

The storing unit 306 for storing the information of the unique identification of the compressed moving image stores the information 705 of the unique identification of the compressed moving image extracted by the extracting unit 703 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804.

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

The apparatus and the method for retrieving the moving image according to the invention are explained the above. The M×N pixels unit and the M'×N' pixels unit may be made to be a value equal to the pixel unit of the standard compression encoding system such as MPEG.

As mentioned above, according to the sixth embodiment of the invention, by executing the preprocessing (the steps 1003 and 1004) on the uncompressed moving image data 101, the information 705 of the unique identification of the compressed moving image for retrieving moving image depends on the content of the moving image 101 and the compressed moving image 301 can be extracted by the equal processing (the step 803). And, the information 705 of the unique identification of the compressed moving image for retrieving moving image can be extracted by the less information quantity with utilizing the time concept of the shot according to the information 502 and the information 702. Identical moving image can be retrieved and identified from the moving image by using the information 705 of the unique identification of the compressed moving image at the higher speed.

An apparatus and a method for retrieving moving image in the seventh preferred embodiment according to the invention will be explained in FIGS. 13 to 15B.

Figure 13:
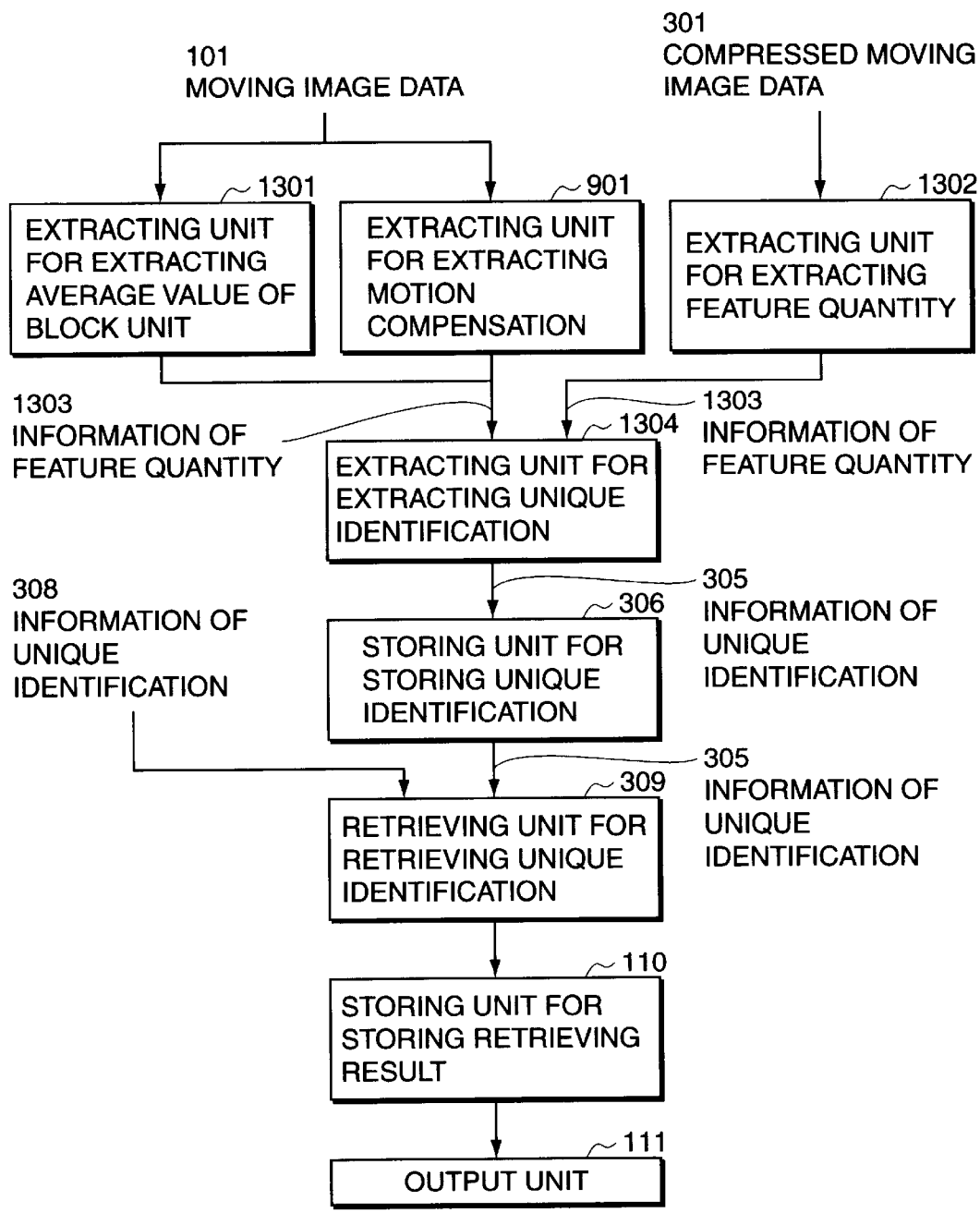
FIG. 13 is a block diagram showing the apparatus for retrieving moving image according to the present invention.

FIG. 13 is a block diagram showing an apparatus for retrieving moving image according to the present invention.

Still, an identical code is appended to the thing having the identical composition in FIG. 13 with FIG. 3 and FIG. 9. In FIG. 13, the apparatus for retrieving moving image comprises an extracting unit 901 for extracting information of motion compensation in the M×N (M and N are natural numbers) pixels unit of moving image data 101, an extracting unit 1301 for calculating an average pixel value, such as information of average color (R, G, B) or information of average luminance and average color difference (Y, Cb, Cr), in the M'×N' (M' and N' are natural numbers) pixels unit, an extracting unit 1302 for extracting information 1303 of the feature quantity of compressed moving image, which includes DC (Direct Current) components of DCT (Discrete Cosine Transform) coefficients of each frame and information of motion compensation of each frame, from compressed moving image data 301 provided by the standard compression encoding process for moving image such as MPEG, an extracting unit 1304 for arranging at least one information of feature quantity from the DC components of the DCT coefficients of each frame and the information of the motion compensation of each frame or the average pixel value, which are included in the information 1303 extracted by the extracting unit 901 and the extracting unit 1301, or the extracting unit 1302, on the time axis and for extracting information 305 of the unique identification of compressed moving image to identify the compressed moving image from the arrangement of the information of the feature quantity on the time axis, a storing unit 306 for storing the information 305 of the unique identification of the compressed moving image extracted by the extracting unit 1304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110.

Figure 14:
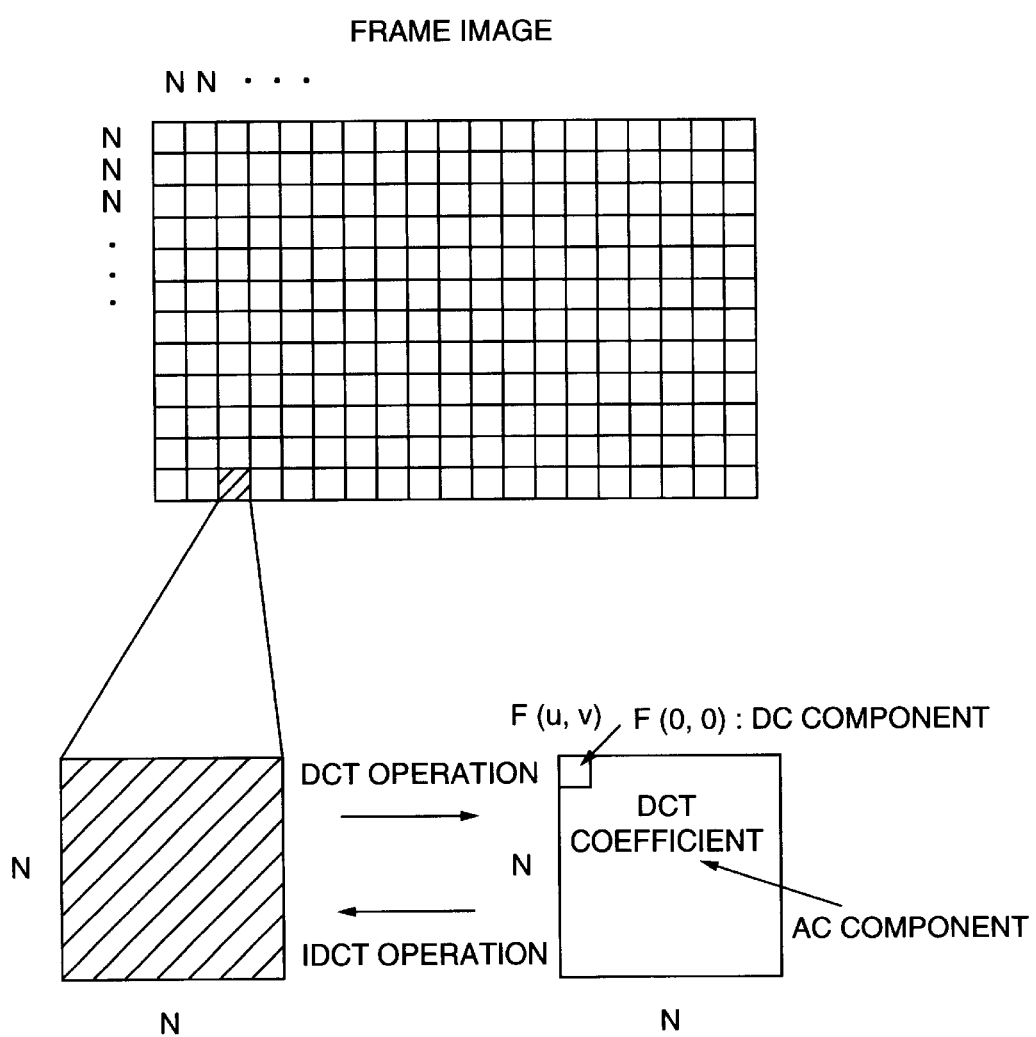
FIG. 14 is a conceptual view showing the process of DCT (discrete cosine transform) operation in MPEG.

FIG. 14 is a conceptual scheme showing the relationship between the DCT (Discrete Cosine Transform) operation and the IDCT (Inverse Discrete Cosine Transform) operation, which are used in the international standard encoding system such as MPEG, and frame image.

The expression of the DCT operation is shown in the following EXPRESSION 1.

$$F(u, v) = \{2C(u)C(v)/N\}\sum_{x=0}^{N-1}\sum_{y=0}^{N-1}\cos\{(2x+1)u\pi/2N\}\cos\{(2y+1)v\pi/2N\}$$ [EXPRESSION 1]

And, the expression of the IDCT operation is shown in the following EXPRESSION 2.

$$f(x, y) = (2/N)\sum_{u=0}^{N-1}\sum_{v=0}^{N-1}C(u)C(v)\cos\{(2x+1)u\pi/2N\}\cos\{(2y+1)v\pi/2N\}$$ [EXPRESSION 2]

However, in the above mentioned EXPRESSIONs 1 and 2,

"N" is showing a block size of intra-code;

"x" and "y" are showing a coordinate in a block;

"f(x, y)" is showing a pixel value of the coordinate (x, y) in a block;

"u" and "v" are showing a coordinate after the DCT conversion;

"F(u, v)" is showing a DCT coefficient value of the coordinate (u, v) after the DCT conversion;

"C(u)" is made $1/\sqrt{2}$, if u=0;
1, if u≠0; and

"C(v)" is made $1/\sqrt{2}$, if v=0;
1, if v≠0.

In FIG. 14, for example, in case the block size N of one frame is 8 and the coordinate (u, v) after the DCT conversion is (0, 0), F(u, v) in the EXPRESSION 1 is shown in the following EXPRESSION 3.

$$F(0, 0) = (1/8)\sum_{x=0}^{7}\sum_{y=0}^{7}f(x, y)$$ [EXPRESSION 3]

And more, an average pixel value in the block is shown in the following EXPRESSION 4.

$$\text{Average Pixel Value in the block} = \sum_{x=0}^{7}\sum_{y=0}^{7} f(x,y)/8 \times 8$$
$$= F(0,0)/8$$

[EXPRESSION 4]

As shown in the above mentioned EXPRESSION 3 and 4, the DC component F(u, v) of the DCT coefficient becomes a value provided by multiplying the average pixel value in the block by the quantization number (N) of the block. That is to say, the DC components F(u, v) of the DCT coefficients extracted by the extracting unit 1302 for extracting the information of the feature quantity of the compressed moving image and the average pixel value provided by the extracting unit 1301 for extracting the average value of the block unit may be handled as identical information data considering the quantization number of the block. Specifically, the information 1303 extracted by the extracting unit 1302, and the information 1303 depends on the information of the motion compensation extracted by the extracting unit 901 and the average pixel value extracted by the extracting unit 1301 may be considered information of data having an identical content composition.

On the apparatus for retrieving the moving image according to the present invention constituted like the above, an operation will be explained in the following.

Figure 15A:
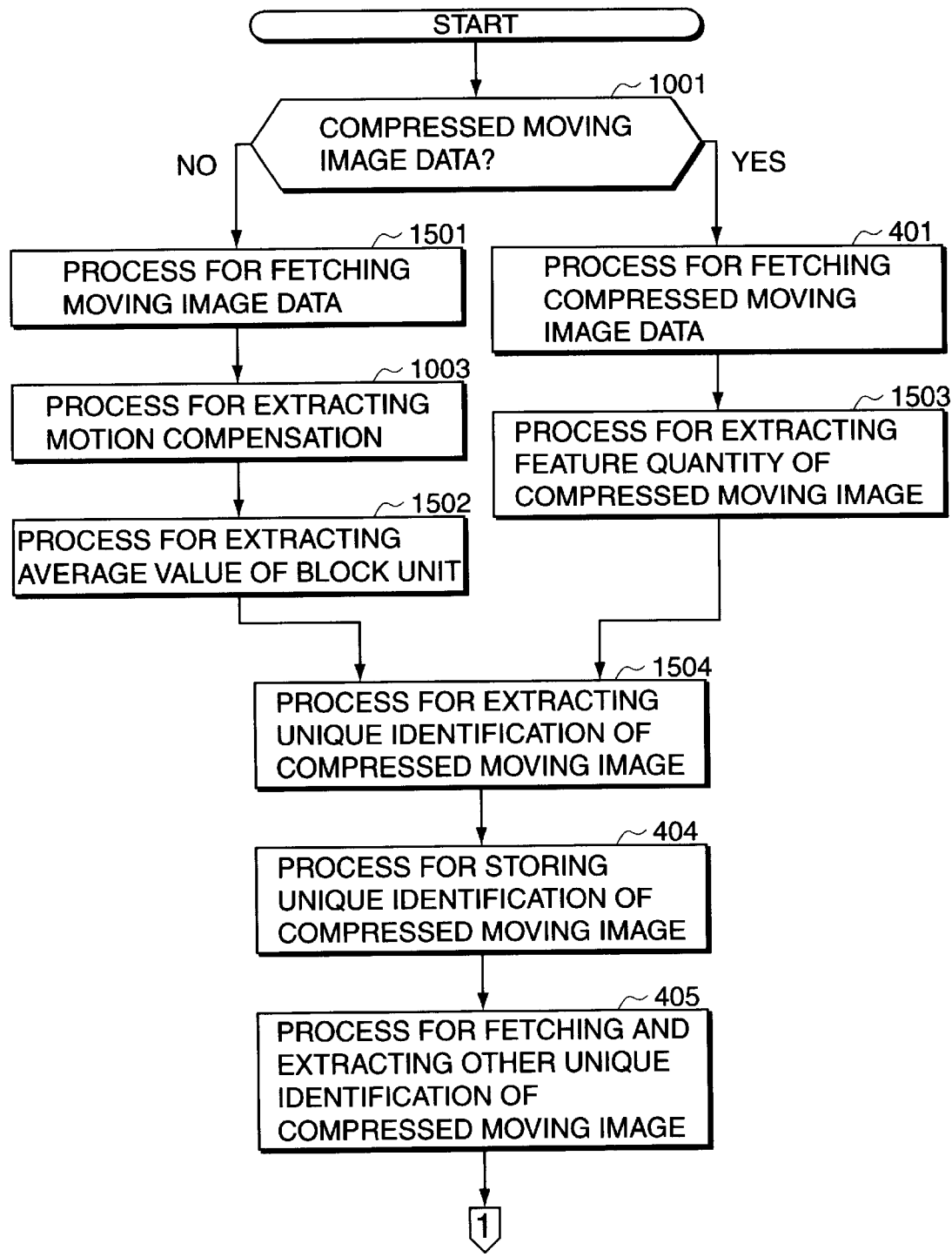
FIG. 15A is a flowchart of the process in the apparatus for retrieving moving image according to the present invention.
Figure 15B:
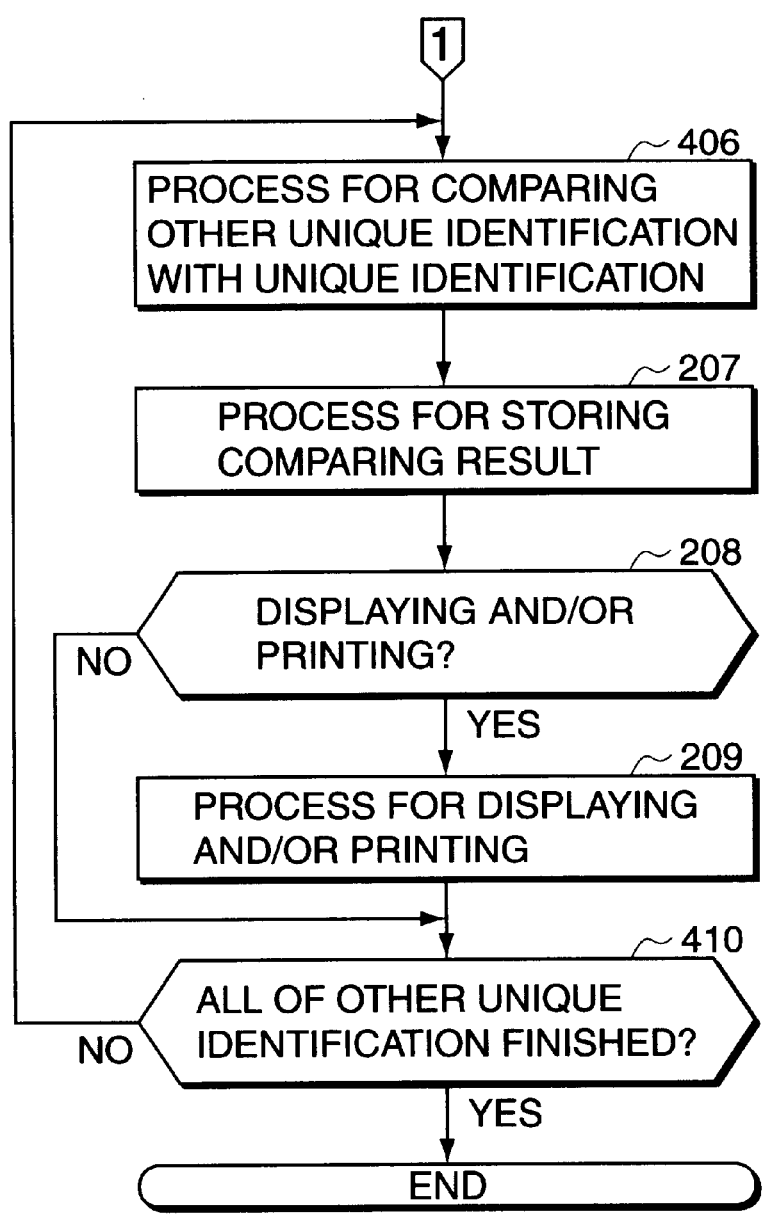
FIG. 15B is a flowchart of the process in the apparatus for retrieving moving image according to the present invention.

FIGS. 15A and 15B are flowcharts of the process in the apparatus for retrieving the moving image according to the present invention described in FIG. 13. Still, an identical step number is appended to the step having the identical process in FIGS. 15A and 15B with FIGS. 4A, 4B, 10A and 10B. In FIGS. 13, 15A and 15B, at first whether inputted moving image data is compressed is judged. (in the step 1001).

In case the inputted moving image data is the uncompressed moving image data 101, the extracting unit 901 for extracting the information of the motion compensation and the extracting unit 1301 for extracting the average value of the block unit fetch the moving image data 101 to be a retrieval key for identifying the moving image (in the step 1501).

The extracting unit 901 divides each frame of the moving image data 101 into the M×N (M and N are natural numbers) pixels units, then calculates the information of the motion compensation in the M×N pixels unit (in the step 1003). On the other hand, the extracting unit 1301 divides each frame of the moving image data 101 into the M'×N' (M' and N' are natural numbers) pixels units, then calculates the average pixel value in the M'×N' pixels unit (in the step 1502).

The information of the motion compensation in the M×N pixels unit provided by the extracting unit 901 and the average pixel value in the M'×N' pixels unit provided by the extracting unit 1301 are sent to the extracting unit 1304 for extracting the information of the unique identification of the compressed moving image as the information 1303 of the feature quantity of the compressed moving image.

On the other hand, in case the inputted moving image data is the compressed moving image data 301, the extracting unit 1302 for extracting the information of the feature quantity of the compressed moving image fetches the compressed moving image data 301 to be a retrieval key for identifying the compressed moving image (in the step 401). And the extracting unit 1302 extracts the information 1303 of the feature quantity of the compressed moving image, which includes the DC components of the DCT coefficients of each frame and the information of the motion compensation of each frame, from the compressed moving image data 301 (in the step 1503).

Next, the extracting unit 1304 for extracting the information of the unique identification of the compressed moving image calculates values of physical information of the feature quantity of compressed moving image from the DC components of the DCT coefficients of each frame and/or values of the average pixel value of each frame, which are included in the information 1303, mean value of the values, total value of the values and/or difference value of the values. On the other hand, the extracting unit 1304 calculates values such as a motion vector, a mean motion vector between frames before and behind, a total motion vector, a difference vector and/or a motion vector on a whole frame from the information of the motion compensation. And the extracting unit 1304 arranges at least one value from the above mentioned values on the time axis and then picks out all values arranged on the time axis, or some values from the values arranged on the time axis at uniform intervals or irregular intervals. And then, the extracting unit 1304 extracts the picked out values as the information 305 of the unique identification of the compressed moving image to be used for identifying the compressed moving image (in the step 1504).

The storing unit 306 for storing the information of the unique identification of the compressed moving image stores the information 305 of the unique identification of the compressed moving image extracted by the extracting unit 1304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404.

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

The apparatus and the method for retrieving the moving image according to the invention are explained the above. The above mentioned extracting unit 1304 calculates values of physical information of the feature quantity of the compressed moving image from the DC components of the DCT coefficients of each frame and/or values of the average pixel value of each frame, which are included in the information 1303, mean value of the values, total value of the values and/or difference value of the values. And the extracting unit 1304 calculates values such as a motion vector, a mean motion vector between frames before and behind, a total motion vector, a difference vector and/or a motion vector on a whole frame from the information of the motion compensation. However, the extracting unit 1304 may calculate the above mentioned values by using a part or multiple parts of the physical information of the feature quantity of the compressed moving image from the DC components of the DCT coefficients of each frame and/or the average pixel value of each frame, which are included in the information 1303, and the above mentioned vectors by using a part or multiple parts of the information of the motion compensation.

And more, the extracting unit 1304 may execute the weighting on the physical information of the feature quantity of the compressed moving image from the DC components of the DCT coefficients of each frame and/or on the average pixel value of each frame, then may calculate the above mentioned values from the weighted information of the feature quantity of the compressed moving image and/or the weighted average pixel value. On the other hand, the extracting unit 1304 may execute the weighting on the information of the motion compensation and may calculate the above mentioned vectors from the weighted information of the motion compensation.

Moreover, in the extracting unit 1304, values provided by quantizing the above mentioned values of the physical information or of the average pixel value or the like, and values provided by quantizing the above mentioned motion vectors and the like may be applied.

Further more, the M×N pixels unit and the M'×N' pixels unit may be made to be a value equal to the pixel unit of the standard compression encoding system such as MPEG.

As mentioned above, according to the seventh embodiment of the invention, by executing the preprocessing on the moving image, the information 305 of the unique identification of the compressed moving image for retrieving the moving image depends on the content of the moving image data 101 and the compressed moving image data 301 can be extracted by the less information quantity and by executing the equal process for the moving image data 101 and the compressed moving image data 301. And, identical moving image can be retrieved and identified from the moving image by using the information 305 of the unique identification of the compressed moving image at the higher speed.

An apparatus and a method for retrieving moving image in the eighth preferred embodiment according to the invention will be explained in FIGS. 16, 17A and 17B.

Figure 16:
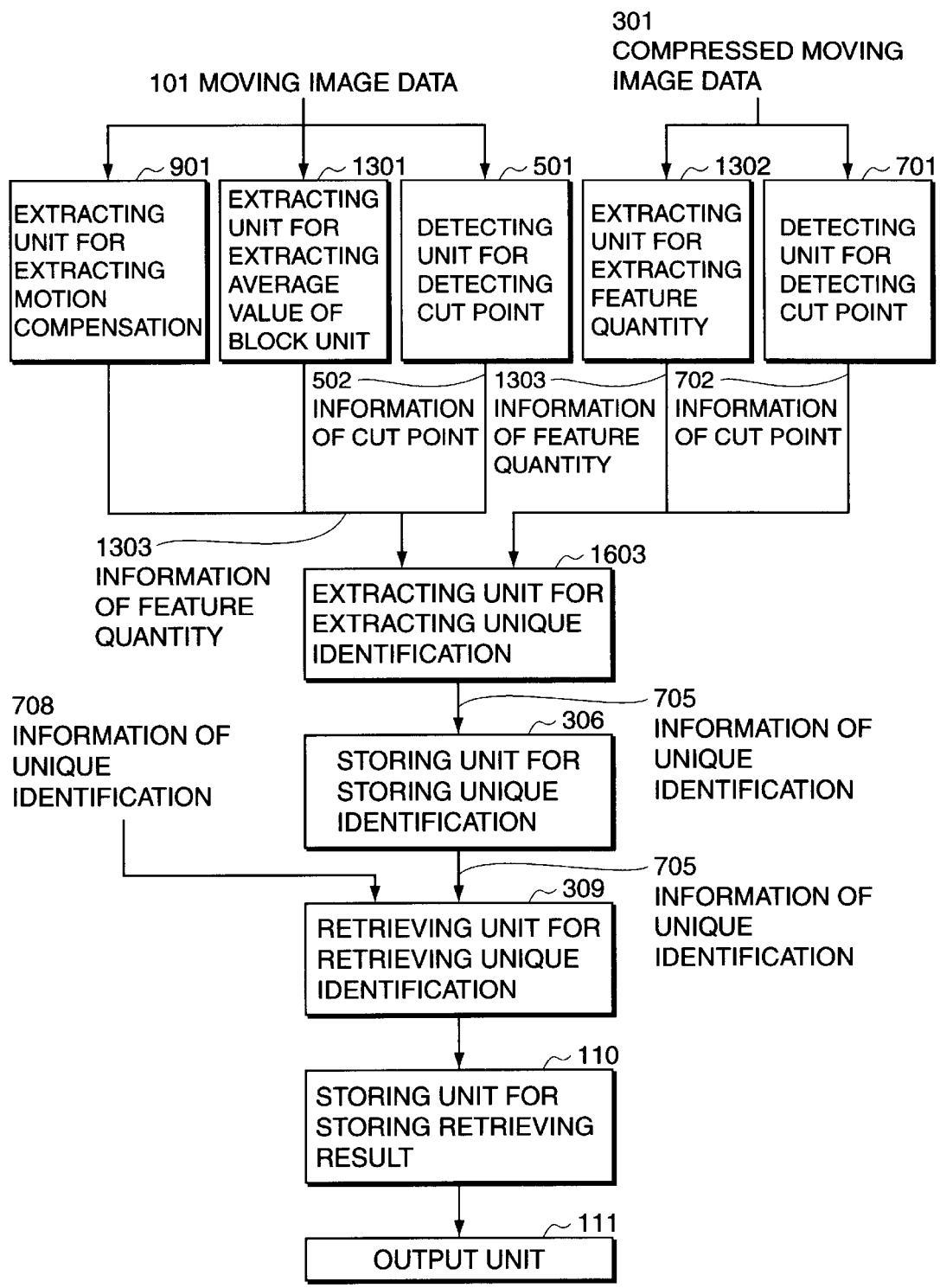
FIG. 16 is a block diagram showing the apparatus for retrieving moving image according to the present invention.

FIG. 16 is a block diagram showing an apparatus for retrieving moving image according to the present invention. Still, an identical code is appended to the thing having the identical composition in FIG. 16 with FIG. 5, FIG. 7 and FIG. 13. In FIG. 16, the apparatus for retrieving moving image comprises an extracting unit 901 for extracting information of motion compensation in the M×N (M and N are natural numbers) pixels unit of moving image data 101, an extracting unit 1301 for calculating an average pixel value, such as information of average color (R, G, B) or information of average luminance and average color difference (Y, Cb, Cr), in the M'×N' (M' and N' are natural numbers) pixels unit, a detecting unit 501 for detecting a cut point of the moving image data 101 as information 502 of a cut point, an extracting unit 1302 for extracting information 1303 of the feature quantity of compressed moving image, which includes DC (Direct Current) components of DCT (Discrete Cosine Transform) coefficients of each frame and information of motion compensation of each frame, from compressed moving image data 301 provided by the standard compression encoding process for moving image such as MPEG, a detecting unit 701 for detecting a cut point of the compressed moving image data 301 as information 702 of a cut point, an extracting unit 1603 for arranging at least one information of feature quantity from the DC components of the DCT coefficients of each frame and the information of the motion compensation of each frame or the average pixel value, which are included in the information 1303 extracted by the extracting unit 901 and the extracting unit 1301, or the extracting unit 1302, on the time axis and for extracting information 705 of the unique identification of compressed moving image to identify the compressed moving image from the arrangement of the information of the feature quantity on the time axis in each shot unit of the moving image data 101 divided by using the information 502 of the cut point or in each shot unit of the compressed moving image data 301 divided by using the information 702 of the cut point, a storing unit 306 for storing the information 705 of the unique identification of the compressed moving image extracted by the extracting unit 1603, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 17A:
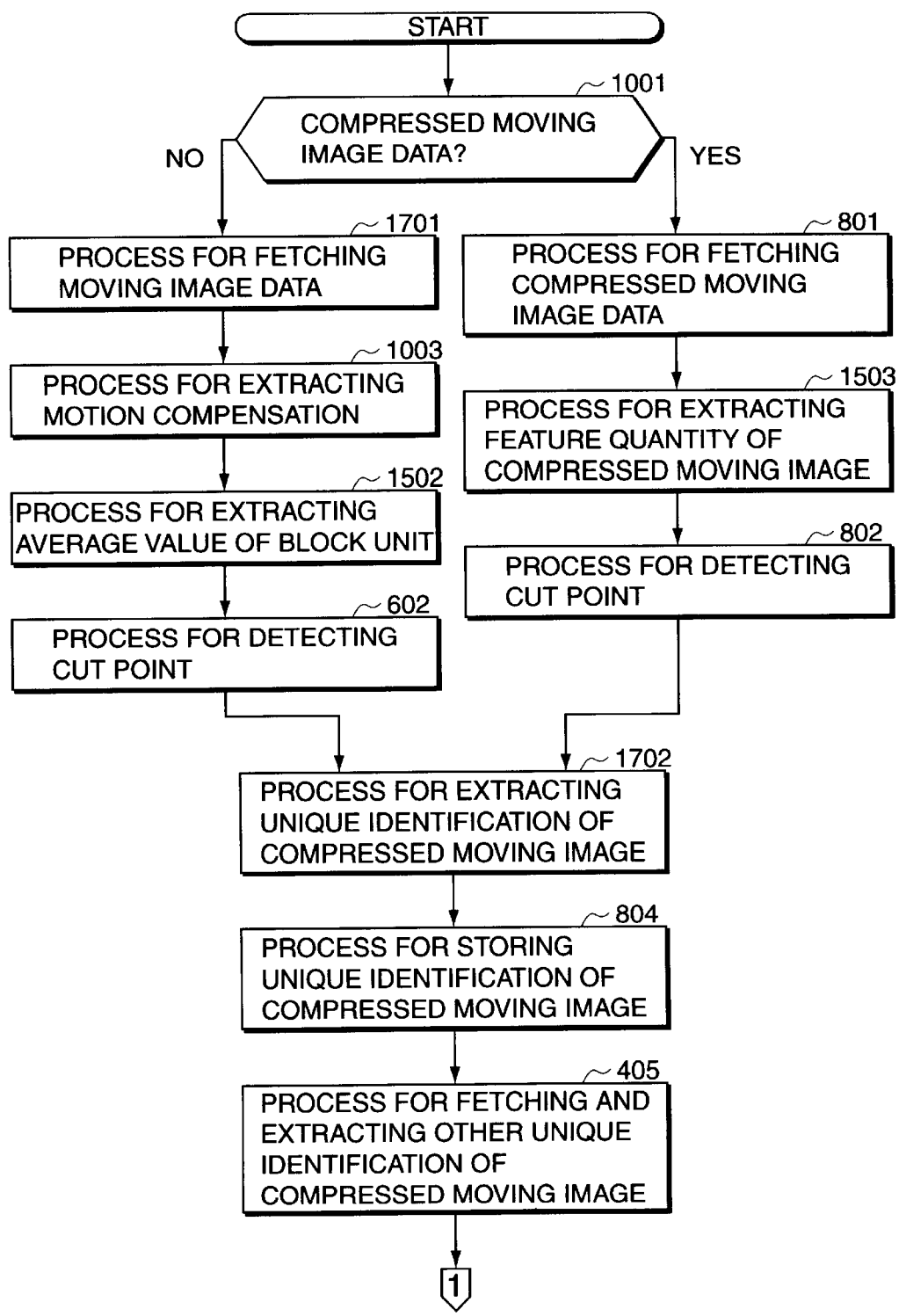
FIG. 17A is a flowchart of the process in the apparatus for retrieving moving image according to the present invention.
Figure 17B:
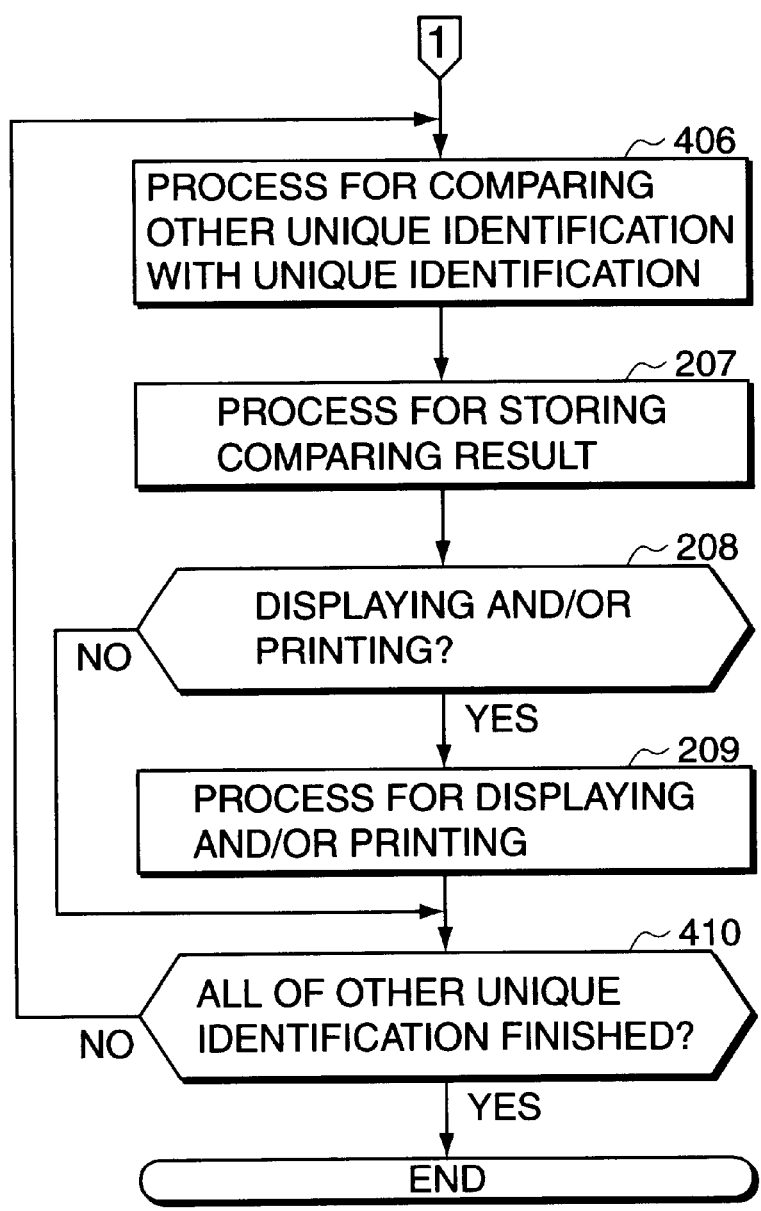
FIG. 17B is a flowchart of the process in the apparatus for retrieving moving image according to the present invention.

FIGS. 17A and 17B are flowcharts of the process in the apparatus for retrieving the moving image according to the present invention described in FIG. 16. Still, an identical step number is appended to the step having the identical process in FIGS. 17A and 17B with FIGS. 6A, 6B, 8A, 8B, 15A and 15B. In FIGS. 16, 17A and 17B, at first whether inputted moving image data is compressed is judged (in the step 1001).

In case the inputted moving image data is the uncompressed moving image data 101, the extracting unit 901 for extracting the information of the motion compensation, the extracting unit 1301 for extracting the average value of the block unit and the detecting unit 501 for detecting the cut point fetch the moving image data 101 to be a retrieval key for identifying the moving image (in the step 1701).

The extracting unit 901 divides each frame of the moving image data 101 into the M×N (M and N are natural numbers) pixels units, then calculates the information of the motion compensation in the M×N pixels unit (in the step 1003). And, the extracting unit 1301 divides each frame of the moving image data 101 into the M'×N' (M' and N' are natural numbers) pixels units, then calculates the average pixel value in the M'×N' pixels unit (in the step 1502). And more, the detecting unit 501 detects the cut point of the moving image data 101 as the information 502 of the cut point (in the step 602).

The information of the motion compensation in the M×N pixels unit provided by the extracting unit 901 and the average pixel value in the M'×N' pixels unit provided by the extracting unit 1301 are sent to the extracting unit 1603 for extracting the information of the unique identification of the compressed moving image with the information 502 of the cut point detected by the detecting unit 501 as the information 1303 of the feature quantity of the compressed moving image.

On the other hand, in case the inputted moving image data is the compressed moving image data 301, the extracting unit 1302 for extracting the information of the feature quantity of the compressed moving image and the detecting unit 701 for detecting the cut point fetch the compressed moving image data 301 to be a retrieval key for identifying the compressed moving image (in the step 801). And the extracting unit 1302 extracts the information 1303 of the feature quantity of the compressed moving image, which includes the DC components of the DCT coefficients of each frame and the information of the motion compensation of each frame, from the compressed moving image data 301 (in the step 1503). And then, the detecting unit 701 detects the cut point of the compressed moving image data 301 as the information of the cut point 702 (in the step 802).

Next, the extracting unit 1603 for extracting the information of the unique identification of the compressed moving image calculates values of physical information of the feature quantity of the compressed moving image from the DC components of the DCT coefficients of each frame and/or values of the average pixel value of each frame, which are included in the information 1303, mean value of the values, total value of the values and/or difference value of the values. On the other hand, the extracting unit 1603 calculates values such as a motion vector, a mean motion vector between frames before and behind, a total motion vector, a difference vector and/or a motion vector on a whole frame from the information of the motion compensation. And the extracting unit 1603 arranges at least one value from the above mentioned values on the time axis and then picks out all values arranged on the time axis, or some values from the values arranged on the time axis at uniform intervals or irregular intervals. And then, the extracting unit 1603 extracts the picked out values in each shot unit of the moving image data 101 divided by using the information 502 of the cut point or in each shot unit of the compressed moving image data 301 divided by using the information 702 of the cut point as the information 705 of the unique identification of the compressed moving image to be used for identifying the compressed moving image (in the step 1702).

The storing unit 306 for storing the information of the unique identification of the compressed moving image stores the information 705 of the unique identification of the compressed moving image extracted by the extracting unit 1603 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804.

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

The apparatus and the method for retrieving the moving image according to the invention are explained the above. The M×N pixels unit and the M'×N' pixels unit may be made to be a value equal to the pixel unit of the standard compression encoding system such as MPEG.

As mentioned above, according to the eighth embodiment of the invention, by utilizing the time concept of the shot according to the information of the cut point and by executing the preprocessing on the moving image, information 1303 of the unique identification of the compressed moving image for retrieving moving image depends on the content of the moving image data 101 and the compressed moving image data 301 can be extracted by the less information quantity and by executing the equal process for the moving image data 101 and the compressed moving image data 301. And, identical moving image can be retrieved and identified from the moving image by using the information 1303 of the unique identification of the compressed moving image at the higher speed.

An apparatus and a method for retrieving moving image in the ninth preferred embodiment according to the invention will be explained in FIGS. 18, 19A and 19B.

Figure 18:
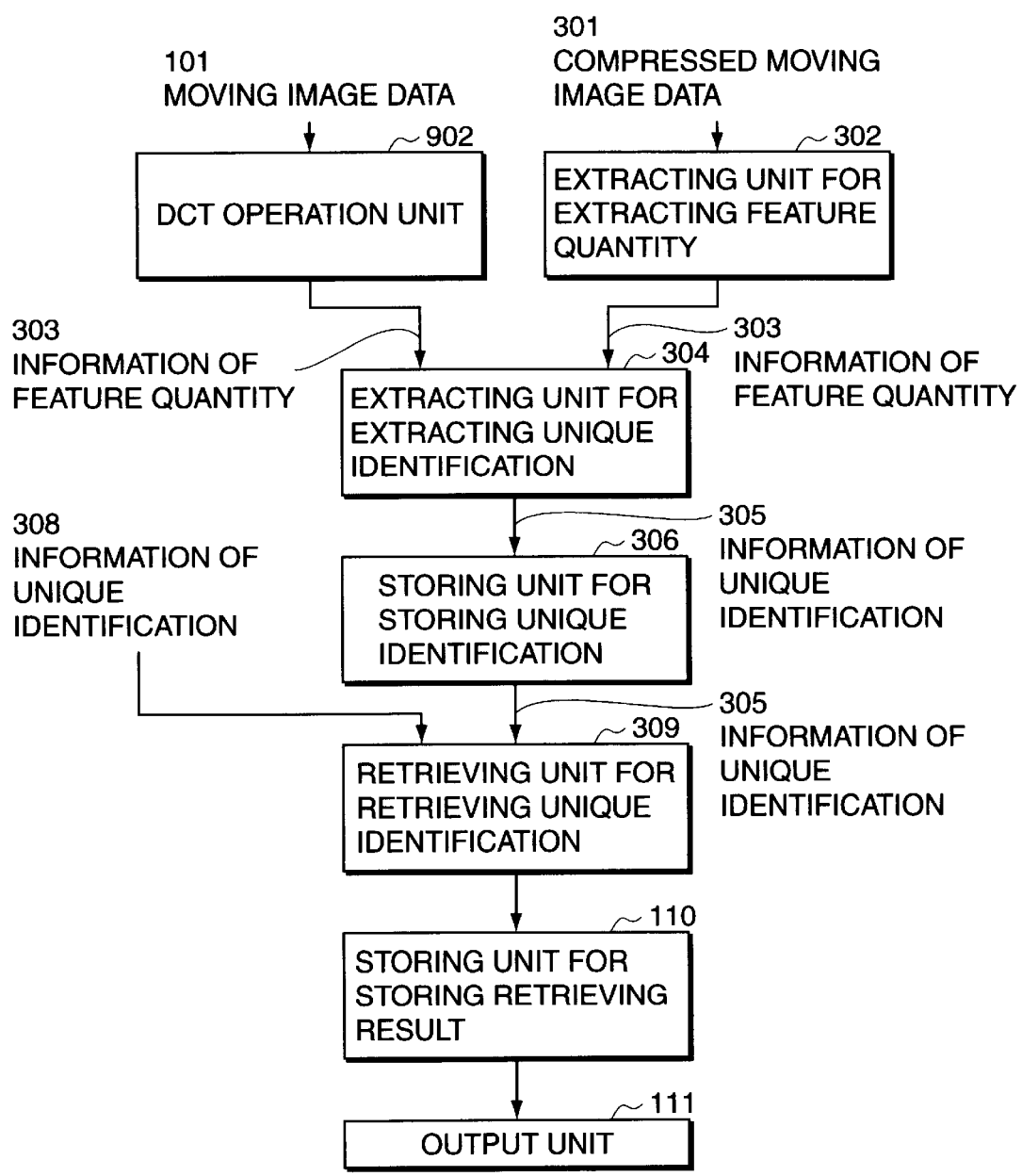
FIG. 18 is a block diagram showing the apparatus for retrieving moving image according to the present invention.

FIG. 18 is a block diagram showing an apparatus for retrieving moving image according to the present invention. Still, an identical code is appended to the thing having the identical composition in FIG. 18 with FIG. 3 and FIG. 9. In FIG. 18, the apparatus for retrieving moving image comprises a DCT (Discrete Cosine Transform) operation unit 902 for obtaining a DCT coefficient by executing a DCT operation in the M×N (M and N are natural numbers) pixels unit of moving image data 101 as information 303 of the feature quantity of compressed moving image, an extracting unit 302 for extracting information 303 of the feature quantity of compressed moving image, which includes the DCT coefficients of each frame, from compressed moving image data 301 provided by the standard compression encoding process for moving image such as MPEG, an extracting unit 304 for arranging at least one information of feature quantity from the DCT coefficients of each frame, which is included in the information 303 extracted by the DCT operation unit 902 or by the extracting unit 302, on the time axis and for extracting information 305 of the unique identification of compressed moving image to identify the compressed moving image from the arrangement of the information of feature quantity on the time axis, a storing unit 306 for storing the information 305 of the unique identification of the compressed moving image extracted by the extracting unit 304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 19A:
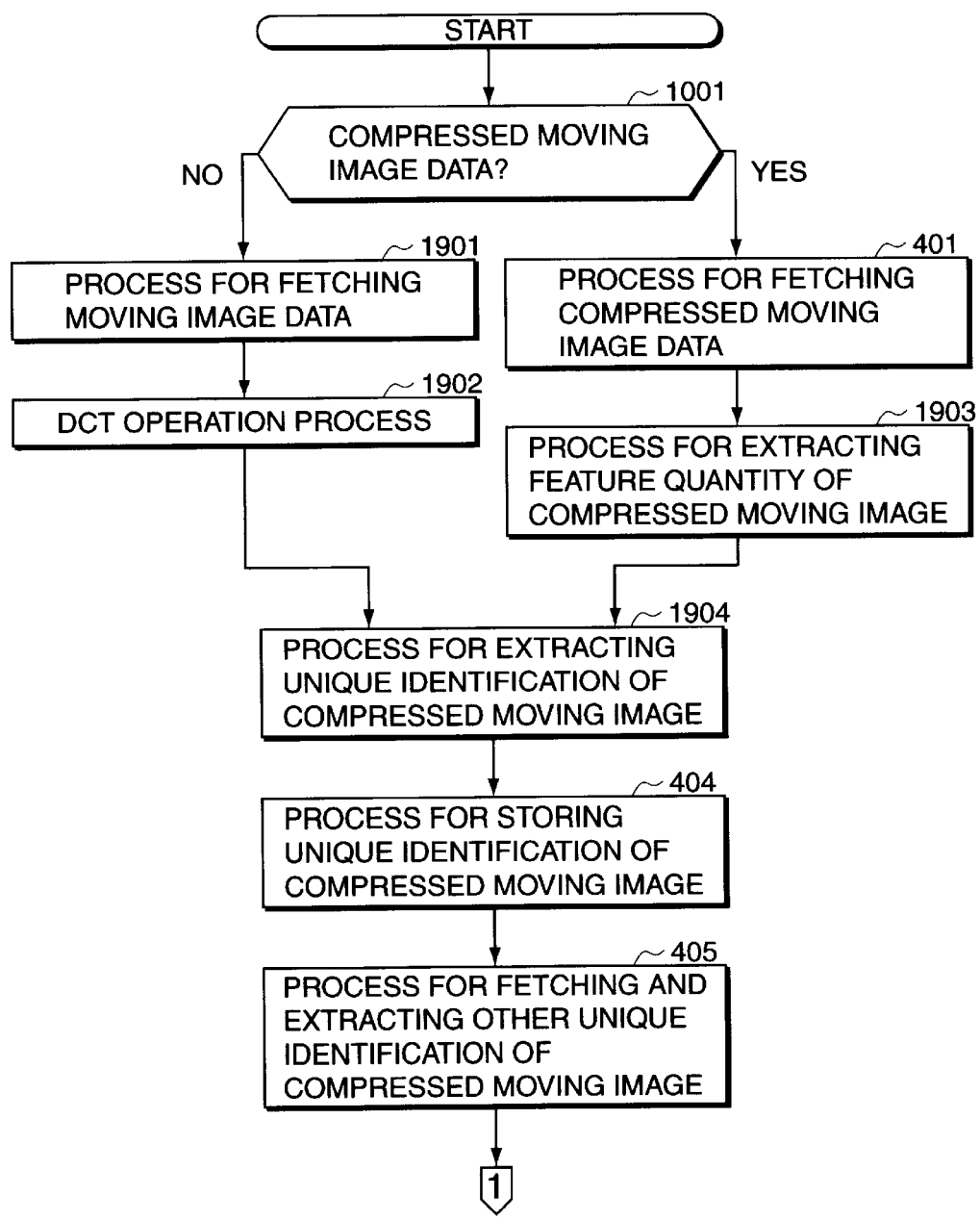
FIG. 19A is a flowchart of the process in the apparatus for retrieving moving image according to the present invention.
Figure 19B:
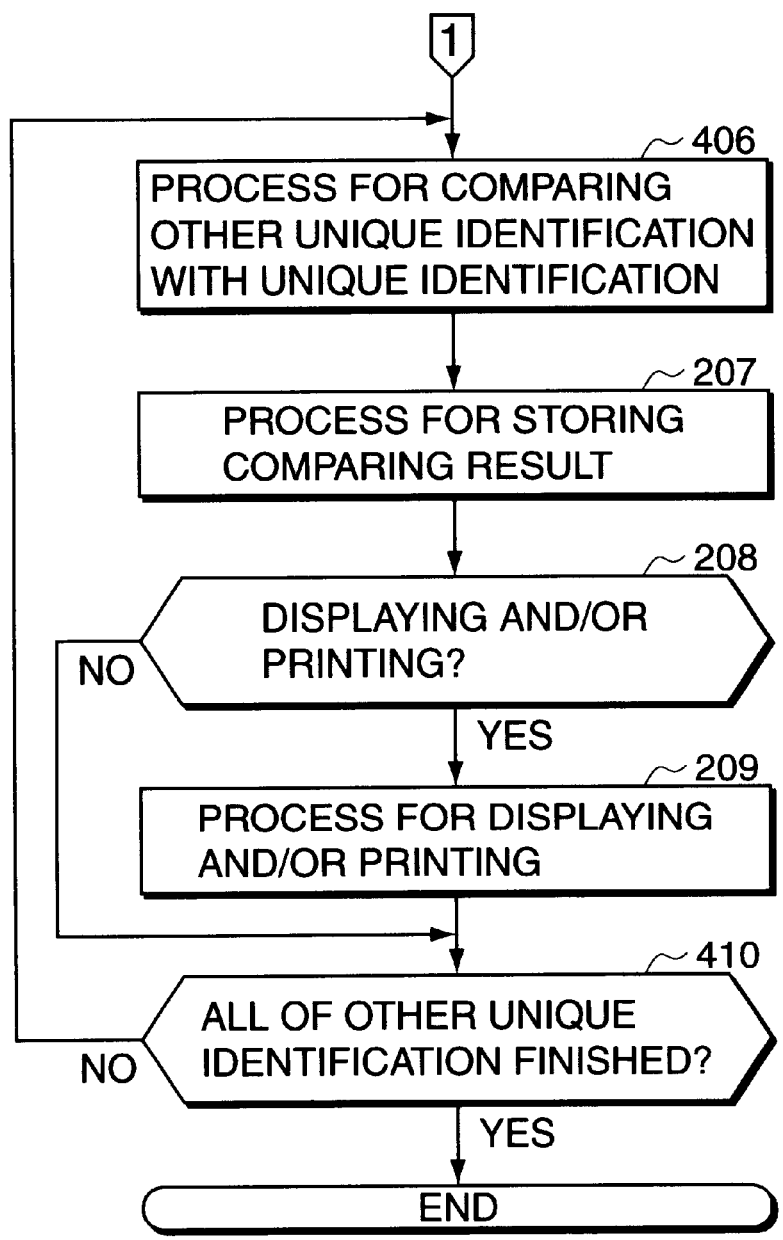
FIG. 19B is a flowchart of the process in the apparatus for retrieving moving image according to the present invention.

FIGS. 19A and 19B are flowcharts of the process in the apparatus for retrieving the moving image according to the present invention described in FIG. 18. Still, an identical step number is appended to the step having the identical process in FIGS. 19A and 19B with FIGS. 10A and 10B. In FIGS. 18, 19A and 19B, at first whether inputted moving image data is compressed is judged. (in the step 1001).

In case the inputted moving image data is the uncompressed moving image data 101, the DCT operation unit 902 fetches the moving image data 101 to be a retrieval key for identifying the moving image (in the step 1901).

The DCT operation unit 902 divides each frame of the moving image data 101 into the M×N (M and N are natural numbers) pixels units, then calculates the DCT coefficient by executing the DCT operation in the M×N pixels unit as the information 303 of the feature quantity of the compressed moving image (in the step 1902).

On the other hand, in case the inputted moving image data is the compressed moving image data 301, the extracting unit 302 for extracting the information of the feature quantity of the compressed moving image fetches the compressed moving image data 301 to be a retrieval key for identifying the compressed moving image (in the step 401). And the extracting unit 302 extracts the information 303 of the feature quantity of the compressed moving image, which includes the DCT coefficients of each frame, from the compressed moving image data 301 as (in the step 1903).

Next, the extracting unit 304 for extracting the information of the unique identification of the compressed moving image calculates values of physical information of the feature quantity of the compressed moving image from the DCT coefficients of each frame, which is included in the information 303 extracted by the extracting unit 902, mean value of the values, total value of the values and/or difference value of the values. And the extracting unit 304 arranges at least one value from the above mentioned values on the time axis and then picks out all values arranged on the time axis, or some values from the values arranged on the time axis at uniform intervals or irregular intervals. And then, the extracting unit 304 extracts the picked out values as the information 305 of the unique identification of the compressed moving image to be used for identifying the compressed moving image (in the step 1904).

The storing unit 306 for storing the information of the unique identification of the compressed moving image stores the information 305 of the unique identification of the compressed moving image extracted by the extracting unit 304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404.

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

The apparatus and the method for retrieving the moving image according to the invention are explained the above. The M×N pixels unit may be made to be a value equal to the pixel unit of the standard compression encoding system such as MPEG.

As mentioned above, according to the ninth embodiment of the invention, by executing the preprocessing on the moving image 101, the information 305 of the unique identification of the compressed moving image for retrieving moving image depends on the content of the moving image data 101 and the compressed moving image data 301 can be extracted by executing the equal process. And, identical moving image can be retrieved and identified from the moving image by using the information 305 of the unique identification of the compressed moving image at the higher speed.

An apparatus and a method for retrieving moving image in the tenth preferred embodiment according to the invention will be explained in FIGS. 20, 21A and 21B.

Figure 20:
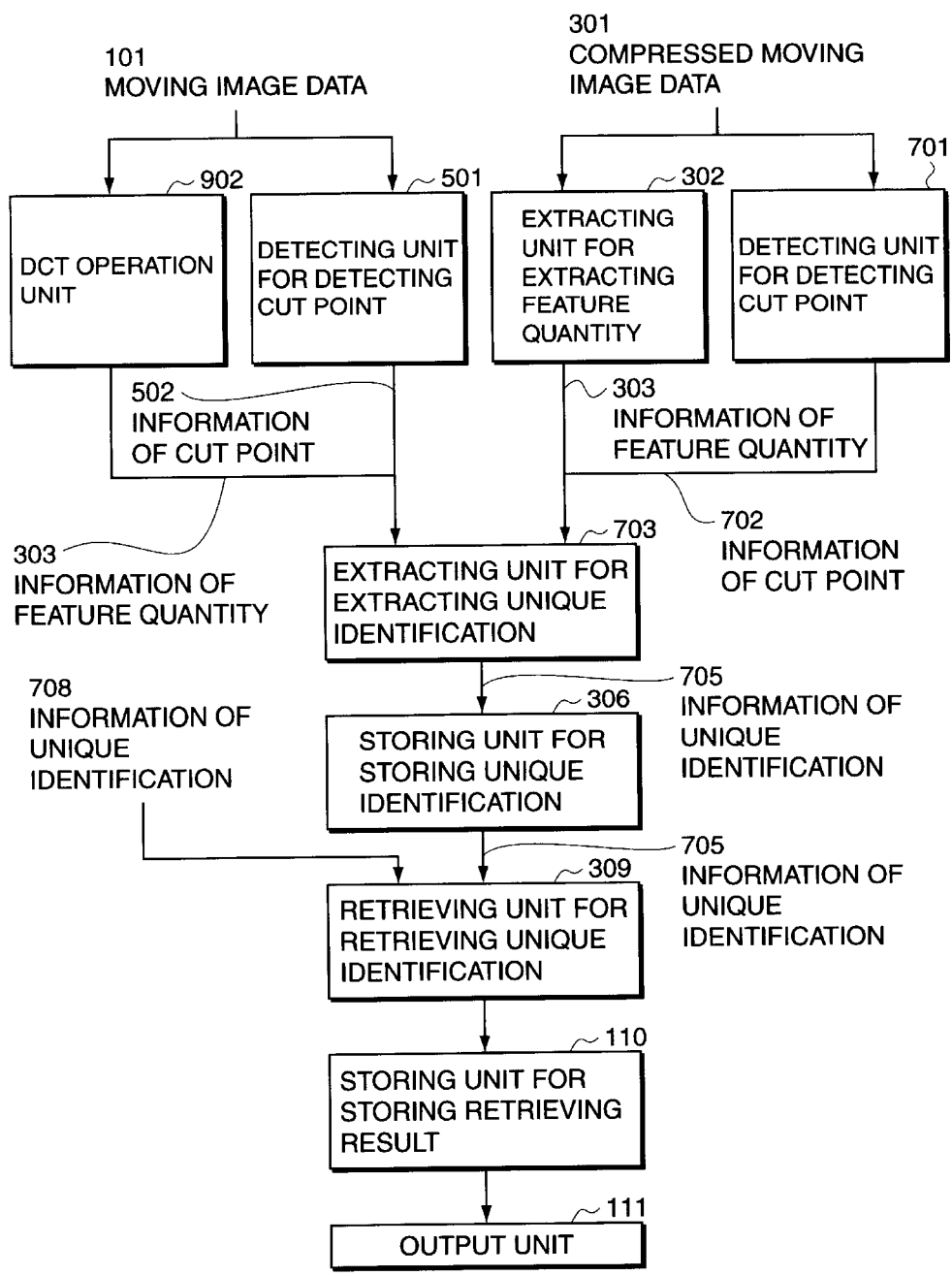
FIG. 20 is a block diagram showing the apparatus for retrieving moving image according to the present invention.

FIG. 20 is a block diagram showing an apparatus for retrieving moving image according to the present invention. Still, an identical code is appended to the thing having the identical composition in FIG. 20 with FIG. 11. In FIG. 20, the apparatus for retrieving moving image comprises a DCT (Discrete Cosine Transform) operation unit 902 for obtaining a DCT coefficient as information 303 of the feature quantity of compressed moving image by executing a DCT operation in the M×N (M and N are natural numbers) pixels unit of moving image data 101, a detecting unit 501 for detecting a cut point of the moving image data 101 as information 502 of a cut point, an extracting unit 302 for extracting information 303 of the feature quantity of compressed moving image, which includes DCT coefficients of each frame, from compressed moving image data 301 provided by the standard compression encoding process for moving image such as MPEG, a detecting unit 701 for detecting a cut point of the compressed moving image data 301 as information 702 of a cut point, an extracting unit 703 for arranging at least one information of feature quantity from the DCT coefficients of each frame, which is included in the information 303 extracted by the DCT operation unit 902 or the extracting unit 302, on the time axis and for extracting information 705 of the unique identification of compressed moving image to identify the compressed moving image from the arrangement of the information of the feature quantity on the time axis in each shot unit of the compressed moving image data 301 divided by using the information 502 of the cut point and/or the information 702 of the cut point, a storing unit 306 for storing the information 705 of the unique identification of the compressed moving image extracted by the extracting unit 703, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 21A:
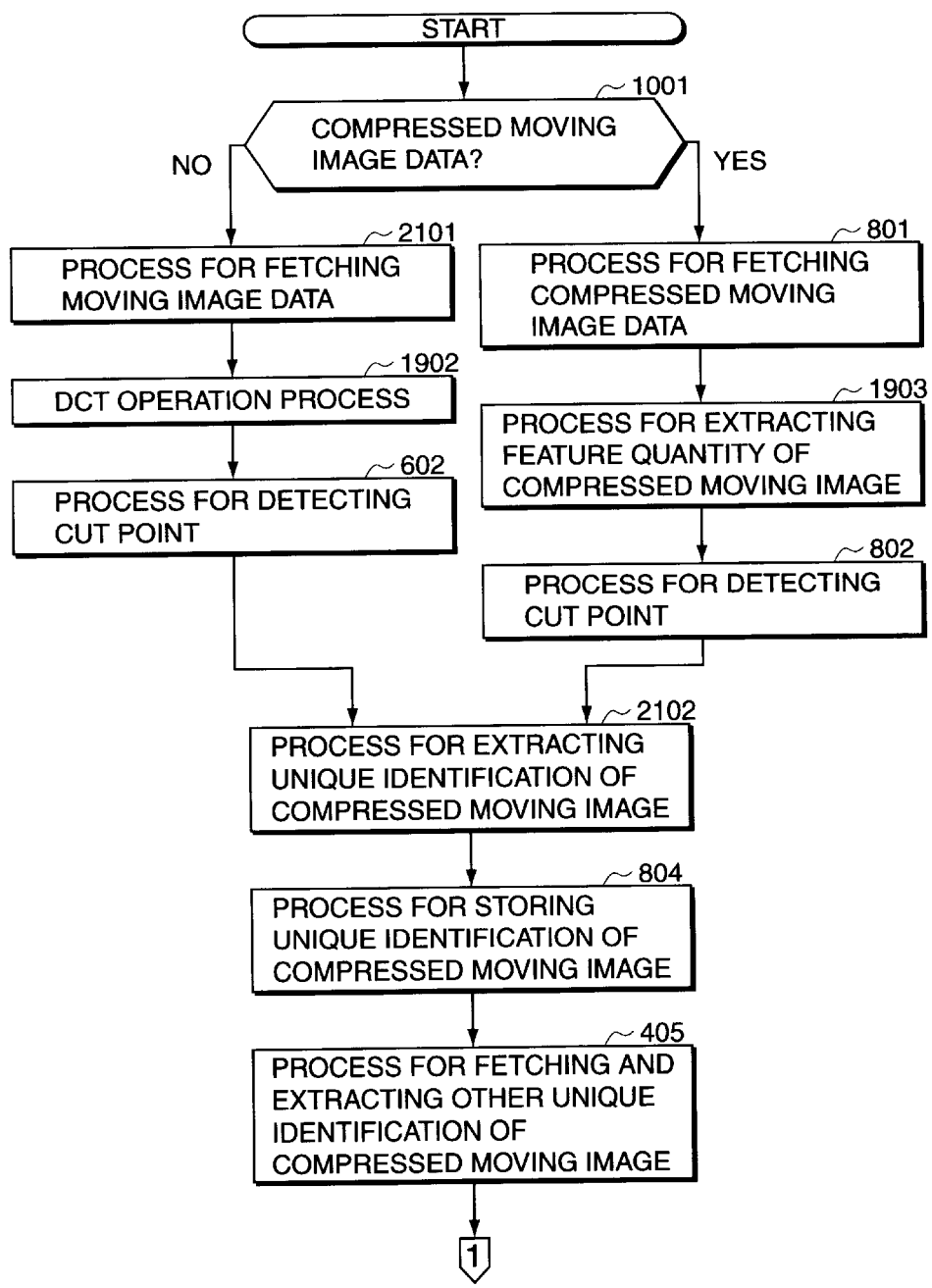
FIG. 21A is a flowchart of the process in the apparatus for retrieving moving image according to the present invention.
Figure 21B:
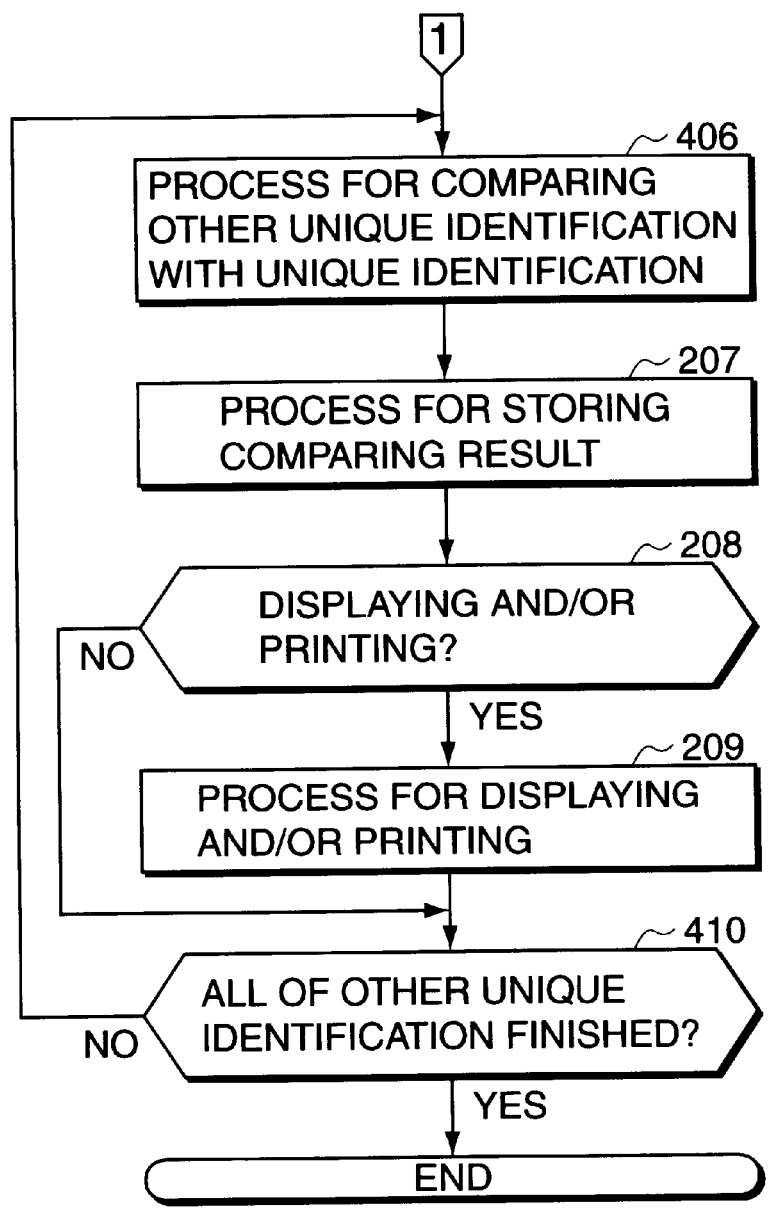
FIG. 21B is a flowchart of the process in the apparatus for retrieving moving image according to the present invention.

FIGS. 21A and 21B are flowcharts of the process in the apparatus for retrieving the moving image according to the present invention described in FIG. 20. Still, an identical step number is appended to the step having the identical process in FIGS. 21A and 21B with FIGS. 12A, 12B, 19A and 19B. In FIGS. 20, 21A and 21B, at first whether inputted moving image data is compressed is judged. (in the step 1001).

In case the inputted moving image data is the uncompressed moving image data 101, the DCT operation unit 902 and the detecting unit 501 for detecting the cut point fetch the moving image data 101 to be a retrieval key for identifying the moving image (in the step 2101).

The DCT operation unit 902 divides each frame of the moving image data 101 into the M×N (M and N are natural numbers) pixels units, then calculates the DCT coefficient by executing the DCT operation in the M×N pixels unit as the information 303 of the feature quantity of the compressed moving image (in the step 1902). On the other hand, the detecting unit 501 for detecting the cut point detects the cut point of the moving image data 101 as the information 502 of the cut point (in the step 602).

The DCT coefficient in the M×N pixels unit provides by the DCT operation unit 902 is sent to the extracting unit 703 for extracting the information of the unique identification of the compressed moving image with the information 502 detected by the detecting unit 501 as the information 303 of the feature quantity of the compressed moving image.

On the other hand, in case the inputted moving image data is the compressed moving image data 301, the extracting unit 302 for extracting the information of the feature quantity of the compressed moving image and the detecting unit 701 for detecting the cut point fetch the compressed moving image data 301 to be a retrieval key for identifying the compressed moving image (in the step 801). Next, the extracting unit 302 extracts the information 303 of the feature quantity of the compressed moving image, which includes the DCT coefficients of each frame, from the compressed moving image data 301 (in the step 1903). And, the detecting unit 701 detects the cut point of the compressed moving image data 301 as the information 702 of the cut point (in the step 802).

Next, the extracting unit 703 for extracting the information of the unique identification of the compressed moving image calculates values of physical information of the feature quantity of the compressed moving image from the DCT coefficients of each frame, which is included in the information 303, mean value of the values, total value of the values and/or difference value of the values. And the extracting unit 703 arranges at least one value from the above mentioned values on the time axis and then picks out all values arranged on the time axis, or some values from the values arranged on the time axis at uniform intervals or irregular intervals. And then, the extracting unit 703 extracts the picked out values in each shot unit of the moving image data 101 divided by using the information 502 or in each shot unit of the compressed moving image data 301 divided by using the information 702 as the information 705 of the unique identification of the compressed moving image to be used for identifying the compressed moving image (in the step 2102).

The storing unit 306 for storing the information of the unique identification of the compressed moving image stores the information 705 of the unique identification of the compressed moving image extracted by the extracting unit 703 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804.

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

The apparatus and the method for retrieving the moving image according to the invention are explained the above. The M×N pixels unit may be made to be a value equal to the pixel unit of the standard compression encoding system such as MPEG.

As mentioned above, according to the tenth embodiment of the invention, by executing the preprocessing on the uncompressed moving image data 101, the information 705 of the unique identification of the compressed moving image for retrieving moving image depends on the content of the moving image 101 and the compressed moving image 301 can be extracted by the equal processing. And, the information 705 for retrieving moving image can be extracted by the less information quantity with utilizing the time concept of the shot according to the information 502 and the information 702. Identical moving image can be retrieved and identified from the moving image by using the information 705 of the unique identification of the compressed moving image at the higher speed.

An apparatus and a method for retrieving moving image in the eleventh preferred embodiment according to the invention will be explained in FIGS. 22, 23A and 23B.

Figure 22:
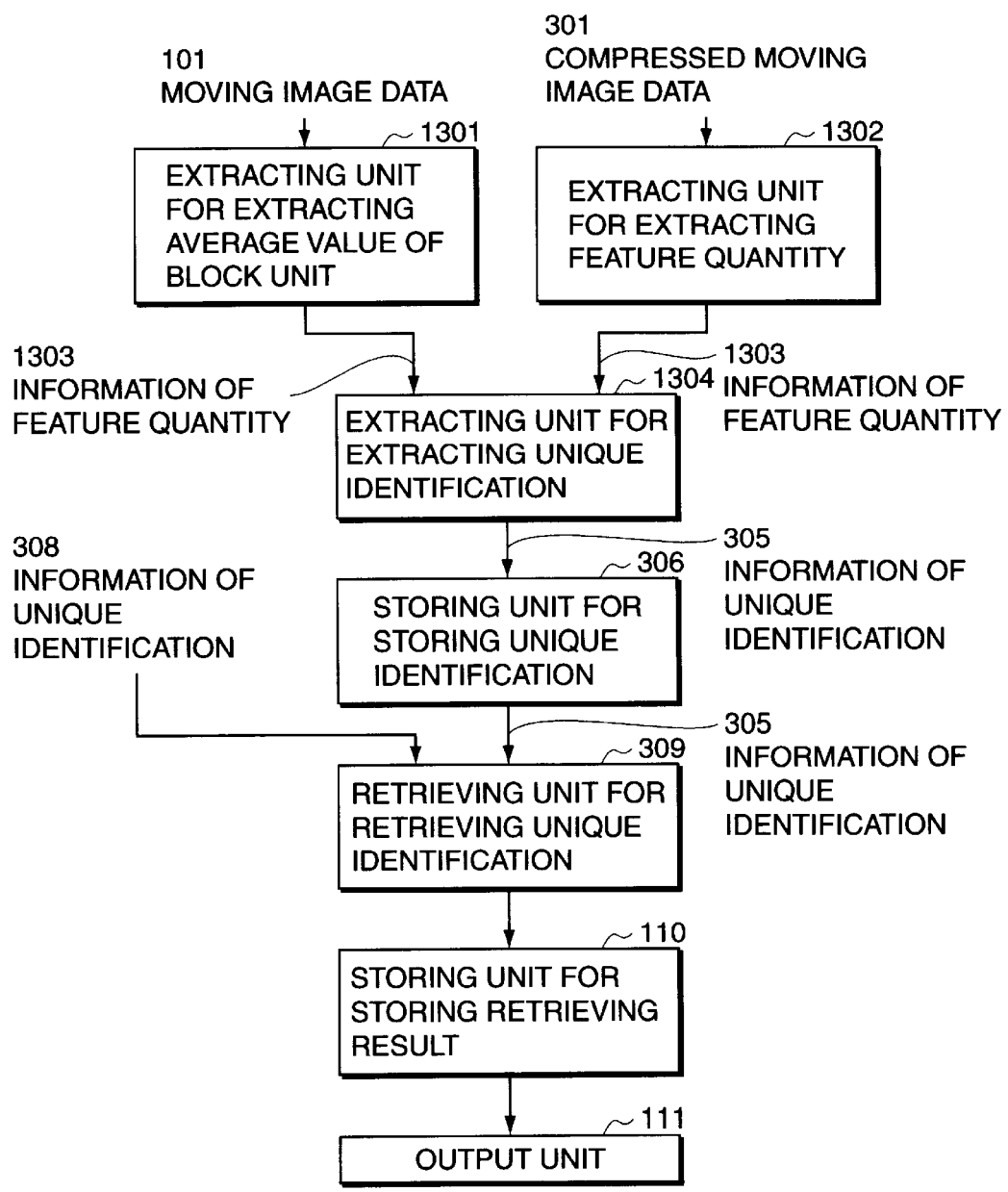
FIG. 22 is a block diagram showing the apparatus for retrieving moving image according to the present invention.

FIG. 22 is a block diagram showing an apparatus for retrieving moving image according to the present invention. Still, an identical code is appended to the thing having the identical composition in FIG. 22 with FIG. 13. In FIG. 22, the apparatus for retrieving moving image comprises an extracting unit 1301 for calculating an average pixel value, such as information of average color (R, G, B) or information of average luminance and average color difference (Y, Cb, Cr), in the M×N (M and N are natural numbers) pixels unit, an extracting unit 1302 for extracting information 1303 of the feature quantity of compressed moving image, which includes DC (Direct Current) components of DCT (Discrete Cosine Transform) coefficients of each frame, from compressed moving image data 301 provided by the standard compression encoding process for moving image such as MPEG, an extracting unit 1304 for arranging at least one information of feature quantity from the DC components of the DCT coefficients of each frame or the average pixel value, which is included in the information 1303 extracted by the extracting unit 1301 and/or the extracting unit 1302, on the time axis and for extracting information 305 of the unique identification of compressed moving image to identify compressed moving image from the arrangement of the information of the feature quantity on the time axis, a storing unit 306 for storing the information 305 of the unique identification of the compressed moving image extracted by the extracting unit 1304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 23A:
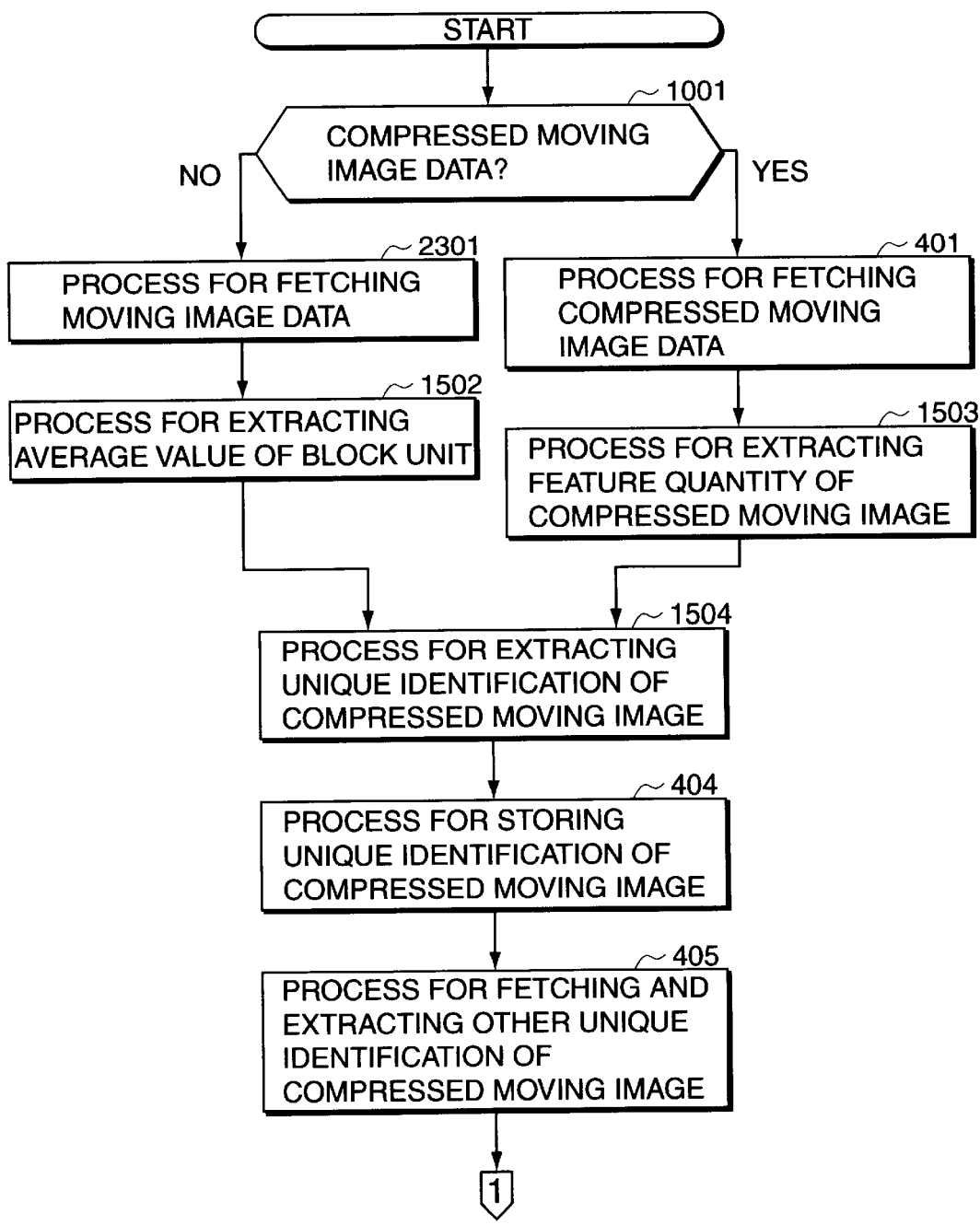
FIG. 23A is a flowchart of the process in the apparatus for retrieving moving image according to the present invention.
Figure 23B:
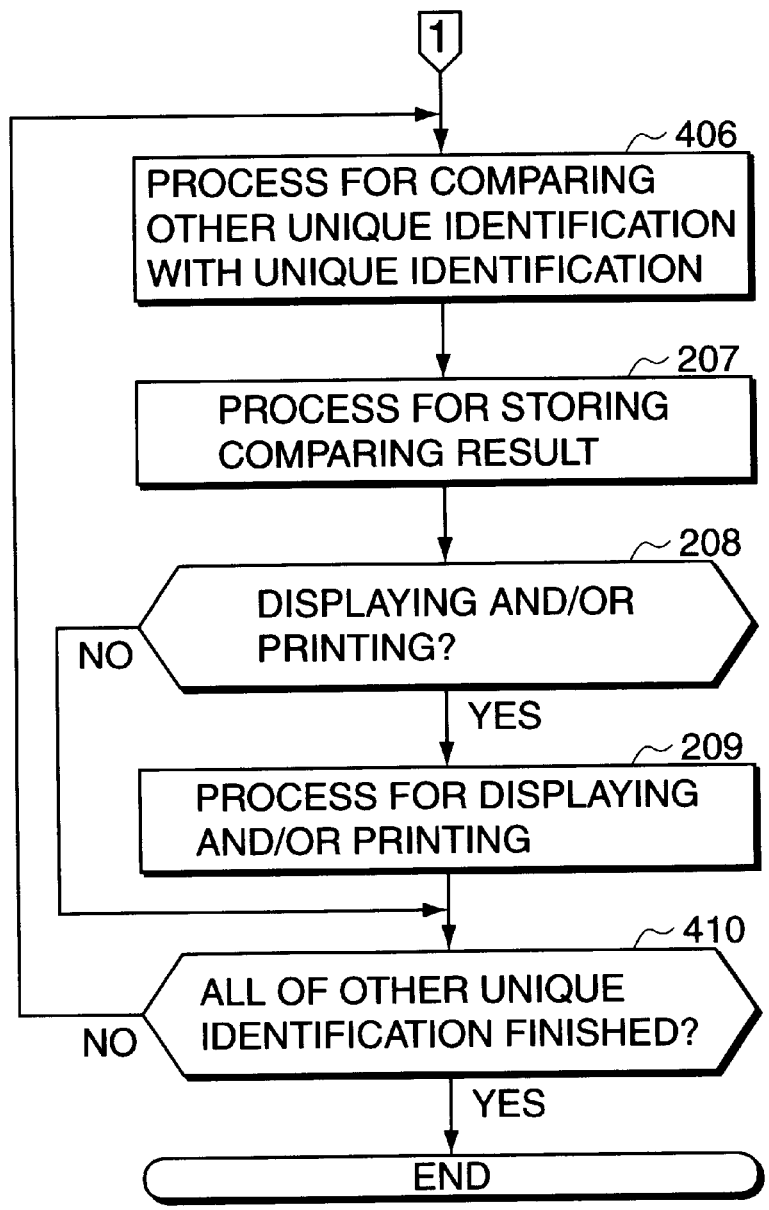
FIG. 23B is a flowchart of the process in the apparatus for retrieving moving image according to the present invention.

FIGS. 23A and 23B are flowcharts of the process in the apparatus for retrieving the moving image according to the present invention described in FIG. 22. Still, an identical step number is appended to the step having the identical process in FIGS. 23A and 23B with FIGS. 15A and 15B. In FIGS. 22, 23A and 23B, at first whether inputted moving image data is compressed is judged. (in the step 1001).

In case the inputted moving image data is the uncompressed moving image data 101, the extracting unit 1301 for extracting the average value of the block unit fetches the moving image data 101 to be a retrieval key for identifying the moving image (in the step 2301).

The extracting unit 1301 divides each frame of the moving image data 101 into the M×N (M and N are natural numbers) pixels units, then calculates the average pixel value in the M×N pixels unit as the information 1303 of the feature quantity of the compressed moving image (in the step 1502).

On the other hand, in case the inputted moving image data is the compressed moving image data 301, the extracting unit 1302 for extracting the information of the feature quantity of the compressed moving image fetches the compressed moving image data 301 to be a retrieval key for identifying the compressed moving image (in the step 401). Then, the extracting unit 1302 extracts the information 1303 of the feature quantity of the compressed moving image, which includes the DC components of the DCT coefficients of each frame, from the compressed moving image data 301 (in the step 1503).

Next, the extracting unit 1304 for extracting the information of the unique identification of the compressed moving image calculates values of physical information of the feature quantity of compressed moving image from the DC components of the DCT coefficients of each frame and/or values of the average pixel value of each frame, which are included in the information 1303, mean value of the values, total value of the values and/or difference value of the values. And the extracting unit 1304 arranges at least one value from the above mentioned values on the time axis and then picks out all values arranged on the time axis, or some values from the values arranged on the time axis at uniform intervals or irregular intervals. And then, the extracting unit 1304 extracts the picked out values as the information 305 of the unique identification of the compressed moving image to be used for identifying the compressed moving image (in the step 1504).

The storing unit 306 for storing the information of the unique identification of the compressed moving image stores the information 305 of the unique identification of the compressed moving image extracted by the extracting unit 1304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404.

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

The apparatus and the method for retrieving the moving image according to the invention are explained the above. The above mentioned extracting unit 1304 calculates values of the physical information of the feature quantity of the compressed moving image from the DC components of the DCT coefficients of each frame or values of the average pixel value of each frame, which are included in the information 1303, mean value of the values, total value of the values and/or difference value of the values. However, the extracting unit 1304 may calculate the above mentioned values by using a part or multiple parts of the physical information of the feature quantity of the compressed moving image from the DC components of the DCT coefficients of each frame or the average pixel value of each frame, which are included in the information 1303.

And more, the extracting unit 1304 may execute the weighting on the physical information of the feature quantity of the compressed moving image from the DC components of the DCT coefficients of each frame or the average pixel value of each frame, which are included in the information 1303, then may calculate the above mentioned values by the weighted information of the feature quantity of the compressed moving image or the weighted average pixel value.

Moreover, in the extracting unit 1304, values provided by quantizing the above mentioned physical information or average pixel value or the like may be applied.

Further more, the M×N pixels unit may be made to be a value equal to the pixel unit of the standard compression encoding system such as MPEG.

As mentioned above, according to the eleventh embodiment of the invention, by executing the preprocessing on the moving image, the information 305 of the unique identification of the compressed moving image for retrieving the moving image depends on the content of the moving image data 101 and the compressed moving image data 301 can be extracted by the less information quantity and by executing the equal process for the moving image data 101 and the compressed moving image data 301. And, identical moving image can be retrieved and identified from the moving image by using the information 305 of the unique identification of the compressed moving image at the higher speed.

An apparatus and a method for retrieving moving image in the twelfth preferred embodiment according to the invention will be explained in FIGS. 24, 25A and 25B.

Figure 24:
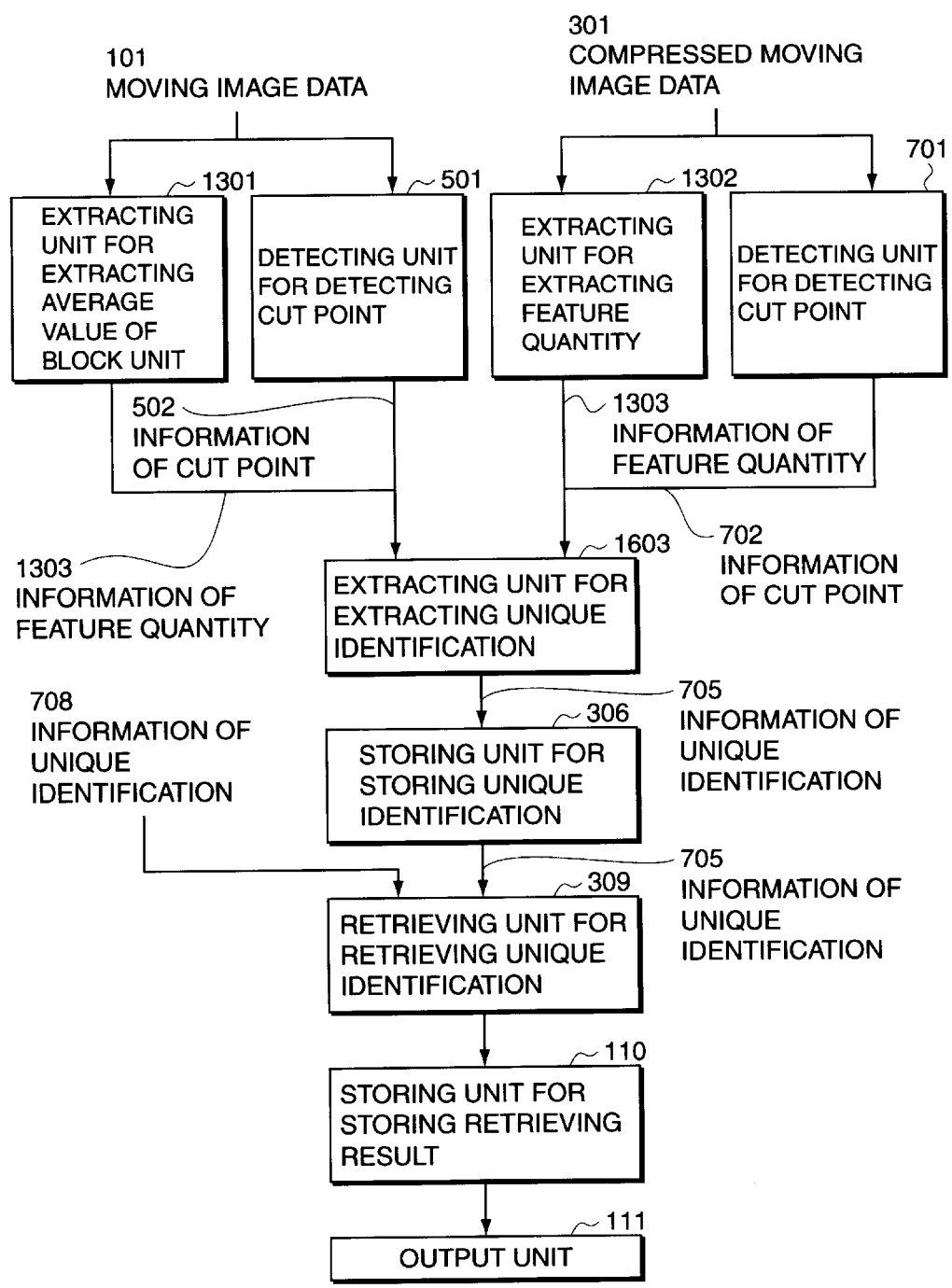
FIG. 24 is a block diagram showing the apparatus for retrieving moving image according to the present invention.

FIG. 24 is a block diagram showing an apparatus for retrieving moving image according to the present invention. Still, an identical code is appended to the thing having the identical composition in FIG. 24 with FIG. 16. In FIG. 24, the apparatus for retrieving moving image comprises an extracting unit 1301 for calculating an average pixel value, such as information of average color (R, G, B) or information of average luminance and average color difference (Y, Cb, Cr), in the M×N (M and N are natural numbers) pixels unit of moving image data 101 as information 1303 of the feature quantity of compressed moving image, a detecting unit 501 for detecting a cut point of the moving image data 101 as information 502 of a cut point, an extracting unit 1302 for extracting information 1303 of the feature quantity of compressed moving image, which includes DC (Direct Current) components of DCT (Discrete Cosine Transform) coefficients of each frame, from compressed moving image data 301 provided by the standard compression encoding process for moving image such as MPEG, a detecting unit 701 for detecting a cut point of the compressed moving image data 301 as information 702 of a cut point, an extracting unit 1603 for arranging at least one information of feature quantity from the DC components of the DCT coefficients of each frame or the average pixel value, which is included in the information 1303 extracted by the extracting unit 1301 and/or the extracting unit 1302, on the time axis and for extracting information 705 of the unique identification of compressed moving image to identify the compressed moving image from the arrangement of the information of the feature quantity on the time axis in each shot unit of the moving image data 101 divided by using the information 502 of the cut point or in each shot unit of the compressed moving image data 301 divided by using the information 702 of the cut point, a storing unit 306 for storing the information 705 of the unique identification of the compressed moving image extracted by the extracting unit 1603, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110. On the apparatus for retrieving the moving image according to the present invention constituted like the above, an operation will be explained in the following.

Figure 25A:
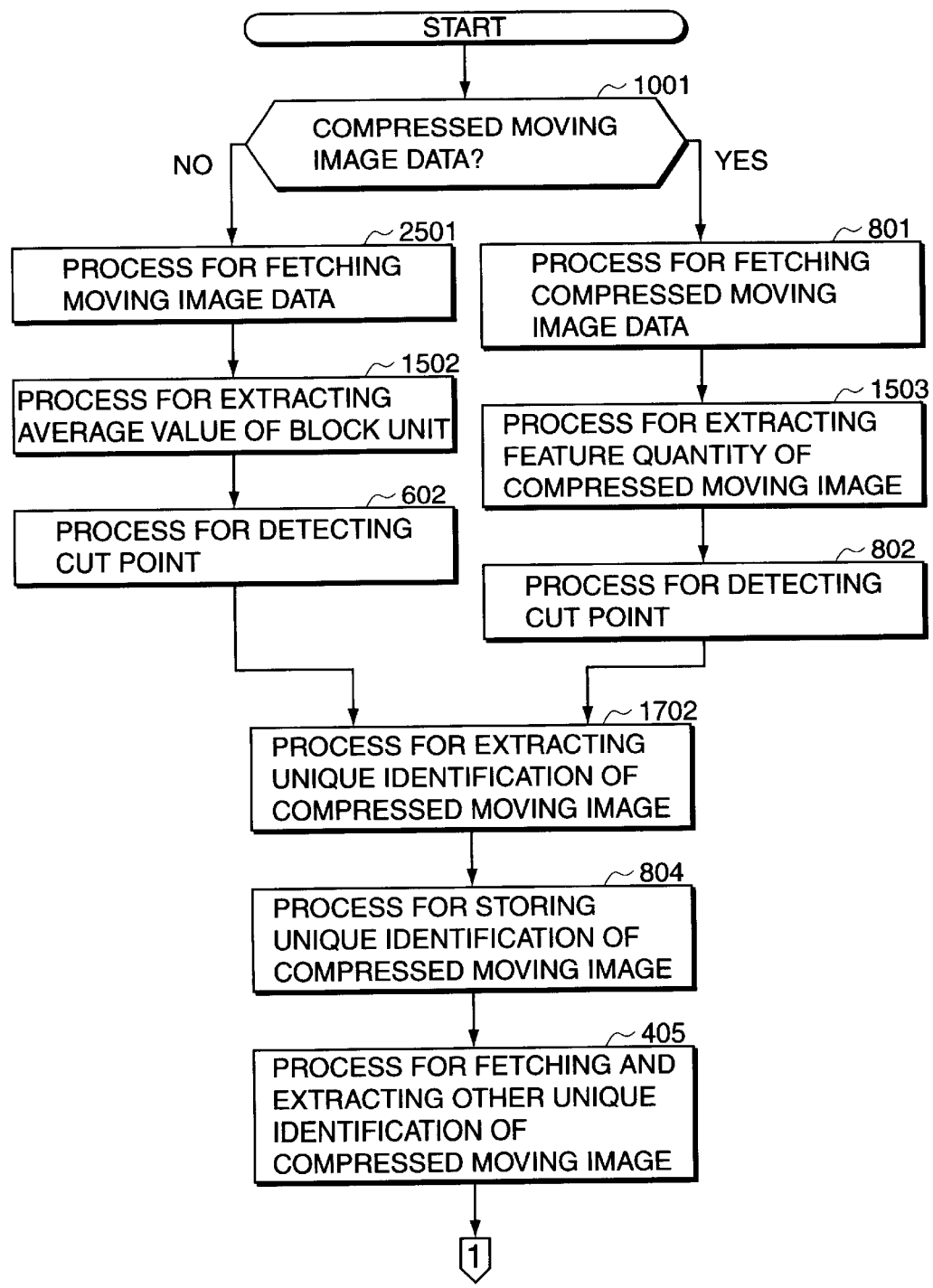
FIG. 25A is a flowchart of the process in the apparatus for retrieving moving image according to the present invention.
Figure 25B:
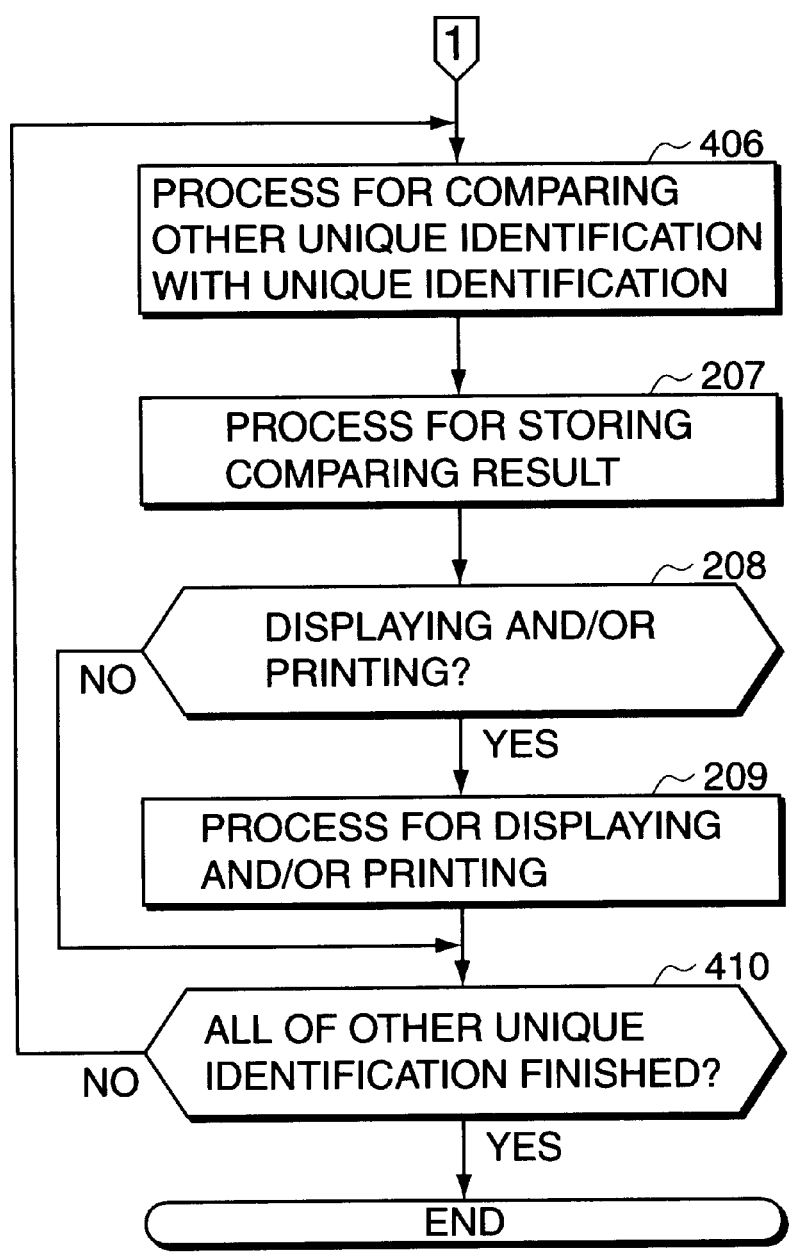
FIG. 25B is a flowchart of the process in the apparatus for retrieving moving image according to the present invention.

FIGS. 25A and 25B are flowcharts of the process in the apparatus for retrieving the moving image according to the present invention described in FIG. 24. Still, an identical step number is appended to the step having the identical process in FIGS. 25A and 25B with FIGS. 17A and 17B. In FIGS. 24, 25A and 25B, at first whether inputted moving image data is compressed is judged (in the step 1001).

In case the inputted moving image data is the uncompressed moving image data 101, the extracting unit 1301 for extracting the average value of the block unit and the detecting unit 501 for detecting the cut point fetch the moving image data 101 to be a retrieval key for identifying the moving image (in the step 2501).

The extracting unit 1301 divides each frame of the moving image data 101 into the M×N (M and N are natural numbers) pixels units, then calculates the average pixel value in the M×N pixels unit (in the step 1502). And, the detecting unit 501 detects the cut point of the moving image data 101 as the information 502 of the cut point (in the step 602).

On the other hand, in case the inputted moving image data is the compressed moving image data 301, the extracting unit 1302 for extracting the information of the feature quantity of the compressed moving image and the detecting unit 701 for detecting the cut point fetch the compressed moving image data 301 to be a retrieval key for identifying the compressed moving image (in the step 801). Then, the extracting unit 1302 extracts the information 1303 of the feature quantity of the compressed moving image, which includes the DC components of the DCT coefficients of each frame, from the compressed moving image data 301 (in the step 1503). And, the detecting unit 701 detects the cut point of the compressed moving image data 301 as the information 702 of the cut point (in the step 802).

Next, the extracting unit 1603 for extracting the information of the unique identification of the compressed moving image calculates values of physical information of the feature quantity of compressed moving image from the DC components of the DCT coefficients of each frame and/or the average pixel value of each frame, which are included in the information 1303, mean value of the values, total value of the values and/or difference value of the values. And the extracting unit 1603 arranges at least one value from the above mentioned values on the time axis and then picks out all values arranged on the time axis, or some values from the values arranged on the time axis at uniform intervals or irregular intervals. And then, the extracting unit 1603 extracts the picked out values in each shot unit of the moving image data 101 divided by using the information 502 of the cut point or in each shot unit of the compressed moving image data 301 divided by using the information 702 of the cut point as the information 705 of the unique identification of the compressed moving image to be used for identifying the compressed moving image (in the step 1702).

The storing unit 306 for storing the information of the unique identification of the compressed moving image stores the information 705 of the unique identification of the compressed moving image extracted by the extracting unit 1603 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804.

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

The apparatus and the method for retrieving the moving image according to the invention are explained the above. The M×N pixels unit may be made to be a value equal to the pixel unit of the standard compression encoding system such as MPEG.

As mentioned above, according to the twelfth embodiment of the invention, by utilizing the time concept of the shot according to the information of the cut point and executing the simple preprocessing on the moving image, the information 1303 of the unique identification of the compressed moving image for retrieving the moving image depends on the content of the moving image data 101 and the compressed moving image data 301 can be extracted by the less information quantity and by executing the equal process for the moving image data 101 and the compressed moving image data 301. And, identical moving image can be retrieved and identified from the moving image by using the information 1303 of the unique identification of the compressed moving image at the higher speed.

An apparatus and a method for retrieving moving image in the thirteenth preferred embodiment according to the invention will be explained in FIGS. 26, 27A and 27B.

Figure 26:
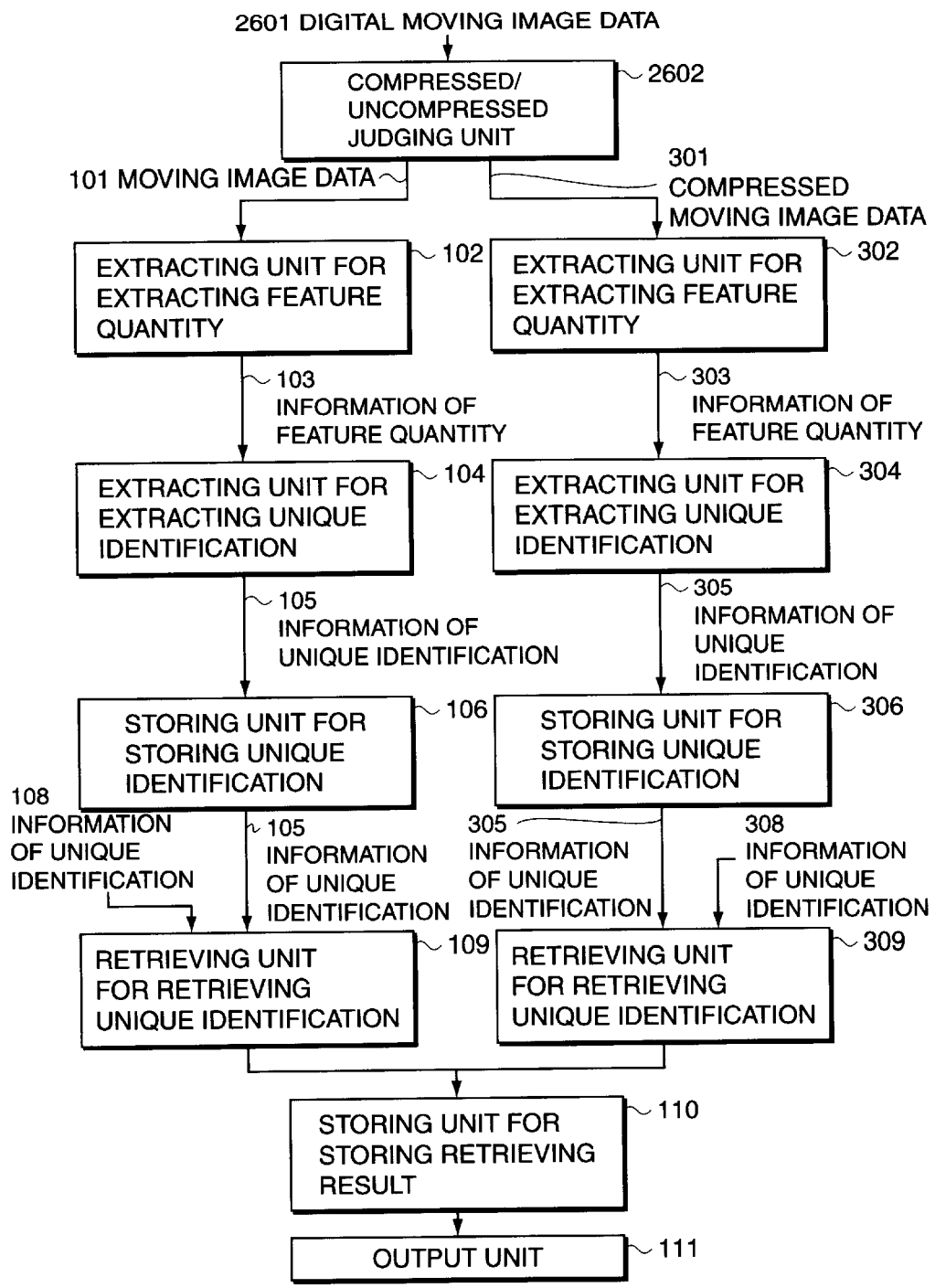
FIG. 26 is a block diagram showing the apparatus for retrieving moving image according to the present invention.

FIG. 26 is a block diagram showing an apparatus for retrieving moving image according to the present invention. Still, an identical code is appended to the thing having the identical composition in FIG. 26 with FIG. 1 and FIG. 3. In FIG. 26, the apparatus for retrieving moving image comprises an extracting unit 102 for extracting information 103 of the feature quantity of moving image, which includes physical information of the feature quantity of moving image such as information of luminance and color difference (Y, Cb, Cr) of each frame and/or information of color (R, G, B) of each frame, from moving image data 101, an extracting unit 104 for arranging at least one physical information included in the information 103 (such as the information of the luminance and the color difference (Y, Cb, Cr) of each frame and/or the information of the color (R, G, B) of each frame) on the time axis and for extracting information 105 of the unique identification of moving image to identify the moving image from the arrangement of the physical information on the time axis, a storing unit 106 for storing the information 105 of the unique identification of the moving image extracted by the extracting unit 104, a retrieving unit 109 for retrieving identical information with the information 105 of the unique identification of the moving image stored in the storing unit 106 from information 108 of the unique identification of moving image beforehand extracted from other moving image data, an extracting unit 302 for extracting information 303 of the feature quantity of compressed moving image, which includes DCT (Discrete Cosine Transform) coefficients of each frame and information of motion compensation of each frame, from compressed moving image data 301 provided by the standard compression encoding process for moving image such as MPEG, an extracting unit 304 for arranging at least one information of feature quantity from the DCT coefficients of each frame and the information of the motion compensation of each frame, which are included in the information 303, on the time axis and for extracting information 305 of the unique identification of compressed moving image to identify the compressed moving image from the arrangement of the information of the feature quantity on the time axis, a storing unit 306 for storing the information 305 of the unique identification of the compressed moving image extracted by the extracting unit 304, a retrieving unit 309 for retrieving identical information with the information 305 of the unique identification of the compressed moving image stored in the storing unit 306 from information 308 of the unique identification of compressed moving image beforehand extracted from other moving image data, a judging unit 2602 for judging whether inputted digital moving image data 2601 is the moving image data 101 or the compressed moving image data 301 and for outputting the moving image data 101 to the extracting unit 102 and the compressed moving image data 301 to the extracting unit 302, a storing unit 110 for storing a retrieving result provided by the retrieving unit 109 and/or by the retrieving unit 309, and an output unit 111 for displaying and/or printing the retrieving result stored in the storing unit 110.

Figure 27A:
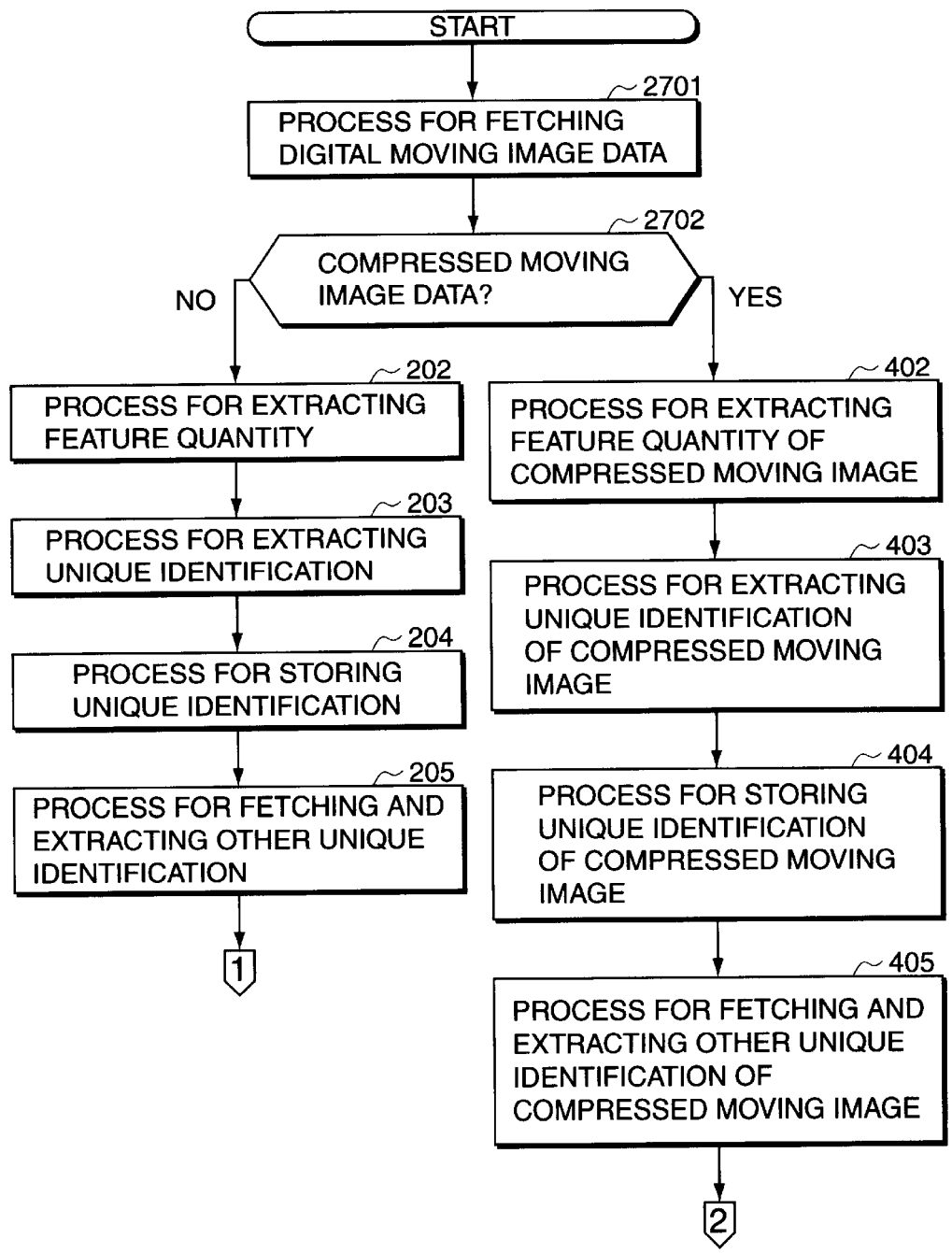
FIG. 27A is a flowchart of the process in the apparatus for retrieving moving image according to the present invention.
Figure 27B:
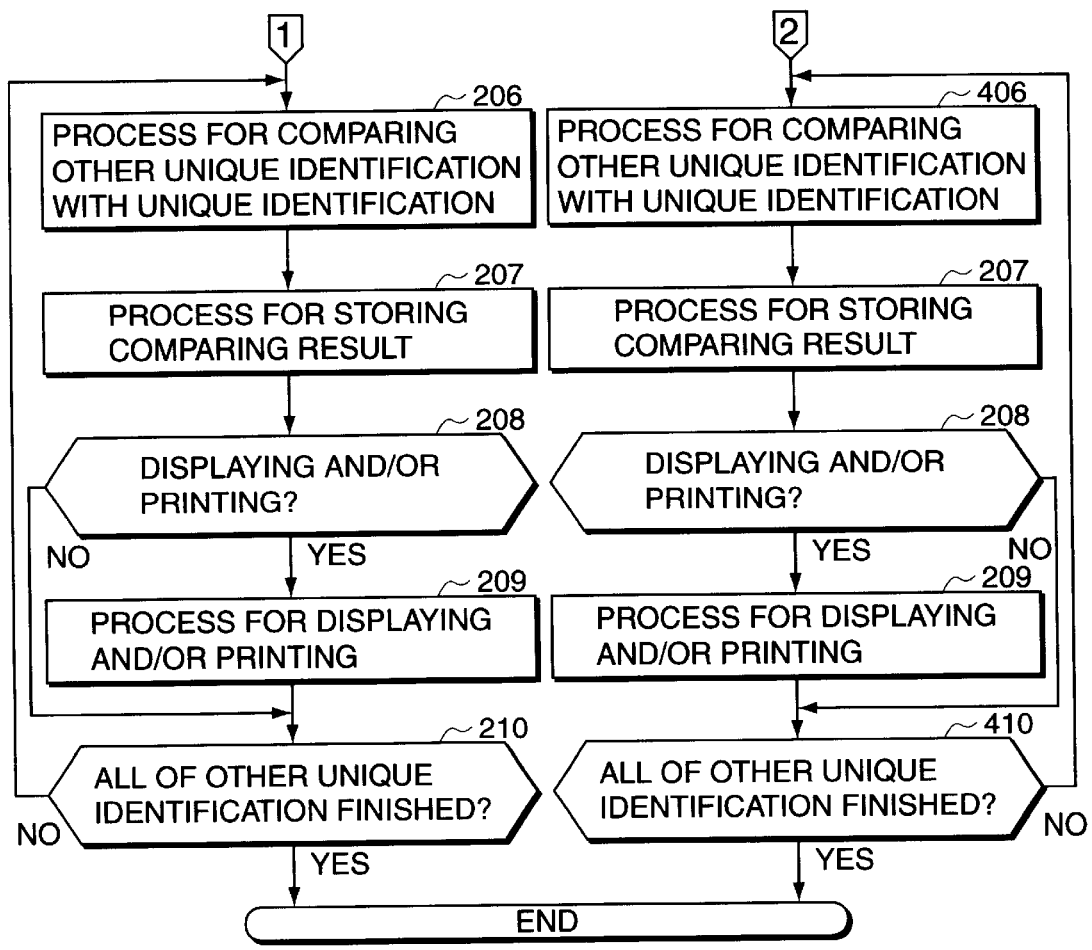
FIG. 27B is a flowchart of the process in the apparatus for retrieving moving image according to the present invention.

FIGS. 27A and 27B are flowcharts of the process in the apparatus for retrieving the moving image according to the present invention described in FIG. 26. Still, an identical step number is appended to the step having the identical process in FIGS. 27A and 27B with FIGS. 2A, 2B, 4A and 4B. In FIGS. 26, 27A and 27B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the following process (the steps 202 to 210) is executed.

The extracting unit 102 extracts the information 103 of the feature quantity of the moving image, which includes the physical information of the feature quantity of the moving image such as the information of the luminance and the color difference (Y, Cb, Cr) of each frame and/or the information of the color (R, G, B) of each frame, from the moving image data 101 (in the step 202).

Next, the extracting unit 104 for extracting the information of the unique identification of the moving image arranges at least one value from values of the physical information of the feature quantity of the moving image (such as the information of the luminance and the color difference (Y, Cb, Cr) of each frame and/or the information of the color (R, G, B) of each frame) based on the information 103, mean value of the values, total value of the values and/or difference value of the values on the time axis. Then, the extracting unit 104 picks out all values arranged on the time axis, or some values from the values arranged on the time axis at uniform intervals or irregular intervals. And then, the extracting unit 104 extracts the picked out values as the information 105 of the unique identification of the moving image to be used for identifying the moving image (in the step 203).

The storing unit 106 for storing the information of the unique identification of the moving image stores the information 105 of the unique identification of the moving image extracted by the extracting unit 104 (in the step 204).

On the other hand, the information 108 of the unique identification of the moving image is extracted from other moving image data (the object moving image data for retrieving) (in the step 205). This extracting process can be executed by the processing equal to the foregoing steps 201 to 204 (in FIGS. 2A and 2B).

Then, the retrieving unit 109 for retrieving the information of the unique identification of the moving image compares the information 105 of the unique identification of the moving image stored in the storing unit 106 with the information 108 of the unique identification of the moving image extracted from the other moving image data (in the step 206).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 206 to 209 is executed for all of the information 108 of the unique identification of the moving image extracted from the other moving image data (in the step 210).

In case the digital moving image data 2601 is the compressed moving image data 301, the following process (the steps 402 to 410) is executed.

The extracting unit 302 extracts the information 303 of the feature quantity of the compressed moving image, which includes the DCT coefficients of each frame and the information of the motion compensation of each frame, from the compressed moving image data 301 (in the step 402).

Next, the extracting unit 304 for extracting the information of the unique identification of the compressed moving image calculates values of physical information of the feature quantity of the compressed moving image from the DCT coefficients of each frame, which is included in the information 303, mean value of the values, total value of the values and/or difference value of the values. On the other hand, the extracting unit 304 calculates values such as a motion vector, a mean motion vector between frames before and behind, a total motion vector, a difference vector and/or a motion vector on a whole frame from the information of the motion compensation. And the extracting unit 304 arranges at least one value from the above mentioned values on the time axis and then picks out all values arranged on the time axis, or some values from the values arranged on the time axis at uniform intervals or irregular intervals. And then, the extracting unit 304 extracts the picked out values as the information 305 of the unique identification of the compressed moving image to be used for identifying the compressed moving image (in the step 403).

The storing unit 306 for storing the information of the unique identification of the compressed moving image stores the information 305 of the unique identification of the compressed moving image extracted by the extracting unit 304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 401 to 404 (in FIGS. 4A and 4B).

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

As mentioned above, according to the thirteenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of image data to be retrieved.

An apparatus and a method for retrieving moving image in the fourteenth preferred embodiment according to the invention will be explained in FIGS. 28, 29A and 29B.

Figure 28:
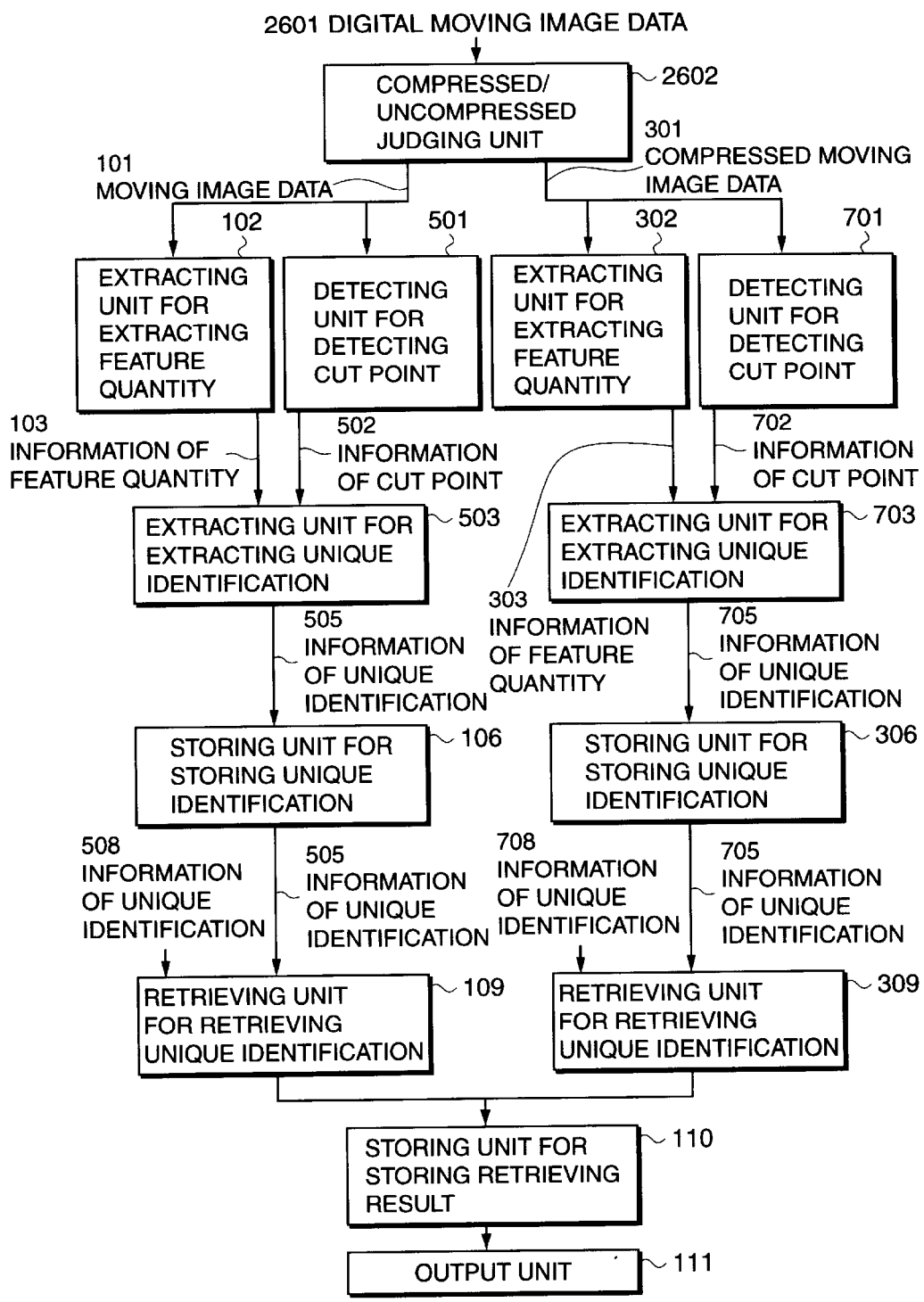
FIG. 28 is a block diagram showing the apparatus for retrieving moving image according to the present invention.

FIG. 28 is a block diagram showing an apparatus for retrieving moving image according to the present invention. Still, an identical code is appended to the thing having the identical composition in FIG. 28 with FIG. 5 and FIG. 7. In FIG. 28, the apparatus for retrieving moving image comprises an extracting unit 102 for extracting information 103 of the feature quantity of moving image, which includes physical information of the feature quantity of moving image such as information of luminance and color difference (Y, Cb, Cr) of each frame and/or information of color (R, G, B) of each frame, from moving image data 101, a detecting unit 501 for detecting a cut point of the moving image data 101 as information 502 of a cut point, an extracting unit 503 for arranging at least one physical information included in the information 103 (such as the information of the luminance and the color difference (Y, Cb, Cr) of each frame and/or the information of the color (R, G, B) of each frame) on the time axis and for extracting information 505 of the unique identification of moving image to identify the moving image in each shot unit of the moving image data 101 divided by using the information 502 of the cut point from the arrangement of the physical information on the time axis, a storing unit 106 for storing the information 505 of the unique identification of the moving image extracted by the extracting unit 503, a retrieving unit 109 for retrieving identical information with the information 505 of the unique identification of the moving image stored in the storing unit 106 from information 508 of the unique identification of moving image beforehand extracted from other moving image data, an extracting unit 302 for extracting information 303 of the feature quantity of compressed moving image, which includes DCT (Discrete Cosine Transform) coefficients of each frame and information of motion compensation of each frame, from compressed moving image data 301 provided by the standard compression encoding process for moving image such as MPEG, a detecting unit 701 for detecting a cut point of the compressed moving image data 301 as information 702 of a cut point, an extracting unit 703 for arranging at least one information of feature quantity from the DCT coefficients of each frame and the information of the motion compensation of each frame, which are included in the information 303, on the time axis and for extracting information 705 of the unique identification of compressed moving image to identify the compressed moving image from the arrangement of the information of the feature quantity on the time axis in each shot unit of the compressed moving image data 301 divided by using the information 702 of the cut point, a storing unit 306 for storing the information 705 of the unique identification of the compressed moving image extracted by the extracting unit 703, a retrieving unit 309 for retrieving identical information with the information 705 of the unique identification of the compressed moving image stored in the storing unit 306 from information 708 of the unique identification of compressed moving image beforehand extracted from other moving image data, a judging unit 2602 for judging whether inputted digital moving image data 2601 is the moving image data 101 or the compressed moving image data 301 and for outputting the moving image data 101 to the extracting unit 102 and the compressed moving image data 301 to the extracting unit 302, a storing unit 110 for storing the retrieving result provided by the retrieving unit 109 and/or the retrieving unit 309, and an output unit 111 for displaying and/or printing the retrieving result stored in the storing unit 110.

Figure 29A:
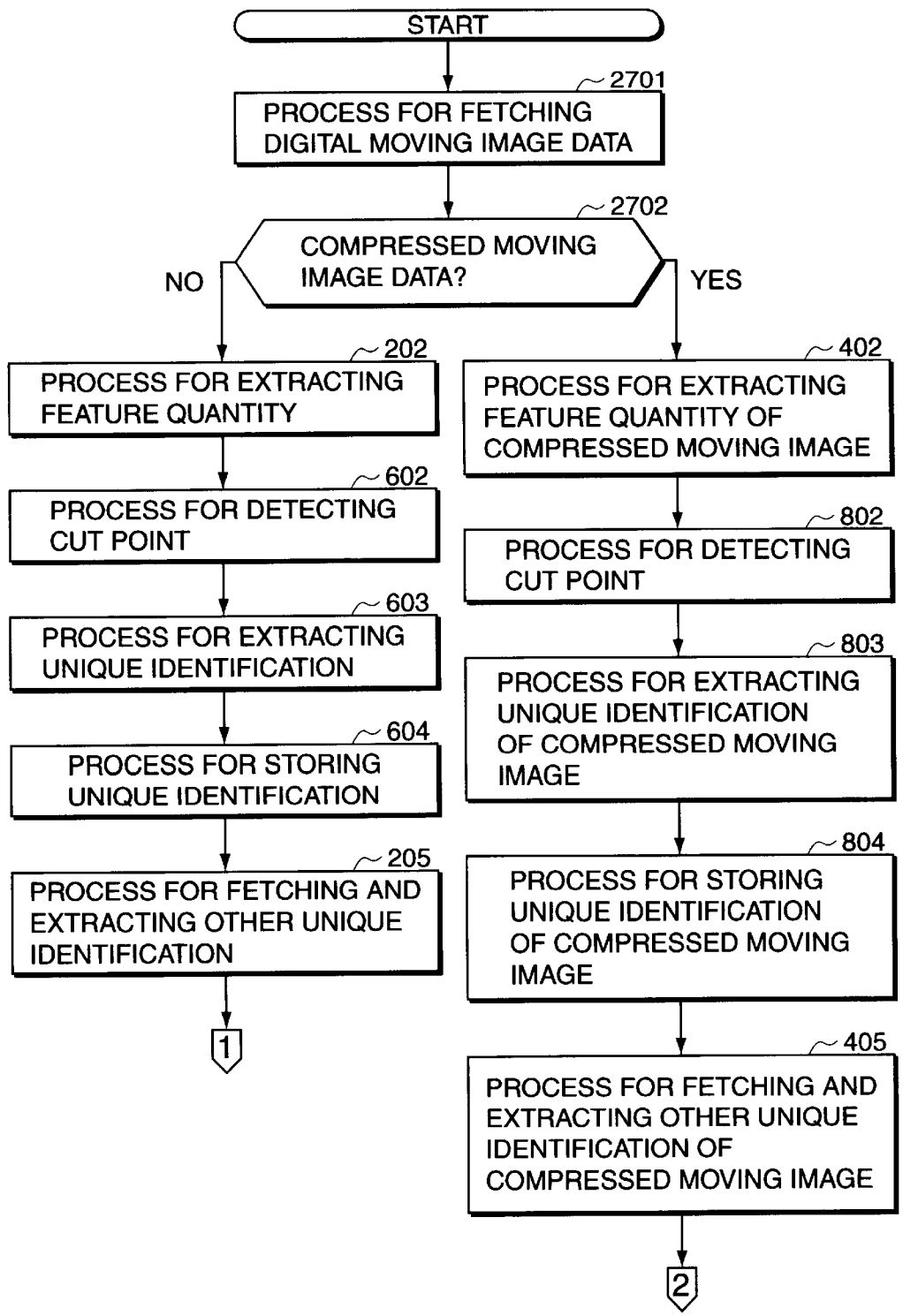
FIG. 29A is a flowchart of the process in the apparatus for retrieving moving image according to the present invention.
Figure 29B:
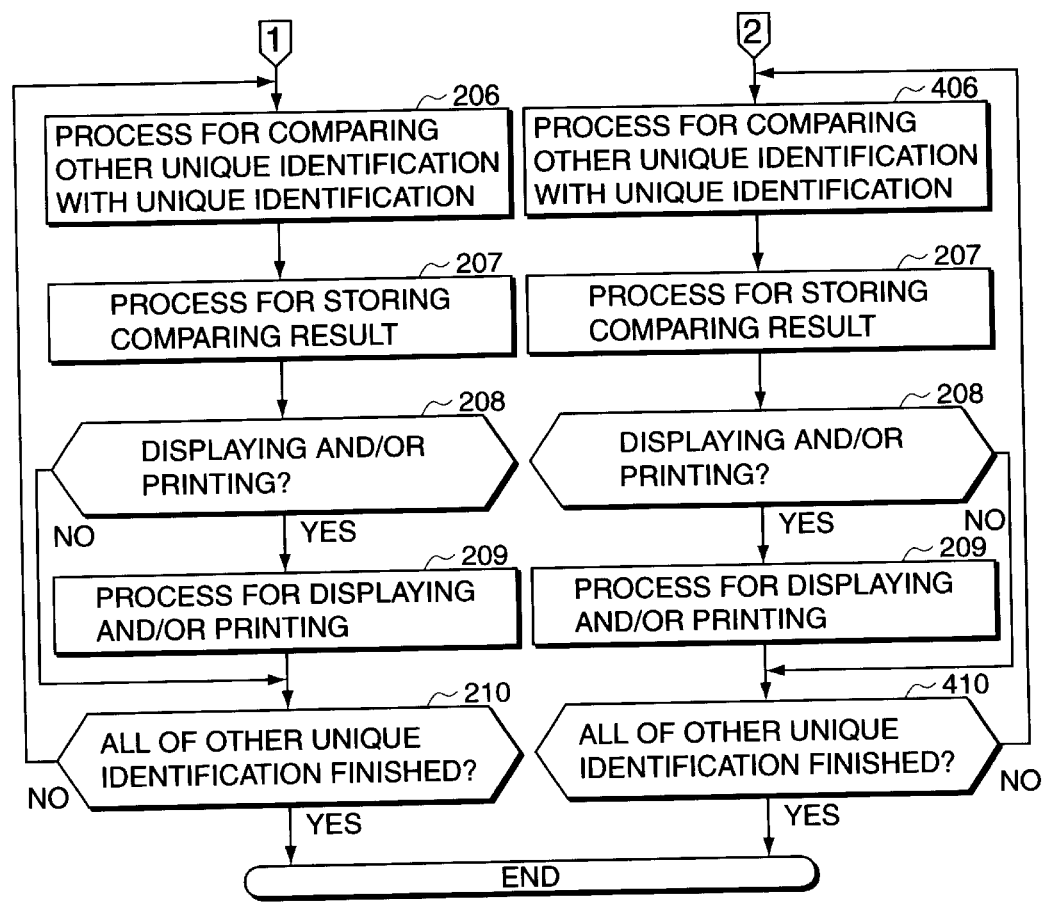
FIG. 29B is a flowchart of the process in the apparatus for retrieving moving image according to the present invention.

FIGS. 29A and 29B are flowcharts of the process in the apparatus for retrieving the moving image according to the present invention described in FIG. 28. Still, an identical step number is appended to the step having the identical process in FIGS. 29A and 29B with FIGS. 6A, 6B, 8A and 8B. In FIGS. 28, 29A and 29B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the following process (the steps 202 to 210) is executed.

The extracting unit 102 extracts the information 103 of the feature quantity of the moving image, which includes the physical information of the feature quantity of the moving image such as the information of the luminance and the color difference (Y, Cb, Cr) of each frame and/or the information of the color (R, G, B) of each frame, from the moving image data 101 (in the step 202).

And, the detecting unit 501 detects the cut point of the moving image data 101 as the information 502 of the cut point (in the step 602). This cut point of the moving image data 101 shows a point where the scene of the moving image data 101 changes or a point where the camera for photographing the moving image data 101 switches.

Next, the extracting unit 503 for extracting the information of the unique identification of the moving image arranges at least one value from values of the physical information of the feature quantity of the moving image (such as the information of the luminance and the color difference (Y, Cb, Cr) of each frame and/or the information of the color (R, G, B) of each frame) based on the information 103, mean value of the values, total value of the values and/or difference value of the values on the time axis. Then, the extracting unit 503 picks out all values arranged on the time axis, or some values from the values arranged on the time axis at uniform intervals or irregular intervals. And then, the extracting unit 503 extracts the picked out values in each shot unit of the moving image data 101 divided by the information 502 of the cut point as the information 505 of the unique identification of the moving image to be used for identifying the moving image (in the step 603).

The storing unit 106 for storing the information of the unique identification of the moving image stores the information 505 of the unique identification of the moving image extracted by the extracting unit 503 (in the step 604).

On the other hand, the information 508 of the unique identification of the moving image is extracted from other moving image data (the object moving image data for retrieving) (in the step 205). This extracting process can be executed by the processing equal to the foregoing steps 601 to 604 (in FIGS. 6A and 6B).

Then, the retrieving unit 109 for retrieving the information of the unique identification of the moving image compares the information 505 of the unique identification of the moving image stored in the storing unit 106 with the information 508 of the unique identification of the moving image extracted from the other moving image data (in the step 206).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 206 to 209 is executed for all of the information 508 of the unique identification of the moving image extracted from the other moving image data (in the step 210).

In case the digital moving image data 2601 is the compressed moving image data 301, the following process (the steps 402 to 410) is executed.

The extracting unit 302 extracts the information 303 of the feature quantity of the compressed moving image, which includes the DCT coefficients of each frame and the information of the motion compensation of each frame, from the compressed moving image data 301 (in the step 402). And, the detecting unit 701 detects the cut point of the compressed moving image data 301 as the information 702 of the cut point (in the step 802).

Next, the extracting unit 703 for extracting the information of the unique identification of the compressed moving image calculates values of physical information of the feature quantity of the compressed moving image from the DCT coefficients of each frame, which is included in the information 303, mean value of the values, total value of the values and/or difference value of the values. On the other hand, the extracting unit 703 calculates values such as a motion vector, a mean motion vector between frames before and behind, a total motion vector, a difference vector and/or a motion vector on a whole frame from the information of the motion compensation. And the extracting unit 703 arranges at least one value from the above mentioned values on the time axis and then picks out all values arranged on the time axis, or some values from the values arranged on the time axis at uniform intervals or irregular intervals. And then, the extracting unit 703 extracts the picked out values in each shot unit of the compressed moving image data 301 divided by using the information 702 of the cut point as the information 705 of the unique identification of the compressed moving image to be used for identifying the compressed moving image (in the step 803).

The storing unit 306 for storing the information of the unique identification of the compressed moving image stores the information 705 of the unique identification of the compressed moving image extracted by the extracting unit 703 (in the step 804).

On the other hand, the information 708 of the unique identification of the compressed moving image is extracted from other compressed moving image data (the object compressed moving image data for retrieving) (in the step 405).

This extracting process can be executed by the processing equal to the foregoing steps 801 to 804 (in FIGS. 8A and 8B).

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

As mentioned above, according to the fourteenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the fifteenth preferred embodiment according to the invention will be explained in FIGS. 30, 31A and 31B.

Figure 30:
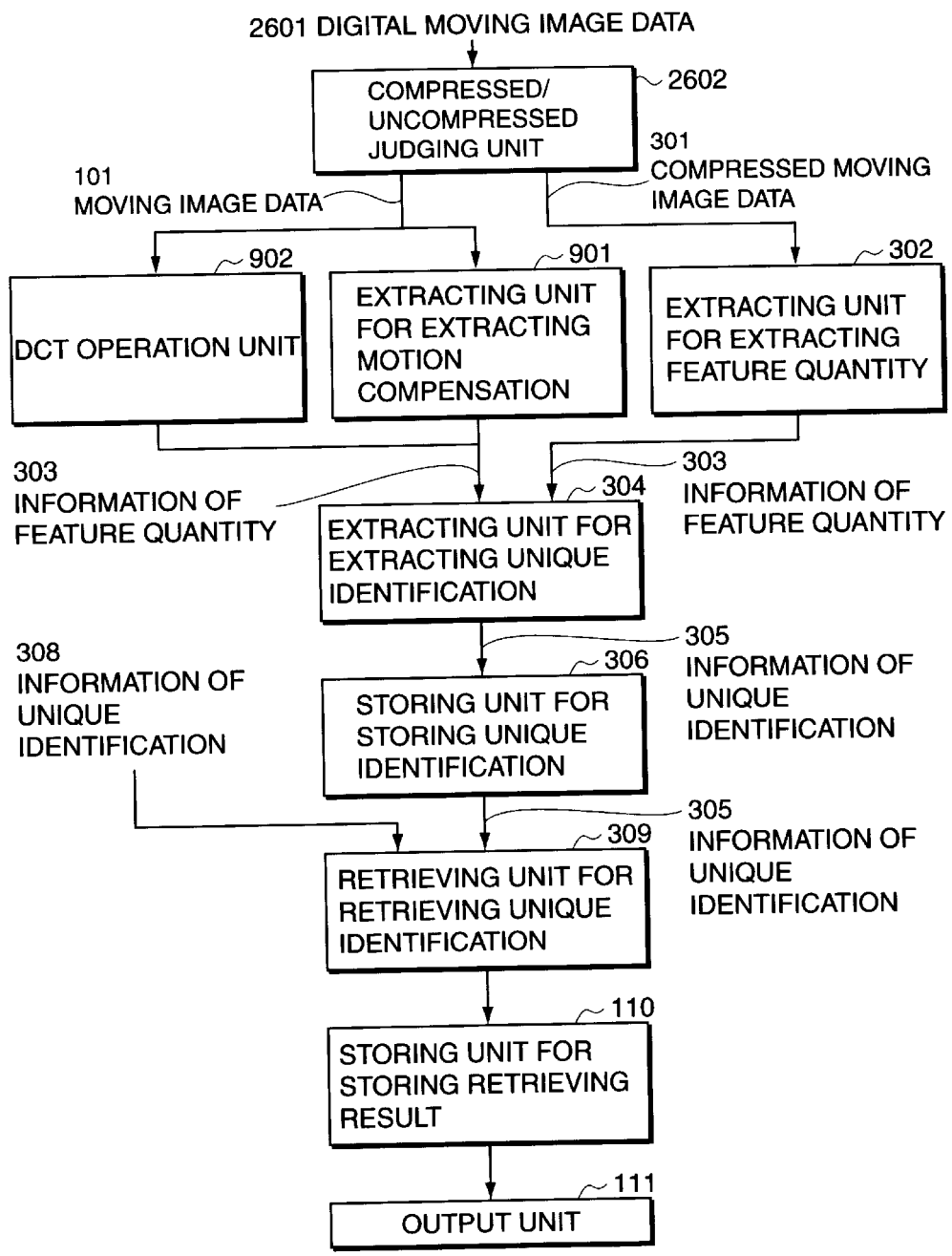
FIG. 30 is a block diagram showing the apparatus for retrieving moving image according to the present invention.

FIG. 30 is a block diagram showing an apparatus for retrieving moving image according to the present invention. Still, an identical code is appended to the thing having the identical composition in FIG. 30 with FIG. 9. In FIG. 30, the apparatus for retrieving moving image comprises an extracting unit 901 for extracting information of motion compensation in the M×N (M and N are natural numbers) pixels unit of moving image data 101, a DCT (Discrete Cosine Transform) operation unit 902 for obtaining a DCT coefficient by executing a DCT operation in the M'×N' (M' and N' are natural numbers) pixels unit of the moving image data 101, an extracting unit 302 for extracting information 303 of the feature quantity of compressed moving image, which includes DCT coefficients of each frame and information of motion compensation of each frame, from compressed moving image data 301 provided by the standard compression encoding process for moving image such as MPEG, an extracting unit 304 for arranging at least one information of feature quantity from the DCT coefficients of each frame and the information of the motion compensation of each frame, which are the information 303 extracted by the extracting unit 302, or by the extracting unit 901 and the DCT operation unit 902, on the time axis and for extracting information 305 of the unique identification of compressed moving image to identify the compressed moving image from the arrangement of the information of feature quantity on the time axis, a storing unit 306 for storing the information 305 of the unique identification of the compressed moving image extracted by the extracting unit 304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the extracting unit 102 and the compressed moving image data 301 to the extracting unit.

Figure 31A:
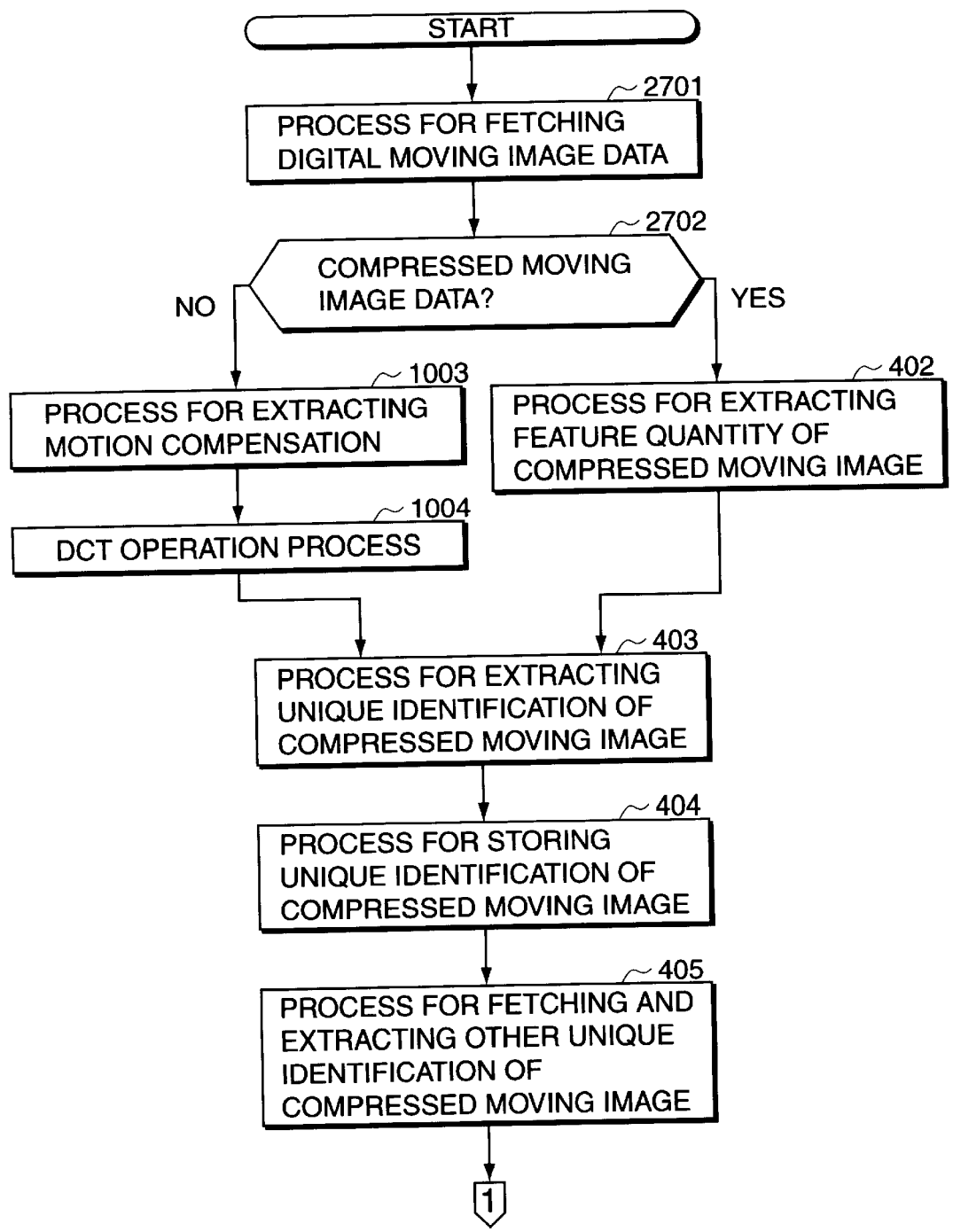
FIG. 31A is a flowchart of the process in the apparatus for retrieving moving image according to the present invention.
Figure 31B:
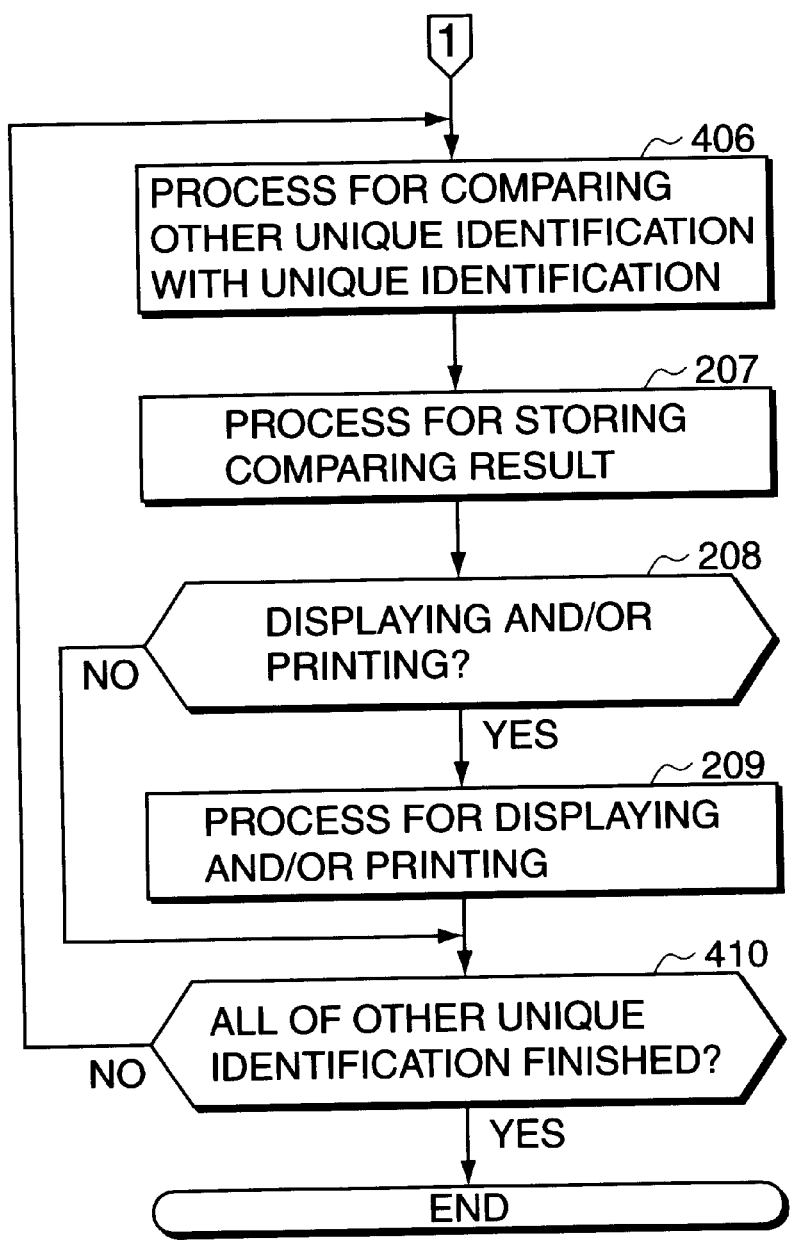
FIG. 31B is a flowchart of the process in the apparatus for retrieving moving image according to the present invention.

FIGS. 31A and 31B are flowcharts of the process in the apparatus for retrieving the moving image according to the present invention described in FIG. 30. Still, an identical step number is appended to the step having the identical process in FIGS. 31A and 31B with FIGS. 10A and 10B. In FIGS. 30, 31A and 31B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the extracting unit 901 for extracting the information of the motion compensation and the DCT operation unit 902. And, the following process (the steps 1003 to 410) is executed.

The extracting unit 901 divides each frame of the moving image data 101 into the M×N (M and N are natural numbers) pixels units, then calculates the information of the motion compensation in the M×N pixels unit (in the step 1003). On the other hand, the DCT operation unit 902 divides each frame of the moving image data 101 into the M'×N' (M' and N' are natural numbers) pixels units, then calculates the DCT coefficient by executing the DCT operation in the M'×N' pixels unit (in the step 1004).

On the other hand, in case the digital moving image data 2601 is the compressed moving image data 301, the compressed/uncompressed judging unit 2602 outputs the compressed moving image data 301 to the extracting unit 302 for extracting the information of the feature quantity of the compressed moving image. And, the following process (the steps 402 to 410) is executed.

The extracting unit 302 extracts the information 303 of the feature quantity of the compressed moving image, which includes the DCT coefficients of each frame and the information of the motion compensation of each frame, from the compressed moving image data 301 (in the step 402).

Next, the extracting unit 304 for extracting the information of the unique identification of the compressed moving image calculates values of physical information of the feature quantity of the compressed moving image from the DCT coefficients of each frame, which is included in the information 303 extracted by extracting unit 302, or the extracting unit 901 and the DCT operation unit 902, mean value of the values, total value of the values and/or difference value of the values. On the other hand, the extracting unit 304 calculates values such as a motion vector, a mean motion vector between frames before and behind, a total motion vector, a difference vector and/or a motion vector on a whole frame from the information of the motion compensation. And the extracting unit 304 arranges at least one value from the above mentioned values on the time axis and then picks out all values arranged on the time axis, or some values from the values arranged on the time axis at uniform intervals or irregular intervals. And then, the extracting unit 304 extracts the picked out values as the information 305 of the unique identification of the compressed moving image to be used for identifying the compressed moving image (in the step 403).

The storing unit 306 for storing the information of the unique identification of the compressed moving image stores the information 305 of the unique identification of the compressed moving image extracted by the extracting unit 304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404 (in FIGS. 10A and 10B).

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

As mentioned above, according to the fifteenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the sixteenth preferred embodiment according to the invention will be explained in FIGS. 32, 33A and 33B.

FIG. 32 is a block diagram showing an apparatus for retrieving moving image according to the present invention. Still, an identical code is appended to the thing having the identical composition in FIG. 32 with FIG. 11. In FIG. 32, the apparatus for retrieving moving image comprises an extracting unit 901 for extracting information of motion compensation in the M×N (M and N are natural numbers) pixels unit of moving image data 101, a DCT (Discrete Cosine Transform) operation unit 902 for obtaining a DCT coefficient by executing a DCT operation in the M'×N' (M' and N' are natural numbers) pixels unit of the moving image data 101, a detecting unit 501 for detecting a cut point of the moving image data 101 as information 502 of a cut point, an extracting unit 302 for extracting information 303 of the feature quantity of compressed moving image, which includes DCT coefficients of each frame and information of motion compensation of each frame, from compressed moving image data 301 provided by the standard compression encoding process for moving image such as MPEG, a detecting unit 701 for detecting a cut point of the compressed moving image data 301 as information 702 of a cut point, an extracting unit 703 for arranging at least one information of feature quantity from the DCT coefficients of each frame and the information of the motion compensation of each frame, which are included in the information 303 extracted by the extracting unit 901 and the DCT operation unit 902, or the extracting unit 302, on the time axis and for extracting information 705 of the unique identification of compressed moving image to identify the compressed moving image from the arrangement of the information of the feature quantity on the time axis in each shot unit of the compressed moving image data 301 divided by using the information 702 of the cut point, a storing unit 306 for storing the information 705 of the unique identification of the compressed moving image extracted by the extracting unit 703, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the extracting unit, the DCT (Discrete Cosine Transform) operation unit 902 and the detecting unit, and the compressed moving image data 301 to the extracting unit 302 and the detecting unit 701.

Figure 33A:
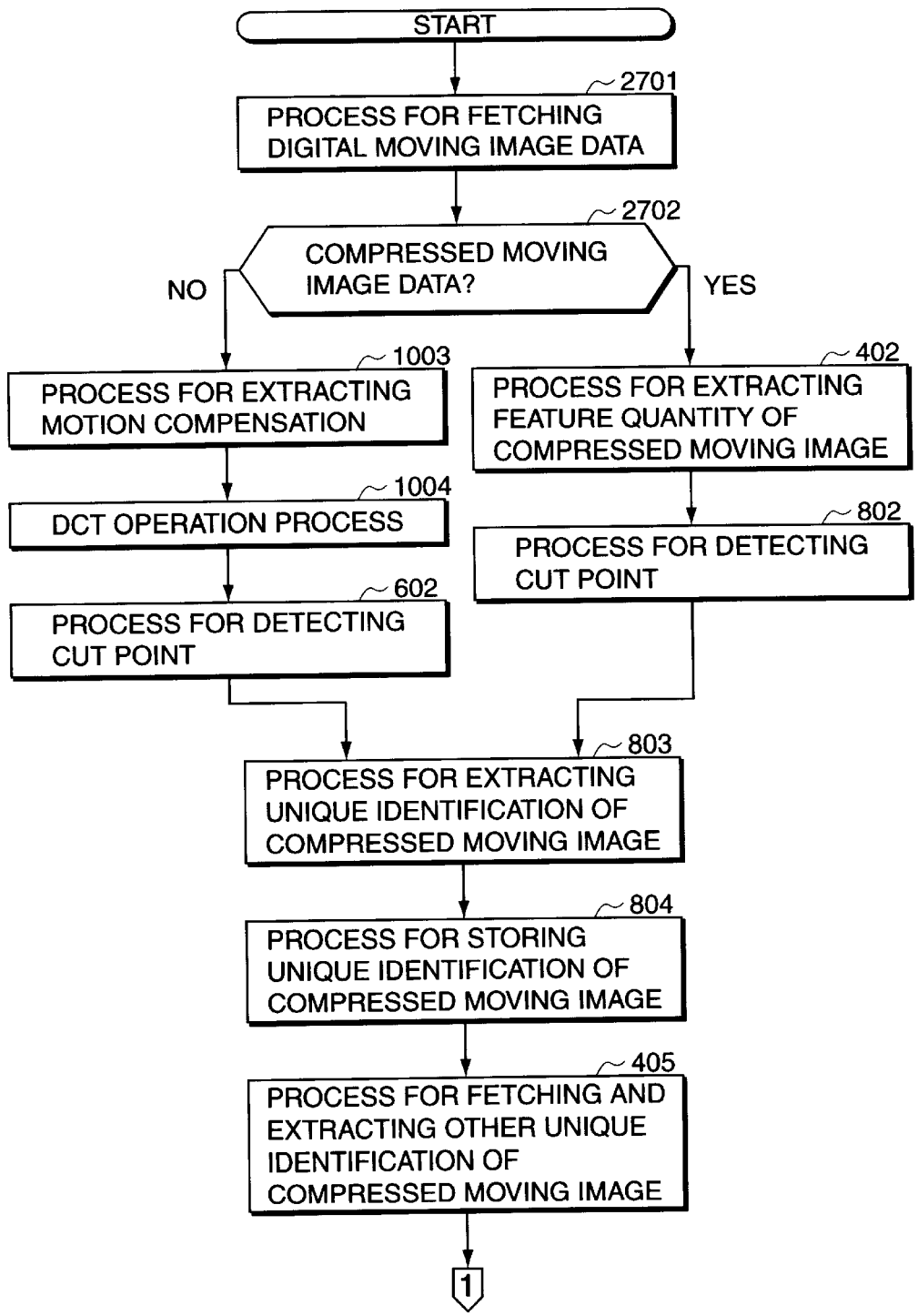
FIG. 33A is a flowchart of the process in the apparatus for retrieving moving image according to the present invention.
Figure 33B:
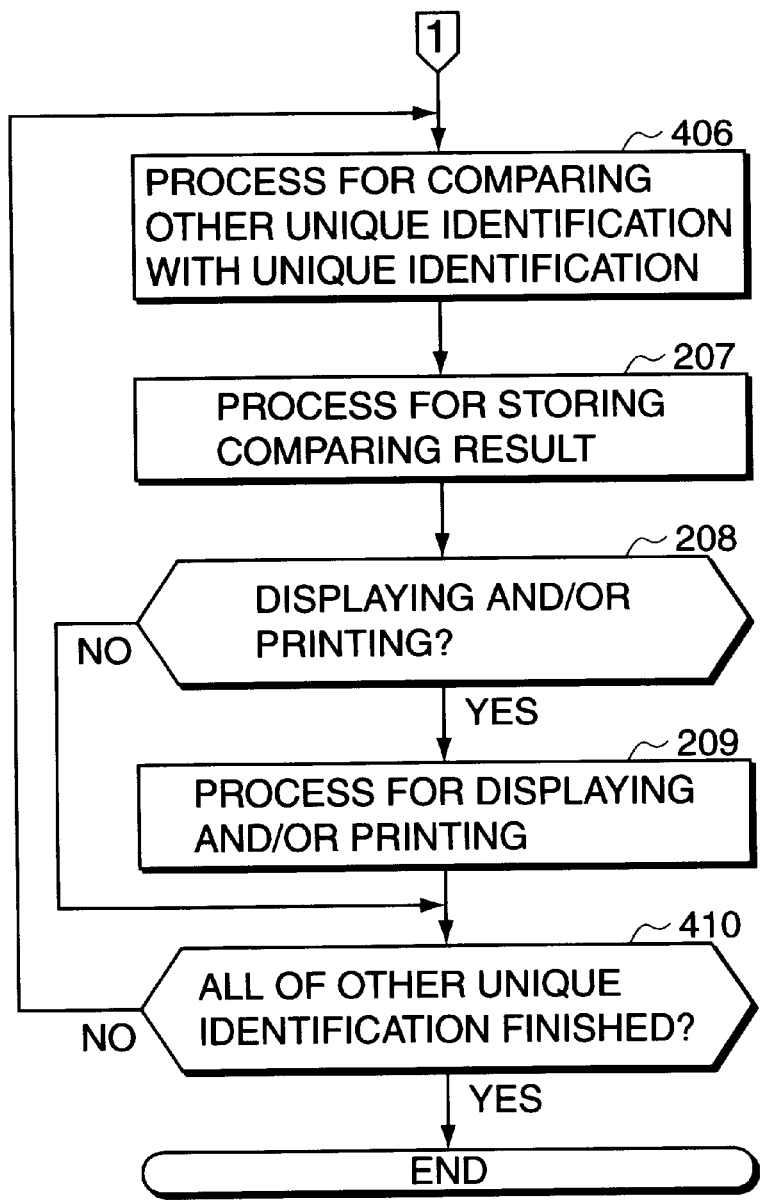
FIG. 33B is a flowchart of the process in the apparatus for retrieving moving image according to the present invention.

FIGS. 33A and 33B are flowcharts of the process in the apparatus for retrieving the moving image according to the present invention described in FIG. 32. Still, an identical step number is appended to the step having the identical process in FIGS. 33A and 33B with FIGS. 12A and 12B. In FIGS. 32, 33A and 33B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the extracting unit 901 for extracting the information of the motion compensation, the DCT operation unit 902 and the detecting unit 501 for detecting the cut point. And, the following process (the steps 1003 to 410) is executed.

The extracting unit 901 divides each frame of the moving image data 101 into the M×N (M and N are natural numbers) pixels units, then calculates the information of the motion compensation in the M×N pixels unit (in the step 1003). On the other hand, the DCT operation unit 902 divides each frame of the moving image data 101 into the M'×N' (M' and N' are natural numbers) pixels units, then calculates the DCT coefficient by executing the DCT operation in the M'×N' pixels unit (in the step 1004).

And, the detecting unit 501 detects the cut point of the moving image data 101 as the information 502 of the cut point (in the step 602).

On the other hand, in case the digital moving image data 2601 is the compressed moving image data 301, the compressed/uncompressed judging unit 2602 outputs the compressed moving image data 301 to the extracting unit 302 for extracting the information of the feature quantity of the compressed moving image and the detecting unit 701 for detecting the cut point. And, the following process (the steps 402 to 410) is executed.

The extracting unit 302 extracts the information 303 of the feature quantity of the compressed moving image, which includes the DCT coefficients of each frame and the information of the motion compensation of each frame, from the compressed moving image data 301 (in the step 402). And, the detecting unit 701 detects the cut point of the compressed moving image data 301 as the information 702 of the cut point (in the step 802).

Next, the extracting unit 703 for extracting the information of the unique identification of the compressed moving image calculates values of physical information of the feature quantity of the compressed moving image from the DCT coefficients of each frame, which is included in the information 303, mean value of the values, total value of the values and/or difference value of the values. On the other hand, the extracting unit 703 calculates values such as a motion vector, a mean motion vector between frames before and behind, a total motion vector, a difference vector and/or a motion vector on a whole frame from the information of the motion compensation. And the extracting unit 703 arranges at least one value from the above mentioned values on the time axis and then picks out all values arranged on the time axis, or some values from the values arranged on the time axis at uniform intervals or irregular intervals. And then, the extracting unit 703 extracts the picked out values in each shot unit of the moving image data 101 divided by using the information 502 or in each shot unit of the compressed moving image data 301 divided by using the information 702 as the information 705 of the unique identification of the compressed moving image to be used for identifying the compressed moving image (in the step 803).

The storing unit 306 for storing the information of the unique identification of the compressed moving image stores the information 705 of the unique identification of the compressed moving image extracted by the extracting unit 703 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804 (in FIGS. 12A and 12B).

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

As mentioned above, according to the sixteenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the seventeenth preferred embodiment according to the invention will be explained in FIGS. 34, 35A and 35B.

Figure 34:
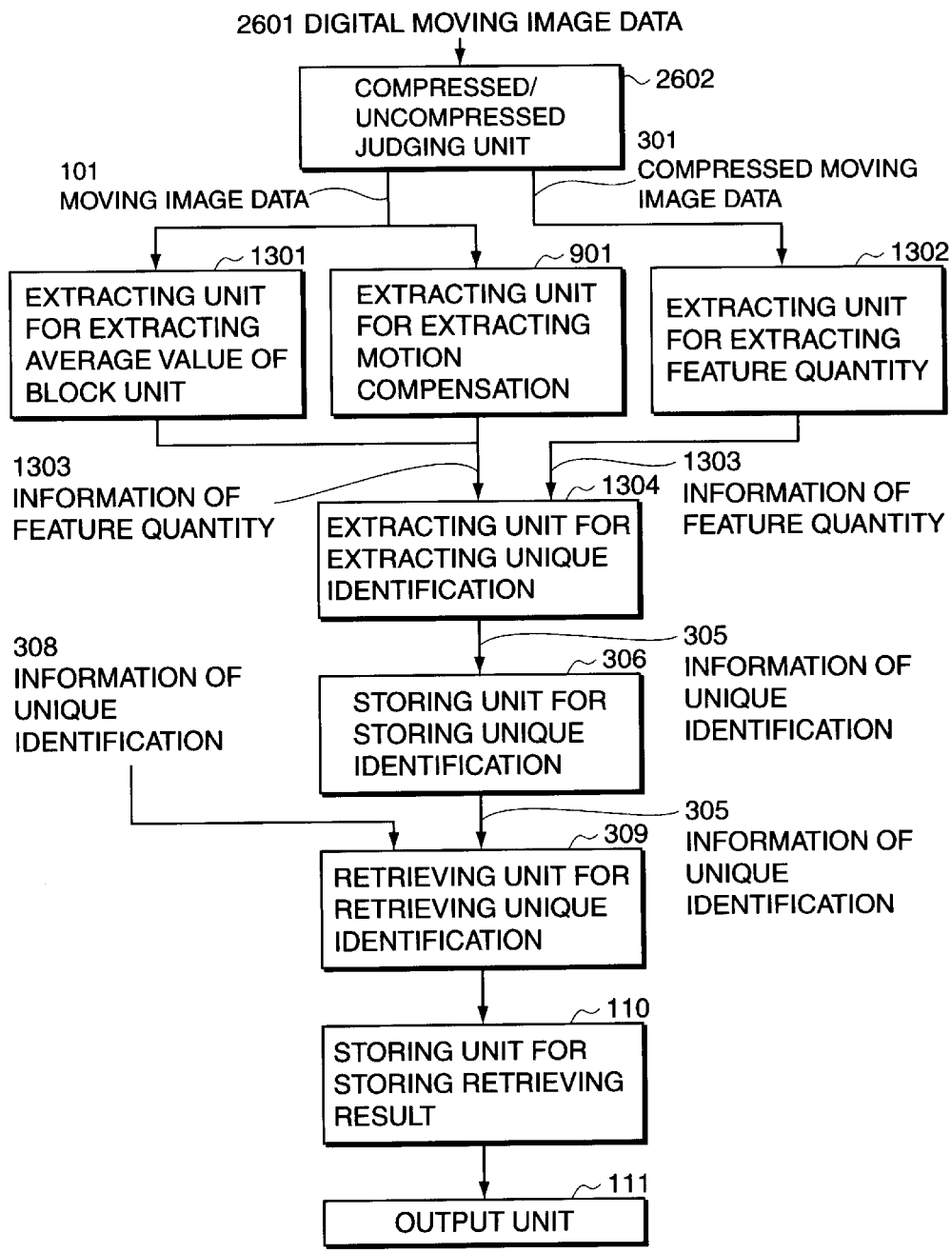
FIG. 34 is a block diagram showing the apparatus for retrieving moving image according to the present invention.

FIG. 34 is a block diagram showing an apparatus for retrieving moving image according to the present invention. Still, an identical code is appended to the thing having the identical composition in FIG. 34 with FIG. 13. In FIG. 34, the apparatus for retrieving moving image comprises an extracting unit 901 for extracting information of motion compensation in the M×N (M and N are natural numbers) pixels unit of moving image data 101, an extracting unit 1301 for calculating an average pixel value, such as information of average color (R, G, B), and/or information of average luminance and average color difference (Y, Cb, Cr), in the M'×N' (M' and N' are natural numbers) pixels unit, an extracting unit 1302 for extracting information 1303 of the feature quantity of compressed moving image, which includes DC (Direct Current) components of DCT (Discrete Cosine Transform) coefficients of each frame and information of motion compensation of each frame, from compressed moving image data 301 provided by the standard compression encoding process for moving image such as MPEG, an extracting unit 1304 for arranging at least one information of feature quantity from the DC components of the DCT coefficients of each frame and the information of the motion compensation of each frame or the average pixel value, which are included in the information 1303 extracted by the extracting unit 901 and the extracting unit 1301, or the extracting unit 1302, on the time axis and for extracting information 305 of the unique identification of compressed moving image to identify the compressed moving image from the arrangement of the information of the feature quantity on the time axis, a storing unit 306 for storing the information 305 of the unique identification of the compressed moving image extracted by the extracting unit 1304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the extracting unit 901 and the extracting unit 1301, and the compressed moving image data 301 to the extracting unit 1302.

Figure 35A:
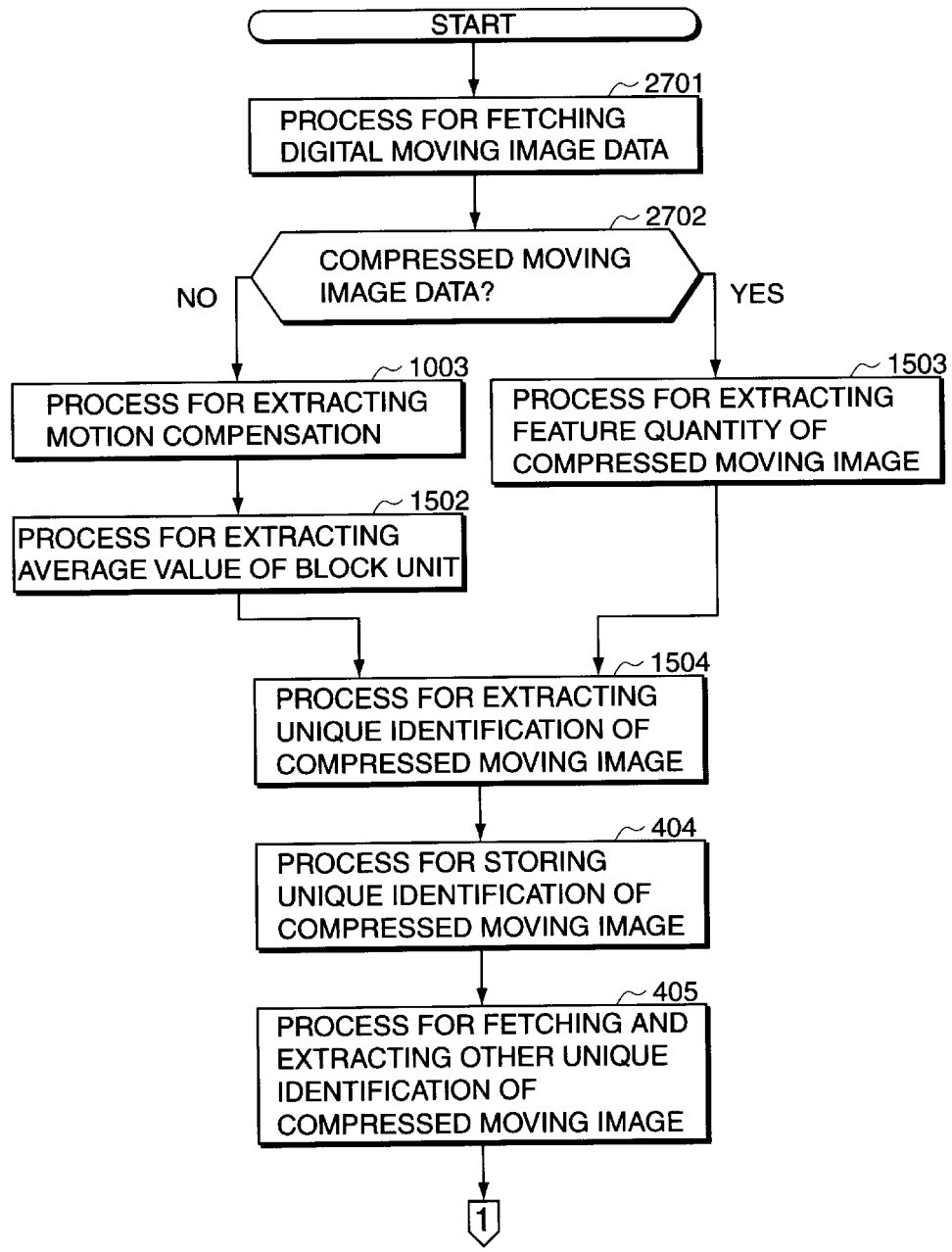
FIG. 35A is a flowchart of the process in the apparatus for retrieving moving image according to the present invention.
Figure 35B:
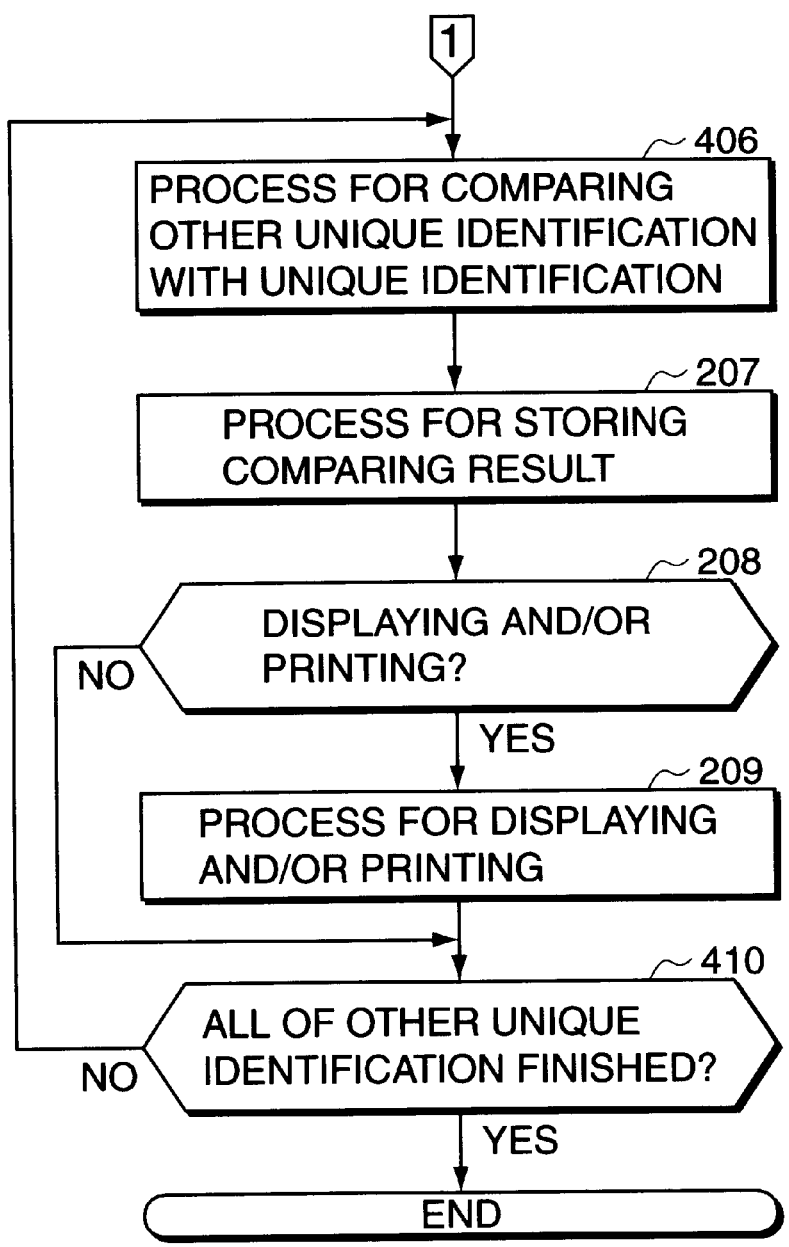
FIG. 35B is a flowchart of the process in the apparatus for retrieving moving image according to the present invention.

FIGS. 35A and 35B are flowcharts of the process in the apparatus for retrieving the moving image according to the present invention described in FIG. 34. Still, an identical step number is appended to the step having the identical process in FIGS. 35A and 35B with FIGS. 15A and 15B. In FIGS. 34, 35A and 35B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the extracting unit 901 for extracting the information of the motion compensation and the extracting unit 1301 for extracting the average value of the block unit. And, the following process (the steps 1003 to 410) is executed.

The extracting unit 901 divides each frame of the moving image data 101 into the M×N (M and N are natural numbers) pixels units, then calculates the information of the motion compensation in the M×N pixels unit (in the step 1003). On the other hand, the extracting unit 1301 divides each frame of the moving image data 101 into the M'×N' (M' and N' are natural numbers) pixels units, then calculates the average pixel value in the M'×N' pixels unit (in the step 1502).

On the other hand, in case the digital moving image data 2601 is the compressed moving image data 301, the compressed/uncompressed judging unit 2602 outputs the compressed moving image data 301 to the extracting unit 1302 for extracting the information of the feature quantity of the compressed moving image. And, the following process (the steps 1503 to 410) is executed.

The extracting unit 1302 extracts the information 1303 of the feature quantity of the compressed moving image, which includes the DC components of the DCT coefficients of each frame and the information of the motion compensation of each frame, from the compressed moving image data 301 (in the step 1503).

Next, the extracting unit 1304 for extracting the information of the unique identification of the compressed moving image calculates values of physical information of the feature quantity of compressed moving image from the DC components of the DCT coefficients of each frame and/or values of the average pixel value of each frame, which are included in the information 1303, mean value of the values, total value of the values and/or difference value of the values. On the other hand, the extracting unit 1304 calculates values such as a motion vector, a mean motion vector between frames before and behind, a total motion vector, a difference vector and/or a motion vector on a whole frame from the information of the motion compensation. And the extracting unit 1304 arranges at least one value from the above mentioned values on the time axis and then picks out all values arranged on the time axis, or some values from the values arranged on the time axis at uniform intervals or irregular intervals. And then, the extracting unit 1304 extracts the picked out values as the information 305 of the unique identification of the compressed moving image to be used for identifying the compressed moving image (in the step 1504).

The storing unit 306 for storing the information of the unique identification of the compressed moving image stores the information 305 of the unique identification of the compressed moving image extracted by the extracting unit 1304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404 (in FIGS. 15A and 15B).

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

As mentioned above, according to the seventeenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the eighteenth preferred embodiment according to the invention will be explained in FIGS. 36, 37A and 37B.

FIG. 36 is a block diagram showing an apparatus for retrieving moving image according to the present invention. Still, an identical code is appended to the thing having the identical composition in FIG. 36 with FIG. 16. In FIG. 36, the apparatus for retrieving moving image comprises an extracting unit 901 for extracting information of motion compensation in the M×N (M and N are natural numbers) pixels unit of moving image data 101, an extracting unit 1301 for calculating an average pixel value such as information of average color (R, G, B) and/or information of average luminance and average color difference (Y, Cb, Cr) in the M'×N' (M' and N' are natural numbers) pixels unit, a detecting unit 501 for detecting a cut point of the moving image data 101 as information 502 of a cut point, an extracting unit 1302 for extracting information 1303 of the feature quantity of compressed moving image, which includes DC (Direct Current) components of DCT (Discrete Cosine Transform) coefficients of each frame and information of motion compensation of each frame, from compressed moving image data 301 provided by the standard compression encoding process for moving image such as MPEG, a detecting unit 701 for detecting a cut point of the compressed moving image data 301 as information 702 of a cut point, an extracting unit 1603 for arranging at least one information of feature quantity from the DC components of the DCT coefficients of each frame and the information of the motion compensation of each frame or the average pixel values, which are included in the information 1303 extracted by the extracting unit 901 and the extracting unit 1301, or the extracting unit 1302, on the time axis and for extracting information 705 of the unique identification of compressed moving image to identify the compressed moving image from the arrangement of the information of the feature quantity on the time axis in each shot unit of the moving image data 101 divided by using the information 502 of the cut point or in each shot unit of the compressed moving image data 301 divided by using the information 702 of the cut point, a storing unit 306 for storing the information 705 of the unique identification of the compressed moving image extracted by the extracting unit 1603, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the extracting unit 901, the extracting unit 1301 and the detecting unit 501, and the compressed moving image data 301 to the extracting unit 1302 and the detecting unit 701.

Figure 37A:
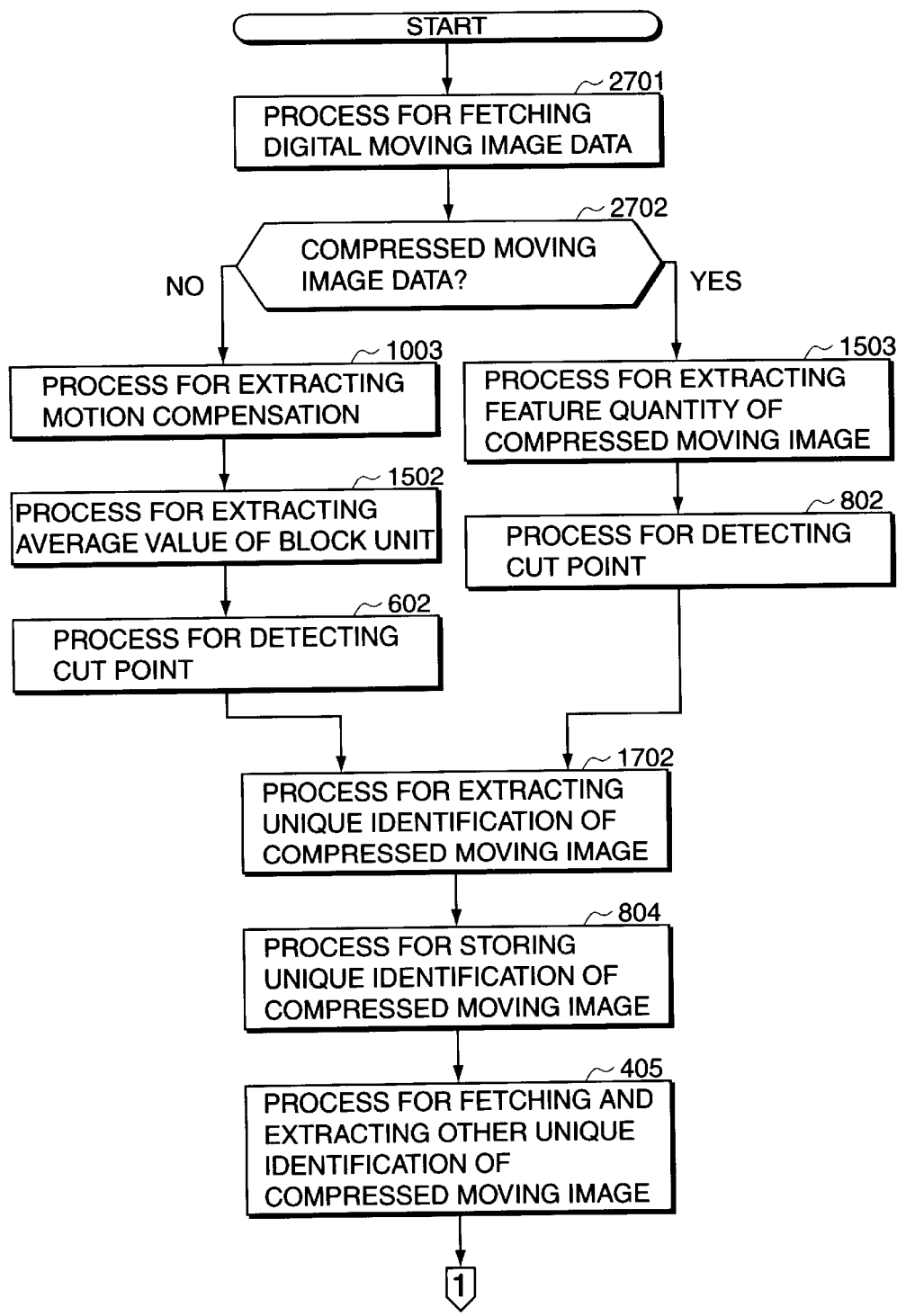
FIG. 37A is a flowchart of the process in the apparatus for retrieving moving image according to the present invention.
Figure 37B:
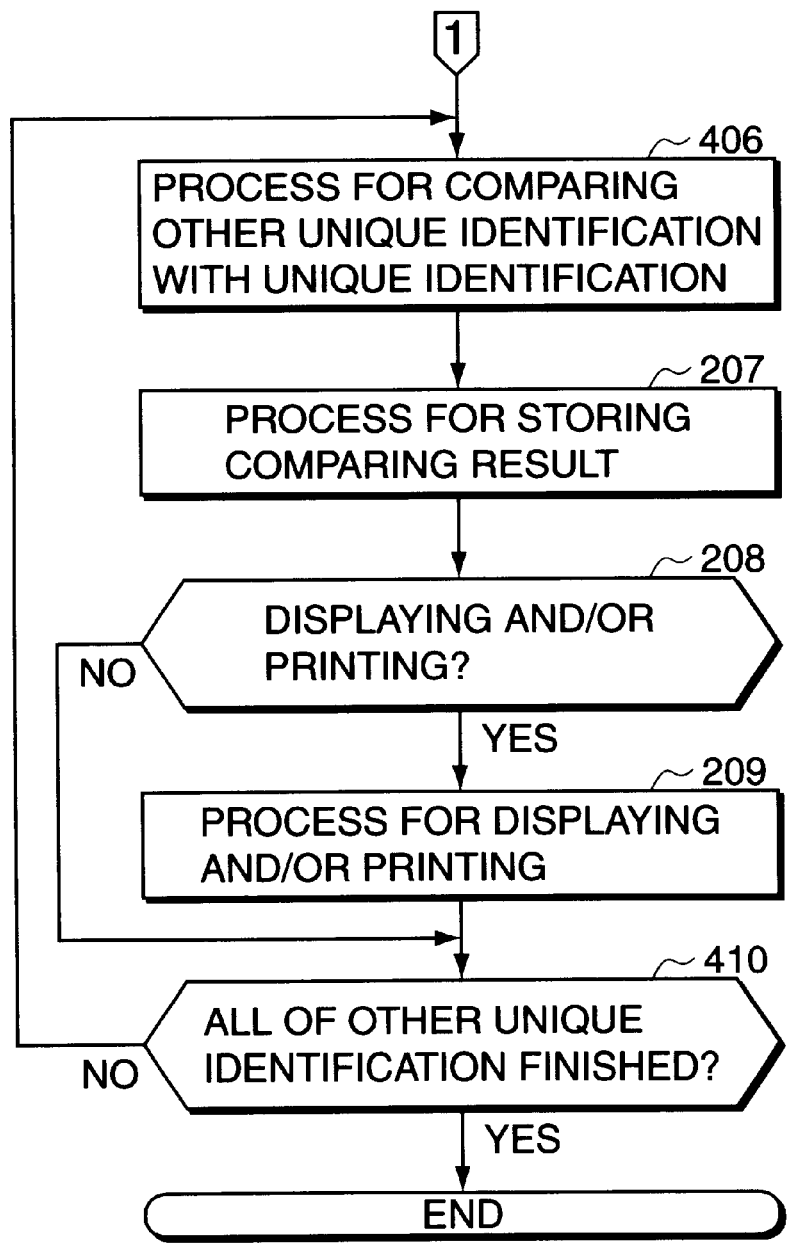
FIG. 37B is a flowchart of the process in the apparatus for retrieving moving image according to the present invention.

FIGS. 37A and 37B are flowcharts of the process in the apparatus for retrieving the moving image according to the present invention described in FIG. 36. Still, an identical step number is appended to the step having the identical process in FIGS. 37A and 37B with FIGS. 17A and 17B. In FIGS. 36, 37A and 37B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the extracting unit 901 for extracting the information of the motion compensation, the extracting unit 1301 for extracting the average value of the block unit and the detecting unit 501 for detecting the cut point. And, the following process (the steps 1003 to 410) is executed.

The extracting unit 901 divides each frame of the moving image data 101 into the M×N (M and N are natural numbers) pixels units, then calculates the information of the motion compensation in the M×N pixels unit (in the step 1003). And, the extracting unit 1301 divides each frame of the moving image data 101 into the M'×N' (M' and N' are natural numbers) pixels units, then calculates the average pixel value in the M'×N' pixels unit (in the step 1502). And more, the detecting unit 501 detects the cut point of the moving image data 101 as the information 502 of the cut point (in the step 602).

On the other hand, in case the digital moving image data 2601 is the compressed moving image data 301, the compressed/uncompressed judging unit 2602 outputs the compressed moving image data 301 to the extracting unit 1302 for extracting the information of the feature quantity of the compressed moving image and the detecting unit 701 for detecting the cut point. And, the following process (the steps 1503 to 410) is executed.

The extracting unit 1302 extracts the information 1303 of the feature quantity of the compressed moving image, which includes the DC components of the DCT coefficients of each frame and the information of the motion compensation of each frame, from the compressed moving image data 301 (in the step 1503). And then, the detecting unit 701 detects the cut point of the compressed moving image data 301 as the information of the cut point 702 (in the step 802).

Next, the extracting unit 1603 for extracting the information of the unique identification of the compressed moving image calculates values of physical information of the feature quantity of the compressed moving image from the DC components of the DCT coefficients of each frame and/or values of the average pixel value of each frame, which are included in the information 1303, mean value of the values, total value of the values and/or difference value of the values. On the other hand, the extracting unit 1603 calculates values such as a motion vector, a mean motion vector between frames before and behind, a total motion vector, a difference vector and/or a motion vector on a whole frame from the information of the motion compensation. And the extracting unit 1603 arranges at least one value from the above mentioned values on the time axis and then picks out all values arranged on the time axis, or some values from the values arranged on the time axis at uniform intervals or irregular intervals. And then, the extracting unit 1603 extracts the picked out values in each shot unit of the moving image data 101 divided by using the information 502 of the cut point or in each shot unit of the compressed moving image data 301 divided by using the information 702 of the cut point as the information 705 of the unique identification of the compressed moving image to be used for identifying the compressed moving image (in the step 1702).

The storing unit 306 for storing the information of the unique identification of the compressed moving image stores the information 705 of the unique identification of the compressed moving image extracted by the extracting unit 1603 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804 (in FIGS. 17A and 17B).

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

As mentioned above, according to the eighteenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the nineteenth preferred embodiment according to the invention will be explained in FIGS. 38, 39A and 39B.

Figure 38:
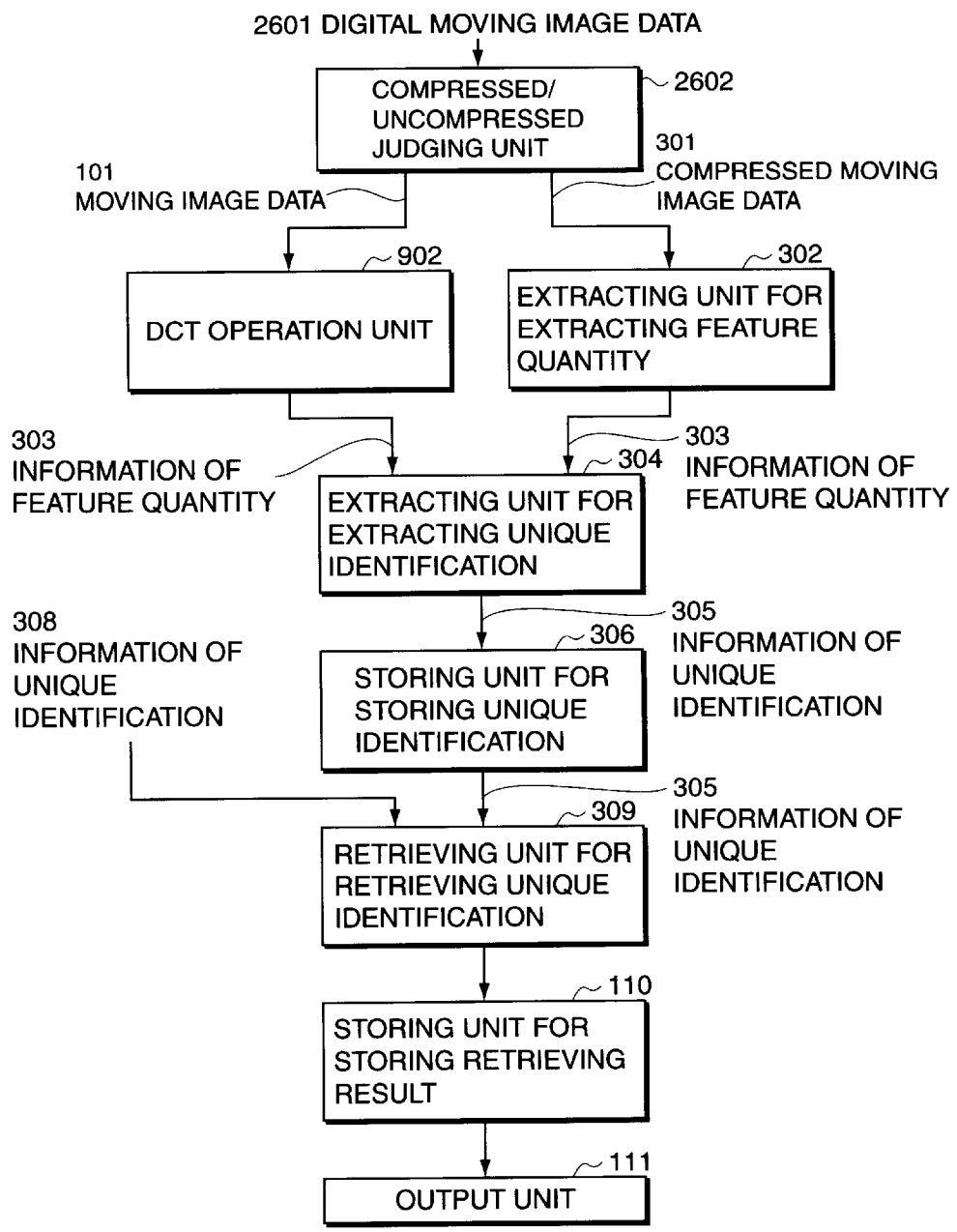
FIG. 38 is a block diagram showing the apparatus for retrieving moving image according to the present invention.

FIG. 38 is a block diagram showing an apparatus for retrieving moving image according to the present invention. Still, an identical code is appended to the thing having the identical composition in FIG. 38 with FIG. 18. In FIG. 38, the apparatus for retrieving moving image comprises a DCT (Discrete Cosine Transform) operation unit 902 for obtaining a DCT coefficient by executing a DCT operation in the M×N (M and N are natural numbers) pixels unit of moving image data 101 as information 303 of the feature quantity of compressed moving image, an extracting unit 302 for extracting information 303 of the feature quantity of compressed moving image, which includes DCT coefficients of each frame, from compressed moving image data 301 provided by the standard compression encoding process for moving image such as MPEG, an extracting unit 304 for arranging at least one information of feature quantity from the DCT coefficients of each frame, which is included in the information 303 extracted by the DCT operation unit 902 or by the extracting unit 302, on the time axis and for extracting information 305 of the unique identification of compressed moving image to identify the compressed moving image from the arrangement of the information of feature quantity on the time axis, a storing unit 306 for storing the information 305 of the unique identification of the compressed moving image extracted by the extracting unit 304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the DCT (Discrete Cosine Transform) operation unit 902 and the compressed moving image data 301 to the extracting unit 302.

Figure 39A:
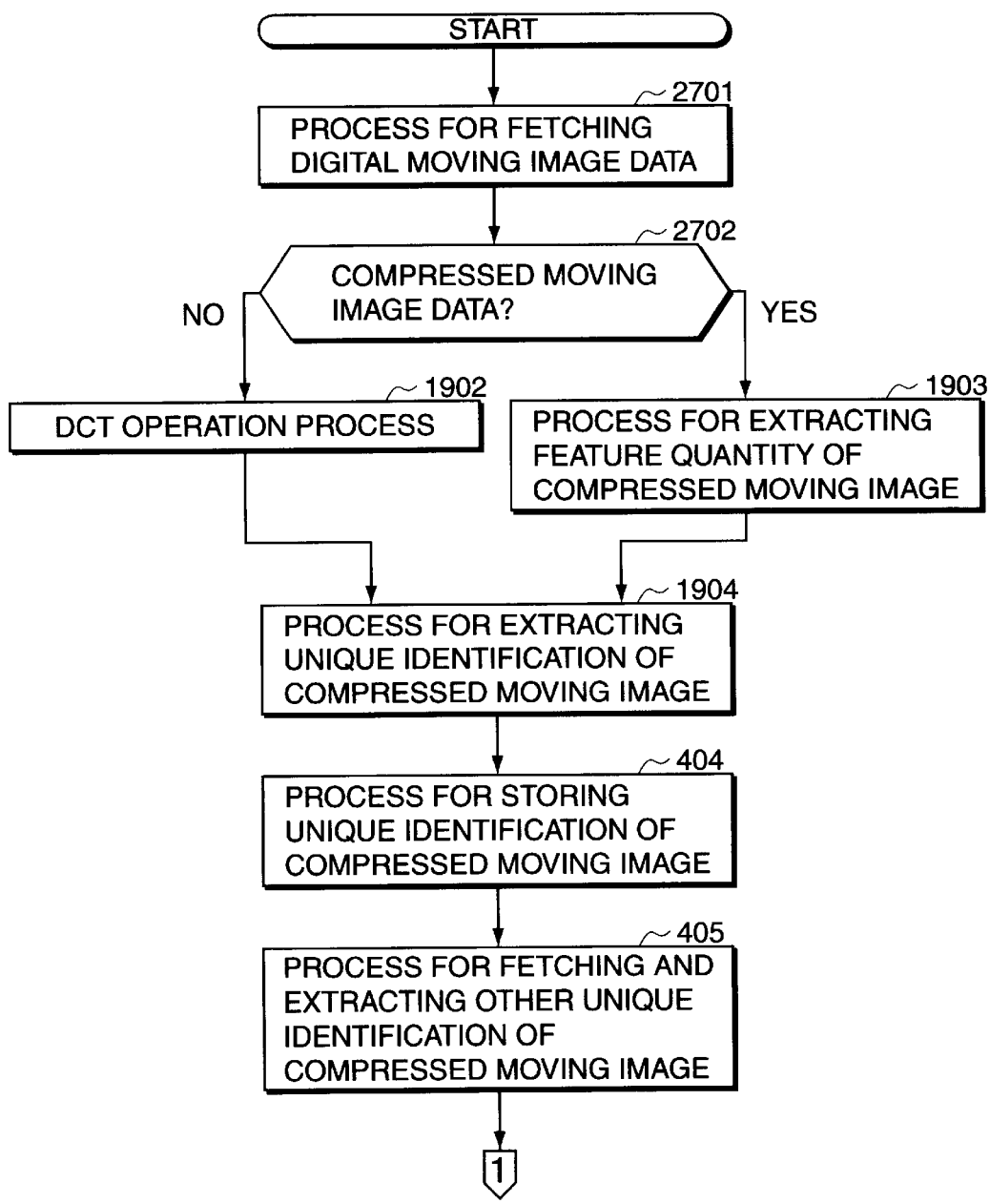
FIG. 39A is a flowchart of the process in the apparatus for retrieving moving image according to the present invention.
Figure 39B:
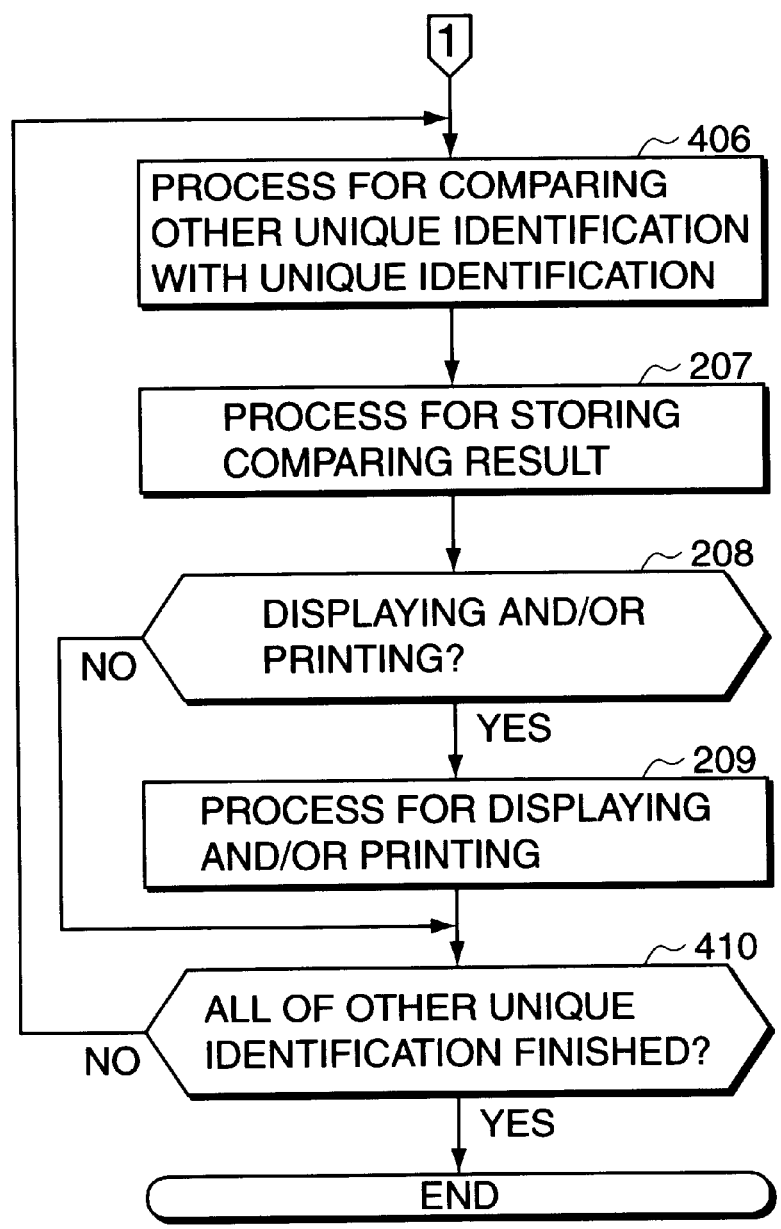
FIG. 39B is a flowchart of the process in the apparatus for retrieving moving image according to the present invention.

FIGS. 39A and 39B are flowcharts of the process in the apparatus for retrieving the moving image according to the present invention described in FIG. 38. Still, an identical step number is appended to the step having the identical process in FIGS. 39A and 39B with FIGS. 19A and 19B. In FIGS. 38, 39A and 39B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the DCT operation unit 902. The following process (the steps 1902 to 410) is executed.

The DCT operation unit 902 divides each frame of the moving image data 101 into the M×N (M and N are natural numbers) pixels units, then calculates the DCT coefficient by executing the DCT operation in the M×N pixels unit as the information 303 of the feature quantity of the compressed moving image (in the step 1902).

On the other hand, in case the digital moving image data 2601 is the compressed moving image data 301, the compressed/uncompressed judging unit 2602 outputs the compressed moving image data 301 to the extracting unit 302 for extracting the information of the feature quantity of the compressed moving image. The following process (the steps 1903 to 410) is executed.

The extracting unit 302 extracts the information 303 of the feature quantity of the compressed moving image, which includes the DCT coefficients of each frame, from the compressed moving image data 301 as (in the step 1903).

Next, the extracting unit 304 for extracting the information of the unique identification of the compressed moving image calculates values of physical information of the feature quantity of the compressed moving image from the DCT coefficients of each frame, which is included in the information 303 extracted by the extracting unit 902, mean value of the values, total value of the values and/or difference value of the values. And the extracting unit 304 arranges at least one value from the above mentioned values on the time axis and then picks out all values arranged on the time axis, or some values from the values arranged on the time axis at uniform intervals or irregular intervals. And then, the extracting unit 304 extracts the picked out values as the information 305 of the unique identification of the compressed moving image to be used for identifying the compressed moving image (in the step 1904).

The storing unit 306 for storing the information of the unique identification of the compressed moving image stores the information 305 of the unique identification of the compressed moving image extracted by the extracting unit 304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404 (in FIGS. 19A and 19B).

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

As mentioned above, according to the nineteenth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the twentieth preferred embodiment according to the invention will be explained in FIGS. 40, 41A and 41B.

Figure 40:
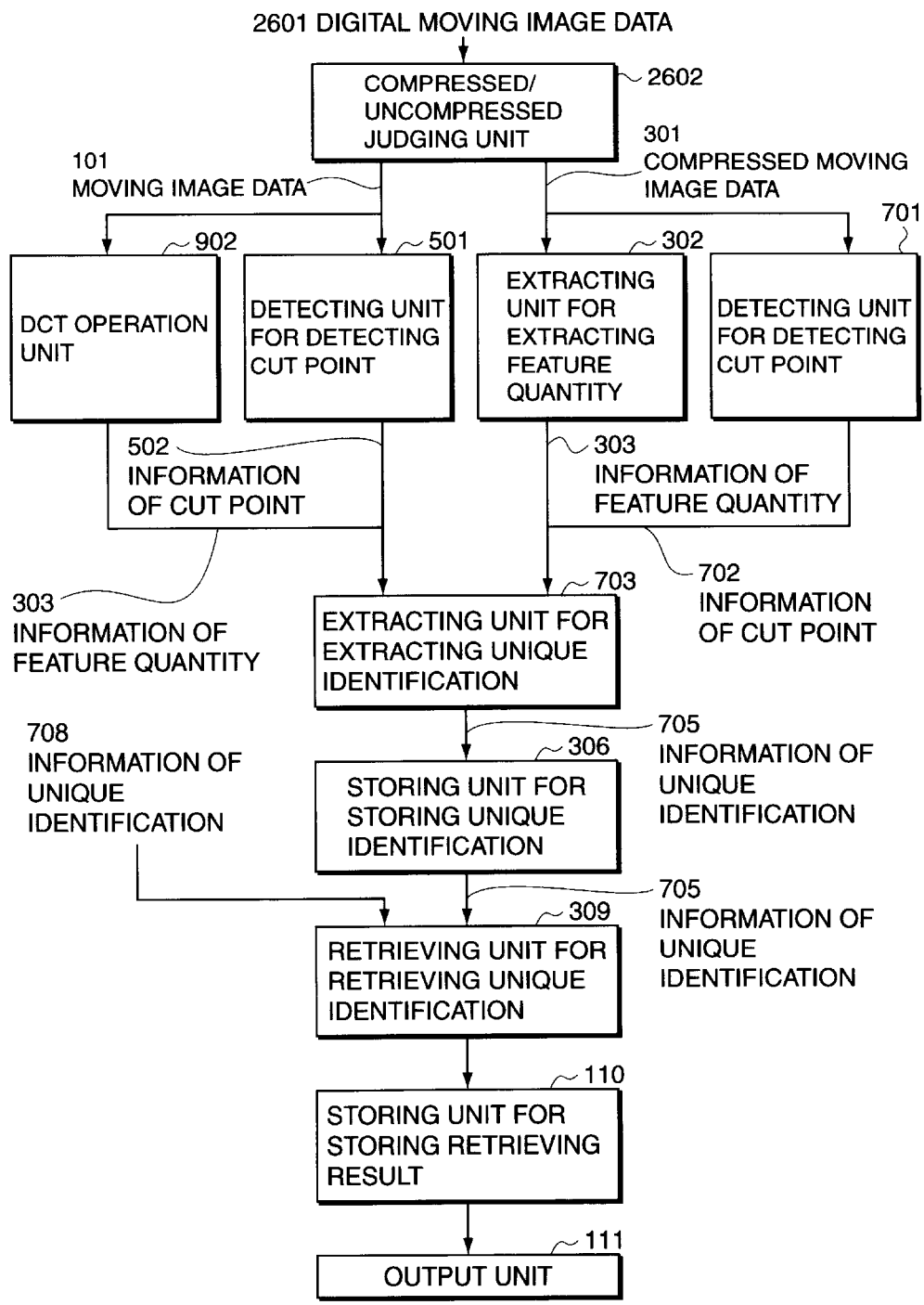
FIG. 40 is a block diagram showing the apparatus for retrieving moving image according to the present invention.

FIG. 40 is a block diagram showing an apparatus for retrieving moving image according to the present invention. Still, an identical code is appended to the thing having the identical composition in FIG. 40 with FIG. 20. In FIG. 40, the apparatus for retrieving moving image comprises a DCT (Discrete Cosine Transform) operation unit 902 for obtaining a DCT coefficient as information 303 of the feature quantity of compressed moving image by executing a DCT operation in the M×N (M and N are natural numbers) pixels unit of moving image data 101, a detecting unit 501 for detecting a cut point of the moving image data 101 as information 502 of a cut point, an extracting unit 302 for extracting information 303 of the feature quantity of compressed moving image, which includes DCT coefficients of each frame, from compressed moving image data 301 provided by the standard compression encoding process for moving image such as MPEG, a detecting unit 701 for detecting a cut point of the compressed moving image data 301 as information 702 of a cut point, an extracting unit 703 for arranging at least one information of feature quantity from the DCT coefficients of each frame, which is included in the information 303 extracted by the DCT operation unit 902 or the extracting unit 302, on the time axis and for extracting information 705 of the unique identification of compressed moving image to identify the compressed moving image from the arrangement of the information of the feature quantity on the time axis in each shot unit of the compressed moving image data 301 divided by using the information 502 of the cut point and/or the information 702 of the cut point, a storing unit 306 for storing the information 705 of the unique identification of the compressed moving image extracted by the extracting unit 703, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, an output unit 111 for displaying and or printing the retrieving result stored in the storing unit 110, and a judging unit 2602 for judging whether inputted digital moving image data 2601 is the moving image data 101 or the compressed moving image data 301 and for outputting the moving image data 101 to the DCT (Discrete Cosine Transform) operation unit 902 and the detecting unit 501, and the compressed moving image data 301 to the extracting unit 302 and the detecting unit 701.

Figure 41A:
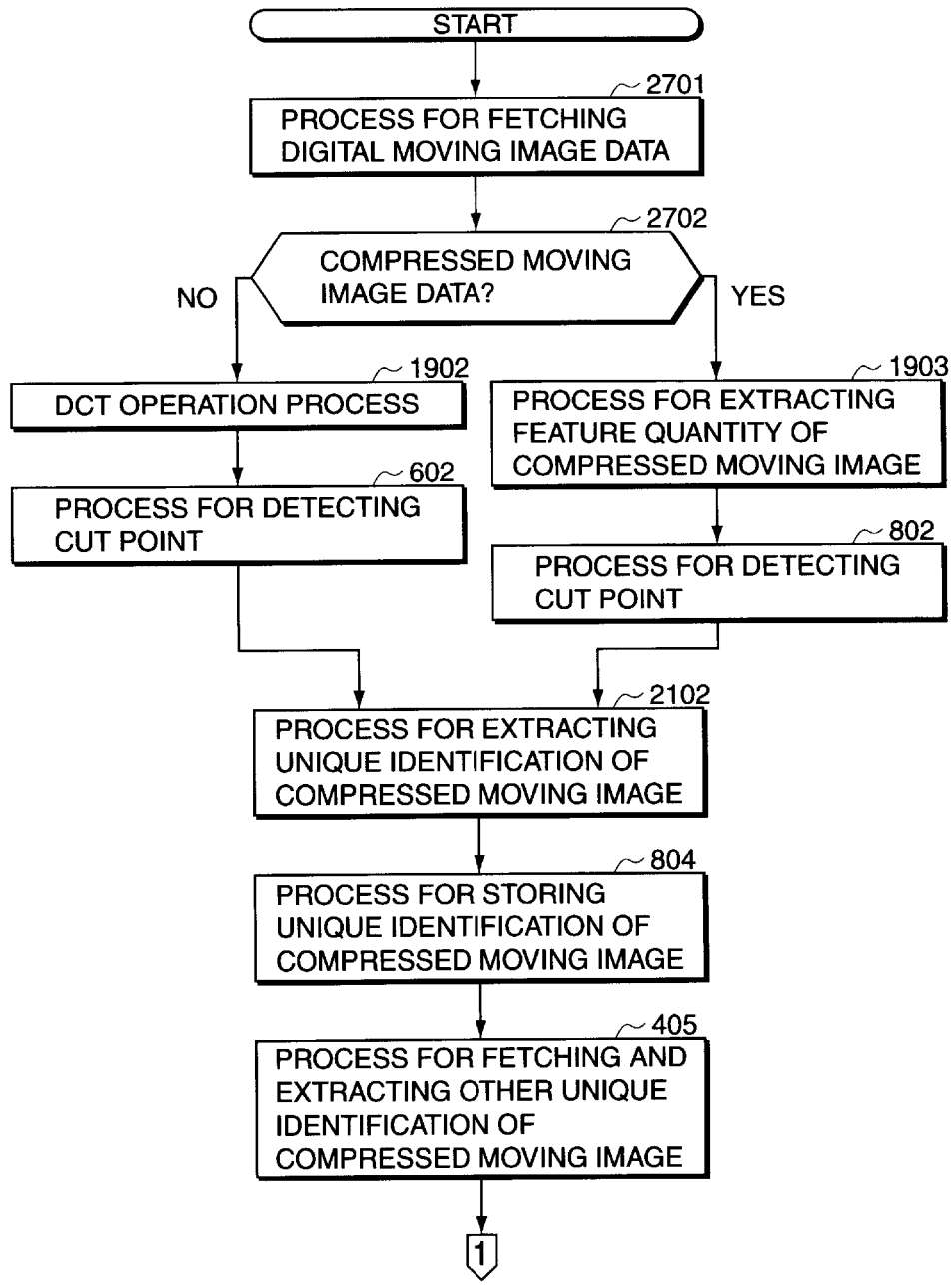
FIG. 41A is a flowchart of the process in the apparatus for retrieving moving image according to the present invention.
Figure 41B:
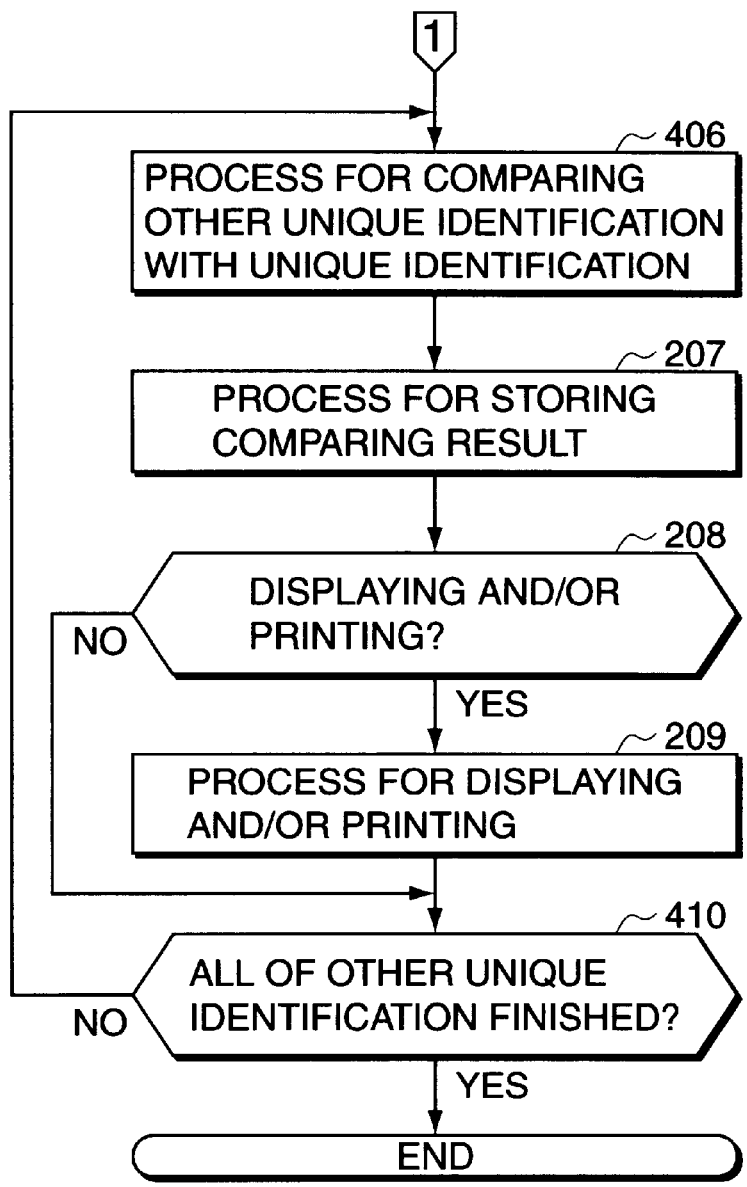
FIG. 41B is a flowchart of the process in the apparatus for retrieving moving image according to the present invention.

FIGS. 41A and 41B are flowcharts of the process in the apparatus for retrieving the moving image according to the present invention described in FIG. 40. Still, an identical step number is appended to the step having the identical process in FIGS. 41A and 41B with FIGS. 21A and 21B. In FIGS. 40, 41A and 41B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the DCT operation unit 902 and the detecting unit 501 for detecting the cut point. And, the following process (the steps 1902 to 410) is executed.

The DCT operation unit 902 divides each frame of the moving image data 101 into the M×N (M and N are natural numbers) pixels units, then calculates the DCT coefficient by executing the DCT operation in the M×N pixels unit as the information 303 of the feature quantity of the compressed moving image (in the step 1902). On the other hand, the detecting unit 501 for detecting the cut point detects the cut point of the moving image data 101 as the information 502 of the cut point (in the step 602).

On the other hand, in case the digital moving image data 2601 is the compressed moving image data 301, the compressed/uncompressed judging unit 2602 outputs the compressed moving image data 301 to the extracting unit 302 for extracting the information of the feature quantity of the compressed moving image and the detecting unit 701 for detecting the cut point. The following process (the steps 1903 to 410) is executed.

The extracting unit 302 extracts the information 303 of the feature quantity of the compressed moving image, which includes the DCT coefficients of each frame, from the compressed moving image data 301 (in the step 1903). And, the detecting unit 701 detects the cut point of the compressed moving image data 301 as the information 702 of the cut point (in the step 802).

Next, the extracting unit 703 for extracting the information of the unique identification of the compressed moving image calculates values of physical information of the feature quantity of the compressed moving image from the DCT coefficients of each frame, which is included in the information 303, mean value of the values, total value of the values and/or difference value of the values. And the extracting unit 703 arranges at least one value from the above mentioned values on the time axis and then picks out all values arranged on the time axis, or some values from the values arranged on the time axis at uniform intervals or irregular intervals. And then, the extracting unit 703 extracts the picked out values in each shot unit of the moving image data 101 divided by using the information 502 or in each shot unit of the compressed moving image data 301 divided by using the information 702 as the information 705 of the unique identification of the compressed moving image to be used for identifying the compressed moving image (in the step 2102).

The storing unit 306 for storing the information of the unique identification of the compressed moving image stores the information 705 of the unique identification of the compressed moving image extracted by the extracting unit 703 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804 (in FIGS. 21A and 21B).

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

As mentioned above, according to the twentieth embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the twenty-first preferred embodiment according to the invention will be explained in FIGS. 42, 43A and 43B.

Figure 42:
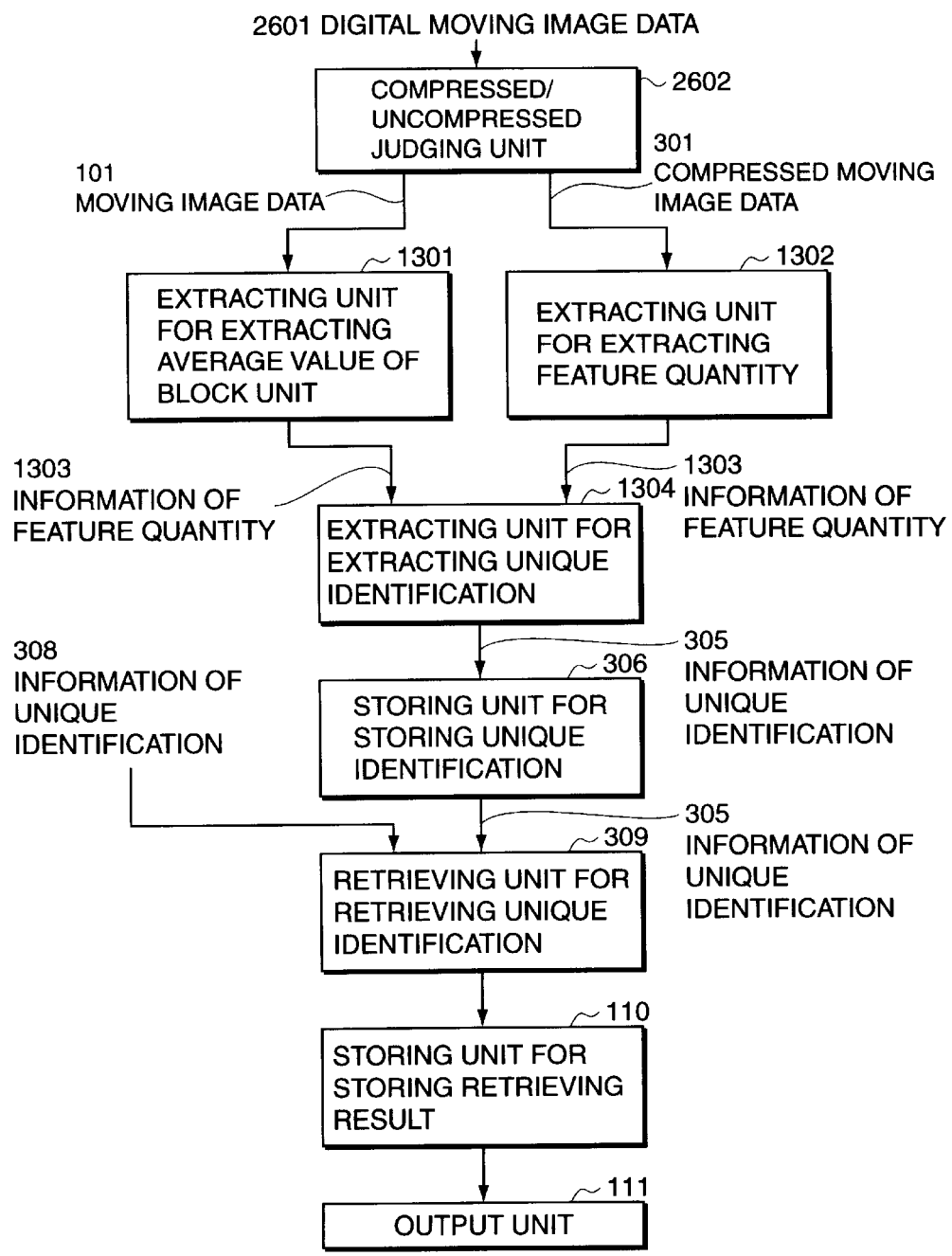
FIG. 42 is a block diagram showing the apparatus for retrieving moving image according to the present invention.

FIG. 42 is a block diagram showing an apparatus for retrieving moving image according to the present invention. Still, an identical code is appended to the thing having the identical composition in FIG. 42 with FIG. 22. In FIG. 42, the apparatus for retrieving moving image comprises an extracting unit 1301 for calculating an average pixel value, such as information of average color (R, G, B), and/or information of average luminance and average color difference (Y, Cb, Cr), in the M×N (M and N are natural numbers) pixels unit, an extracting unit 1302 for extracting information 1303 of the feature quantity of compressed moving image, which includes DC (Direct Current) components of DCT (Discrete Cosine Transform) coefficients of each frame, from compressed moving image data 301 provided by the standard compression encoding process for moving image such as MPEG, an extracting unit 1304 for arranging at least one information of feature quantity from the DC components of the DCT coefficients of each frame or the average pixel value, which is included in the information 1303 extracted by the extracting unit 1301 and/or the extracting unit 1302, on the time axis and for extracting information 305 of the unique identification of compressed moving image to identify compressed moving image from the arrangement of the information of the feature quantity on the time axis, a storing unit 306 for storing the information 305 of the unique identification of the compressed moving image extracted by the extracting unit 1304, a retrieving unit 309 for retrieving identical information with the information 305 of the unique identification of the compressed moving image stored in the storing unit 306 from information 308 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the extracting unit 1301 and the compressed moving image data 301 to the extracting unit 1302.

Figure 43A:
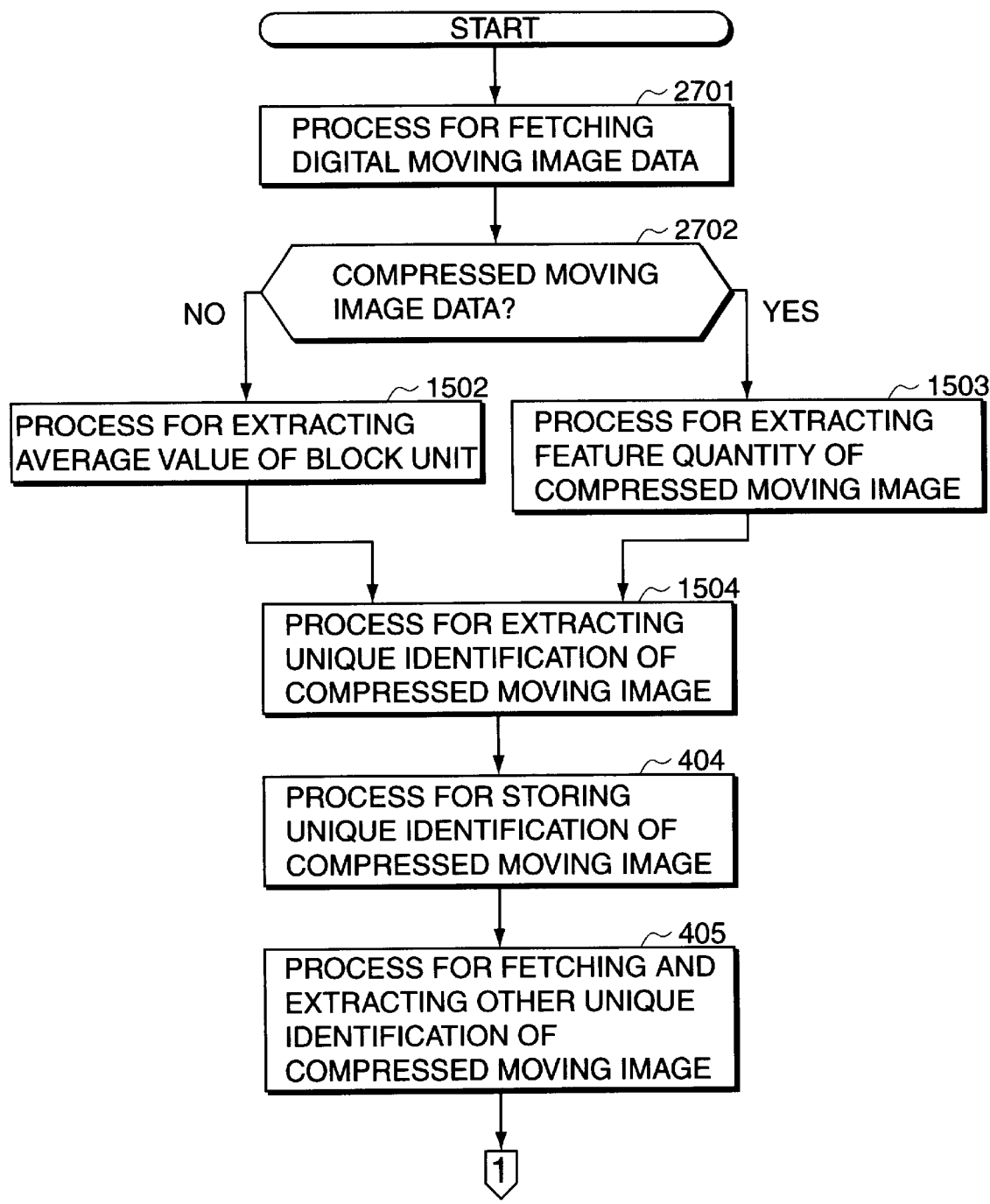
FIG. 43A is a flowchart of the process in the apparatus for retrieving moving image according to the present invention.
Figure 43B:
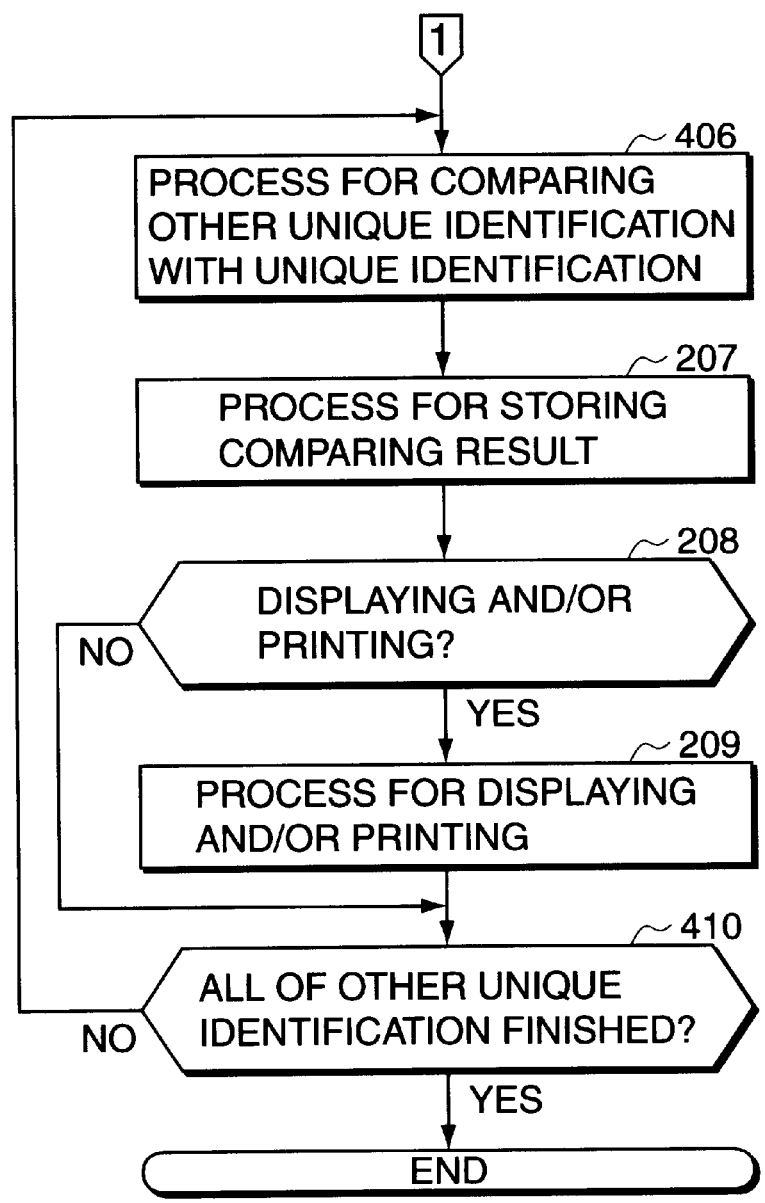
FIG. 43B is a flowchart of the process in the apparatus for retrieving moving image according to the present invention.

FIGS. 43A and 43B are flowcharts of the process in the apparatus for retrieving the moving image according to the present invention described in FIG. 42. Still, an identical step number is appended to the step having the identical process in FIGS. 43A and 43B with FIGS. 23A and 23B. In FIGS. 42, 43A and 43B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the extracting unit 1301 for extracting the average value of the block unit. The following process (the steps 1502 to 410) is executed.

The extracting unit 1301 divides each frame of the moving image data 101 into the M×N (M and N are natural numbers) pixels units, then calculates the average pixel value in the M×N pixels unit as the information 1303 of the feature quantity of the compressed moving image (in the step 1502).

On the other hand, in case the digital moving image data 2601 is the compressed moving image data 301, the compressed/uncompressed judging unit 2602 outputs the compressed moving image data 301 to the extracting unit 1302 for extracting the information of the feature quantity of the compressed moving image. The following process (the steps 1503 to 410) is executed.

The extracting unit 1302 extracts the information 1303 of the feature quantity of the compressed moving image, which includes the DC components of the DCT coefficients of each frame, from the compressed moving image data 301 (in the step 1503).

Next, the extracting unit 1304 for extracting the information of the unique identification of the compressed moving image calculates values of physical information of the feature quantity of compressed moving image from the DC components of the DCT coefficients of each frame and/or values of the average pixel value of each frame, which are included in the information 1303, mean value of the values, total value of the values and/or difference value of the values. And the extracting unit 1304 arranges at least one value from the above mentioned values on the time axis and then picks out all values arranged on the time axis, or some values from the values arranged on the time axis at uniform intervals or irregular intervals. And then, the extracting unit 1304 extracts the picked out values as the information 305 of the unique identification of the compressed moving image to be used for identifying the compressed moving image (in the step 1504).

The storing unit 306 for storing the information of the unique identification of the compressed moving image stores the information 305 of the unique identification of the compressed moving image extracted by the extracting unit 1304 (in the step 404).

On the other hand, the information 308 of the unique identification of the compressed moving image is extracted from other compressed moving image data (the object compressed moving image data for retrieving) (in the step 405). This extracting process can be executed by the processing equal to the foregoing steps 1001 to 404 (in FIGS. 23A and 23B).

Then, the retrieving unit 309 for retrieving the information of the unique identification of the compressed moving image compares the information 305 of the unique identification of the compressed moving image stored in the storing unit 306 with the information 308 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308 of the unique identification of the compressed moving image extracted from the other moving image data (in the step 410).

As mentioned above, according to the twenty-first embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the twenty-second preferred embodiment according to the invention will be explained in FIGS. 44, 45A and 45B.

Figure 44:
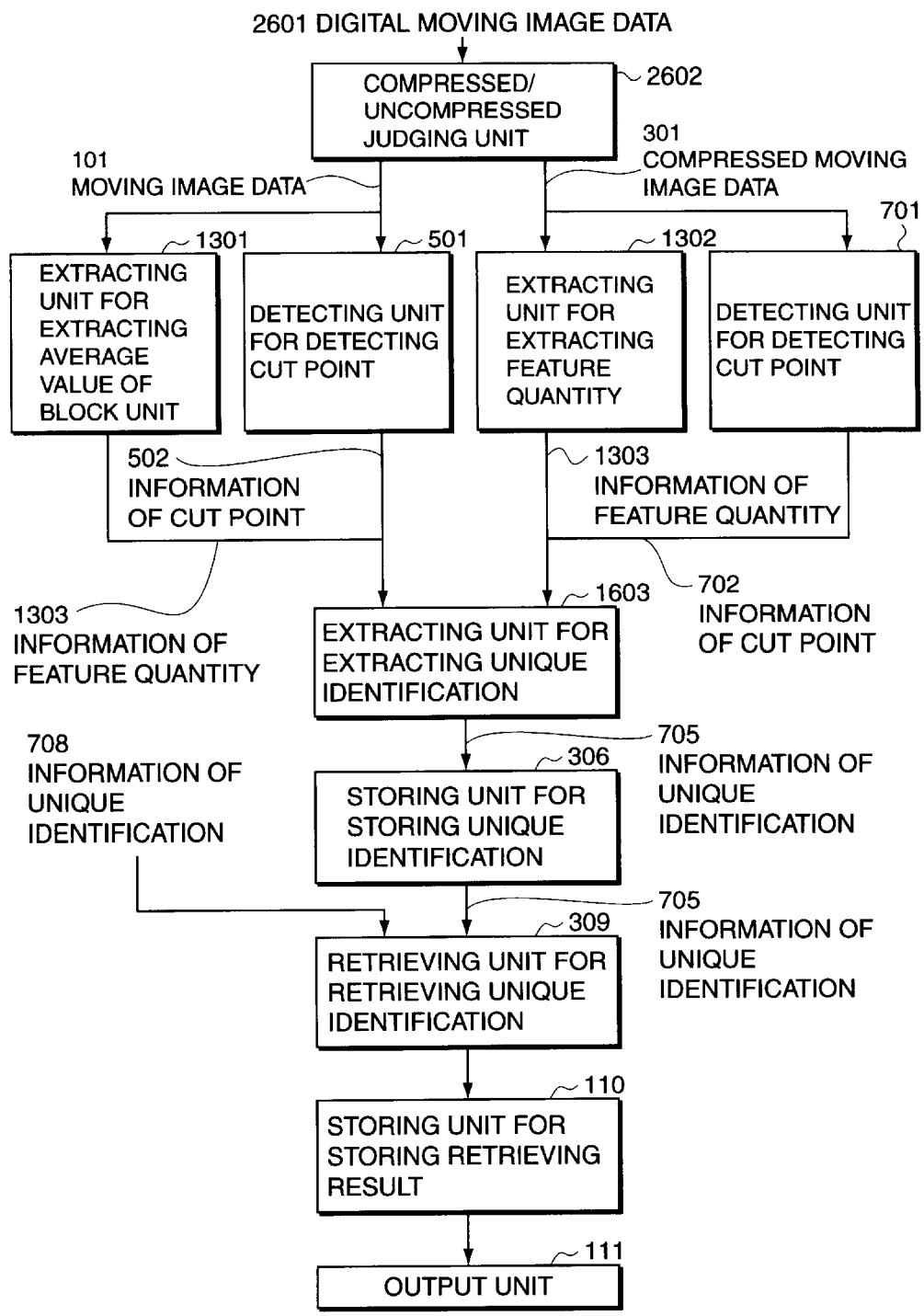
FIG. 44 is a block diagram showing the apparatus for retrieving moving image according to the present invention.

FIG. 44 is a block diagram showing an apparatus for retrieving moving image according to the present invention. Still, an identical code is appended to the thing having the identical composition in FIG. 44 with FIG. 24. In FIG. 44, the apparatus for retrieving moving image comprises an extracting unit 1301 for calculating an average pixel value such as information of average color (R, G, B) and/or information of average luminance and average color difference (Y, Cb, Cr) in the M×N (M and N are natural numbers) pixels unit of moving image data 101 as information 1303 of the feature quantity of compressed moving image, a detecting unit 501 for detecting a cut point of the moving image data 101 as information 502 of a cut point, an extracting unit 1302 for extracting information 1303 of the feature quantity of compressed moving image, which includes DC (Direct Current) components of DCT (Discrete Cosine Transform) coefficients of each frame, from compressed moving image data 301 provided by the standard compression encoding process for moving image such as MPEG, a detecting unit 701 for detecting a cut point of the compressed moving image data 301 as information 702 of a cut point, an extracting unit 1603 for arranging at least one information of feature quantity from the DC components of the DCT coefficients of each frame or the average pixel value, which is included in the information 1303 extracted by the extracting unit 1301 and/or the extracting unit 1302, on the time axis and for extracting information 705 of the unique identification of compressed moving image to identify the compressed moving image from the arrangement of the information of the feature quantity on the time axis in each shot unit of the moving image data 101 divided by using the information 502 of the cut point or in each shot unit of the compressed moving image data 301 divided by using the information 702 of the cut point, a storing unit 306 for storing the information 705 of the unique identification of the compressed moving image extracted by the extracting unit 1603, a retrieving unit 309 for retrieving identical information with the information 705 of the unique identification of the compressed moving image stored in the storing unit 306 from information 708 of the unique identification of compressed moving image beforehand extracted from other moving image data, a storing unit 110 for storing the retrieving result provided by the retrieving unit 309, an output unit 111 for displaying and/or printing the retrieving result stored in the storing unit 110, and a judging unit 2602 for judging whether inputted digital moving image data 2601 is the moving image data 101 or the compressed moving image data 301 and for outputting the moving image data 101 to the extracting unit and the detecting unit 501, and the compressed moving image data 301 to the extracting unit 1302 and the detecting unit 701.

Figure 45A:
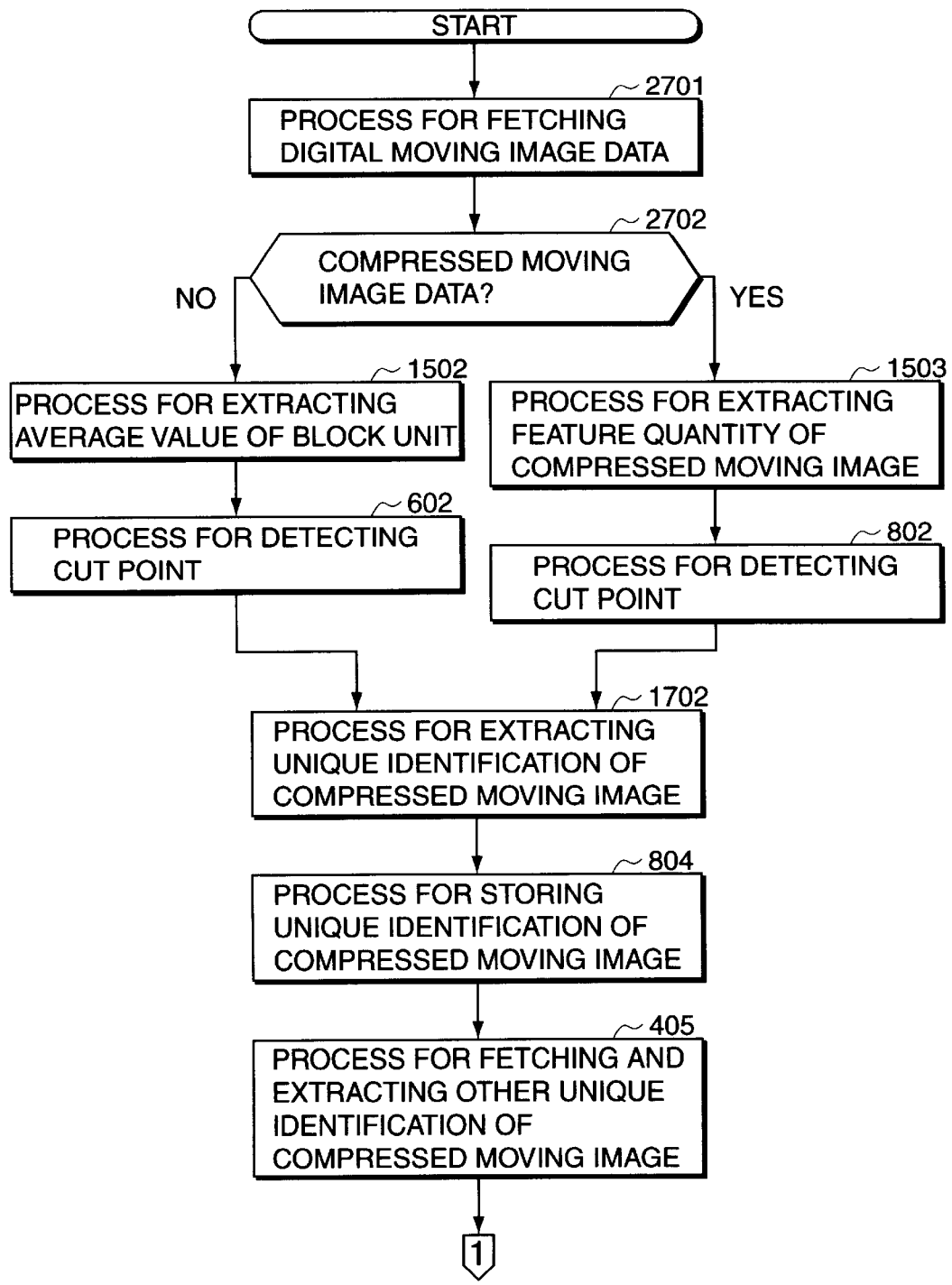
FIG. 45A is a flowchart of the process in the apparatus for retrieving moving image according to the present invention.
Figure 45B:
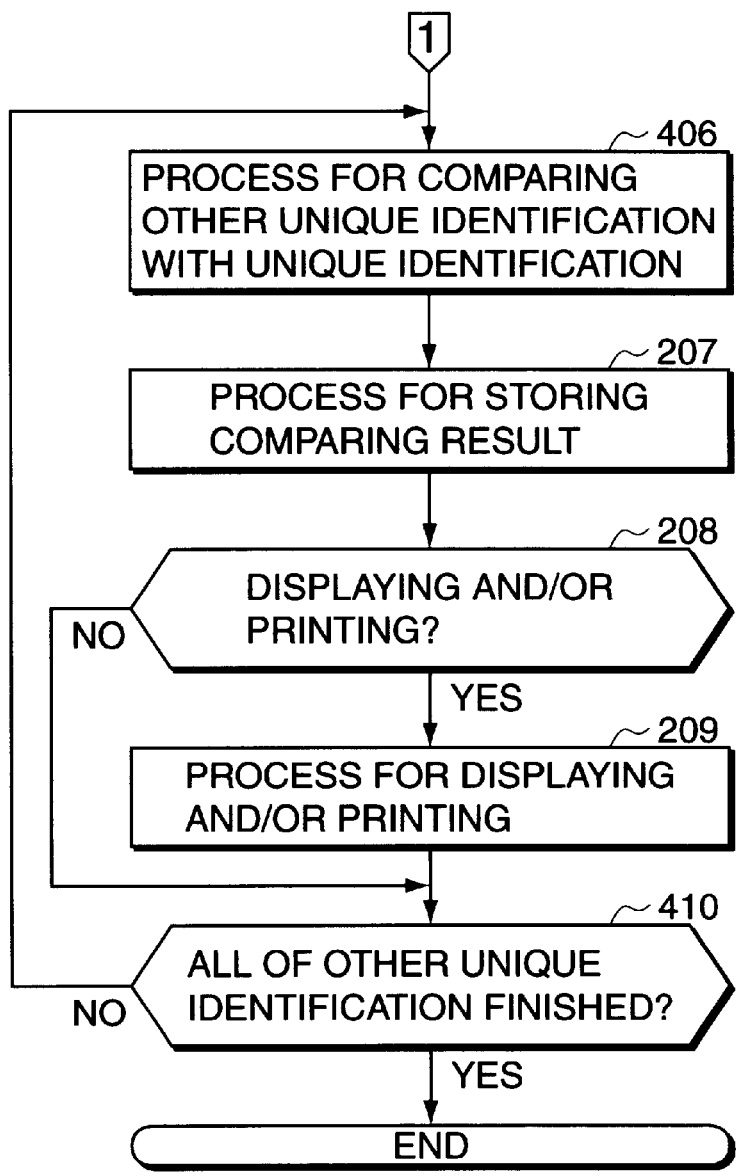
FIG. 45B is a flowchart of the process in the apparatus for retrieving moving image according to the present invention.

FIGS. 45A and 45B are flowcharts of the process in the apparatus for retrieving the moving image according to the present invention described in FIG. 44. Still, an identical step number is appended to the step having the identical process in FIGS. 45A and 45B with FIGS. 25A and 25B. In FIGS. 44, 45A and 45B, at first the compressed/uncompressed judging unit 2602 acquires the digital moving image data 2601 (in the step 2701). Then, the compressed/uncompressed judging unit 2602 judges whether the acquired digital moving image data 2601 is the uncompressed moving image data 101 or the compressed moving image data 301 (in the step 2702).

In case the digital moving image data 2601 is the uncompressed moving image data 101, the compressed/uncompressed judging unit 2602 outputs the moving image data 101 to the extracting unit 1301 for extracting the average value of the block unit and the detecting unit 501 for detecting the cut point. And, the following process (the steps 1502 to 410) is executed.

The extracting unit 1301 divides each frame of the moving image data 101 into the M×N (M and N are natural numbers) pixels units, then calculates the average pixel value in the M×N pixels unit (in the step 1502). And, the detecting unit 501 detects the cut point of the moving image data 101 as the information 502 of the cut point (in the step 602).

On the other hand, in case the digital moving image data 2601 is the compressed moving image data 301, the compressed/uncompressed judging unit 2602 outputs the compressed moving image data 301 to the extracting unit 1302 for extracting the information of the feature quantity of the compressed moving image and the detecting unit 701 for detecting the cut point. And, the following process (the steps 1503 to 410) is executed.

The extracting unit 1302 extracts the information 1303 of the feature quantity of the compressed moving image, which includes the DC components of the DCT coefficients of each frame, from the compressed moving image data 301 (in the step 1503). And, the detecting unit 701 detects the cut point of the compressed moving image data 301 as the information 702 of the cut point (in the step 802).

Next, the extracting unit 1603 for extracting the information of the unique identification of the compressed moving image calculates values of physical information of the feature quantity of compressed moving image from the DC components of the DCT coefficients of each frame and/or the average pixel value of each frame, which are included in the information 1303, mean value of the values, total value of the values and/or difference value of the values. And the extracting unit 1603 arranges at least one value from the above mentioned values on the time axis and then picks out all values arranged on the time axis, or some values from the values arranged on the time axis at uniform intervals or irregular intervals. And then, the extracting unit 1603 extracts the picked out values in each shot unit of the moving image data 101 divided by using the information 502 of the cut point or in each shot unit of the compressed moving image data 301 divided by using the information 702 of the cut point as the information 705 of the unique identification of the compressed moving image to be used for identifying the compressed moving image (in the step 1702).

The storing unit 306 for storing the information of the unique identification of the compressed moving image stores the information 705 of the unique identification of the compressed moving image extracted by the extracting unit 1603 (in the step 804).

On the other hand, the information 708 of the unique identification of the compressed moving image is extracted from other compressed moving image data (the object compressed moving image data for retrieving) (in the step 405). This extracting process can be executed by the processing equal to the foregoing steps 1001 to 804 (in FIGS. 25A and 25B).

Then, the retrieving unit 309 for retrieving the information of the unique identification of the compressed moving image compares the information 705 of the unique identification of the compressed moving image stored in the storing unit 306 with the information 708 of the unique identification of the compressed moving image extracted from the other moving image data (in the step 406).

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 708 of the unique identification of the compressed moving image extracted from the other moving image data (in the step 410).

As mentioned above, according to the twenty-second embodiment of the invention, whether the inputted digital moving image data 2601 is the uncompressed moving image data 101 or the compressed moving image data 301 can be judged automatically. Consequently, identical moving image can be retrieved and identified from the moving image at the higher speed regardless of the type (compressed/uncompressed) of retrieving image data.

An apparatus and a method for retrieving moving image in the twenty-third preferred embodiment according to the invention will be explained in FIGS. 46, 47A and 47B.

Figure 46:
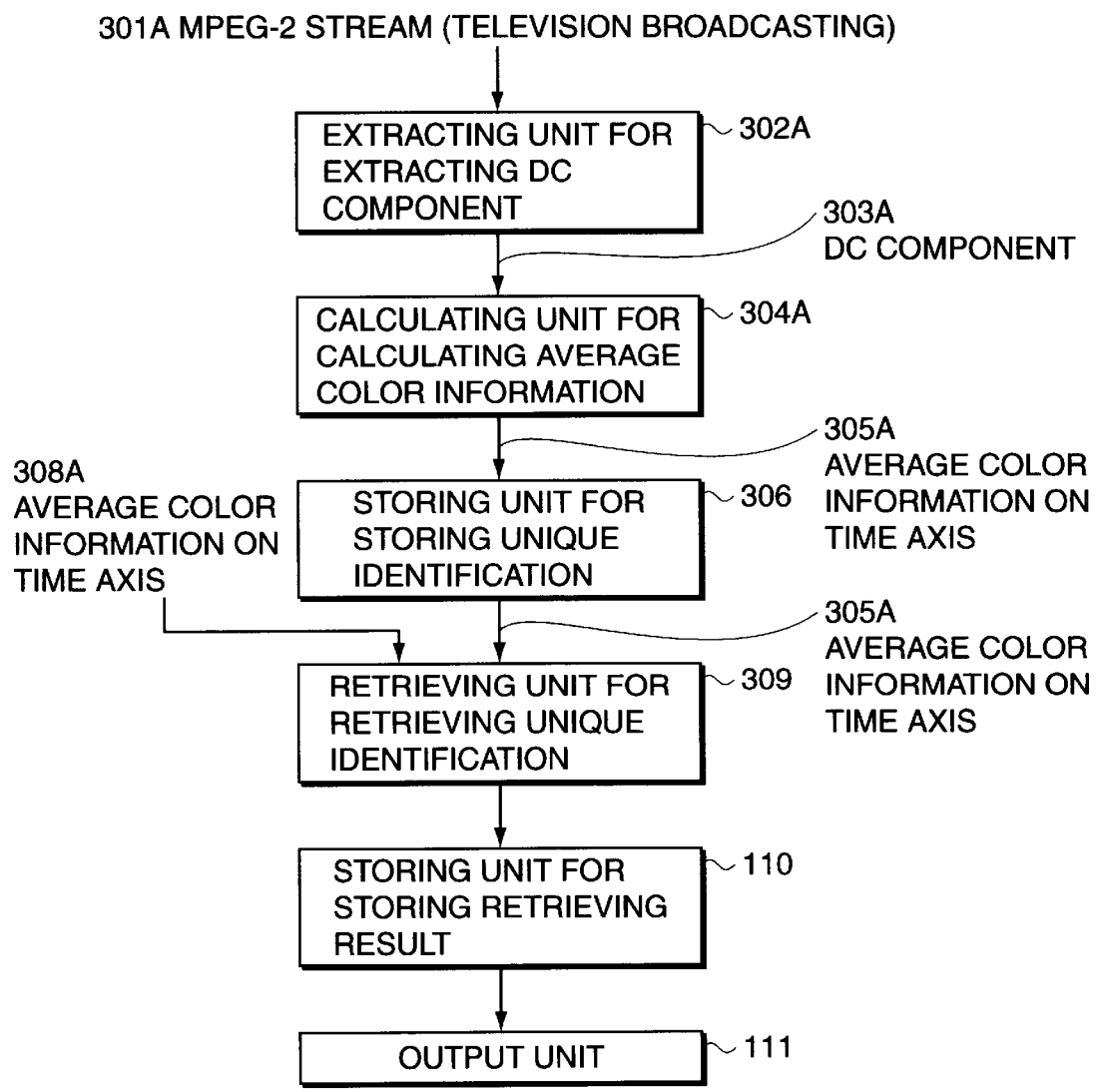
FIG. 46 is a block diagram showing the apparatus for monitoring television commercials according to the present invention.

FIG. 46 is a block diagram showing an apparatus for monitoring television commercials, which is a specific example of the second embodiment according to the present invention. Still, an identical code is appended to the thing having the identical composition in FIG. 46 with FIG. 3.

In FIG. 46, the apparatus for monitoring television commercials comprises an extracting unit 302A for extracting information (a DC component) 303A of the feature quantity of compressed moving image, which includes the only DC (Direct Current) components of DCT (Discrete Cosine Transform) coefficients of each frame, from MPEG-2 stream (television broadcasting) 301A compressed by MPEG-2 process, an extracting unit (a calculating unit for calculating average color information) 304A for arranging an average value of the DC components of each frame, which is included in the information 303A extracted by the extracting unit 302A, on the time axis and for extracting the arrangement of the average values on the time axis as information (time series information of average color information) 305A of the unique identification of compressed moving image to identify the compressed moving image, a storing unit 306 for storing the information 305A of the unique identification of the compressed moving image extracted by the extracting unit 304A, a retrieving unit 309 for retrieving identical information with the information 305A of the unique identification of the compressed moving image stored in the storing unit 306 from information (time series information of average color information of a television commercial) 308A of the unique identification of compressed moving image beforehand extracted from other moving image data, a storing unit 110 for storing the retrieving result provided by the retrieving unit 309, and an output unit 111 for displaying and/or printing the retrieving result stored in the storing unit 110.

The MPEG-2 stream (the television broadcasting) 301A is provided by encoding the moving image of the current television broadcasting.

On the apparatus for monitoring television commercials according to the present invention constituted like the above, an operation will be explained in the following.

Figure 47A:
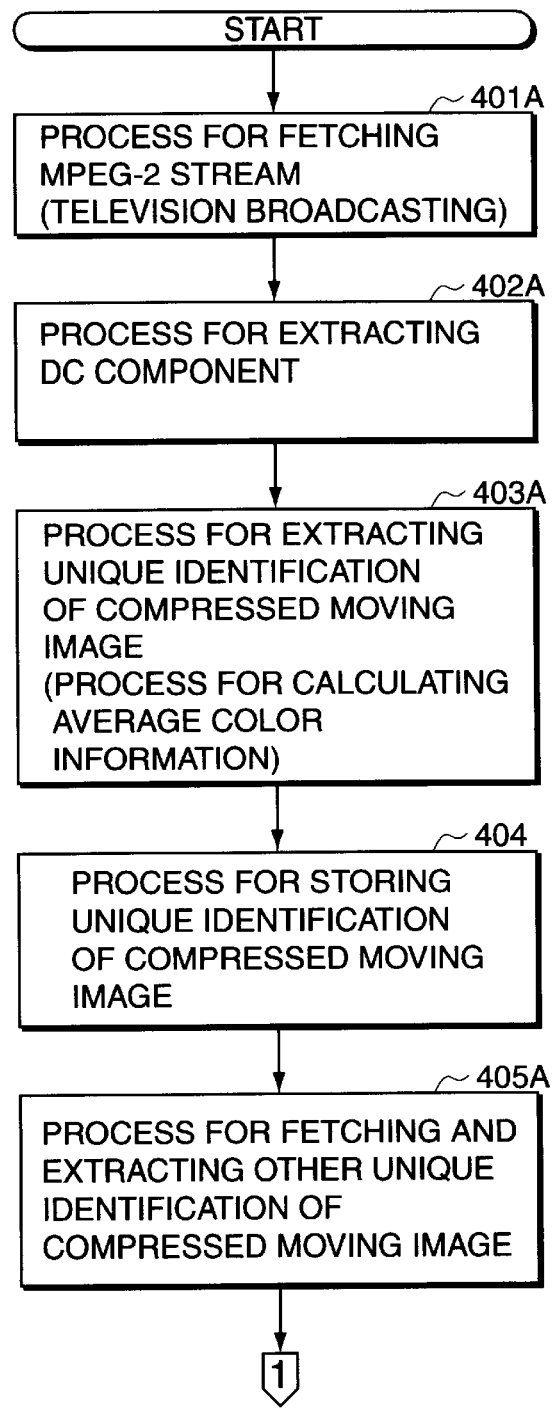
FIG. 47A is a flowchart of the process in the apparatus for monitoring television commercials according to the present invention.
Figure 47B:
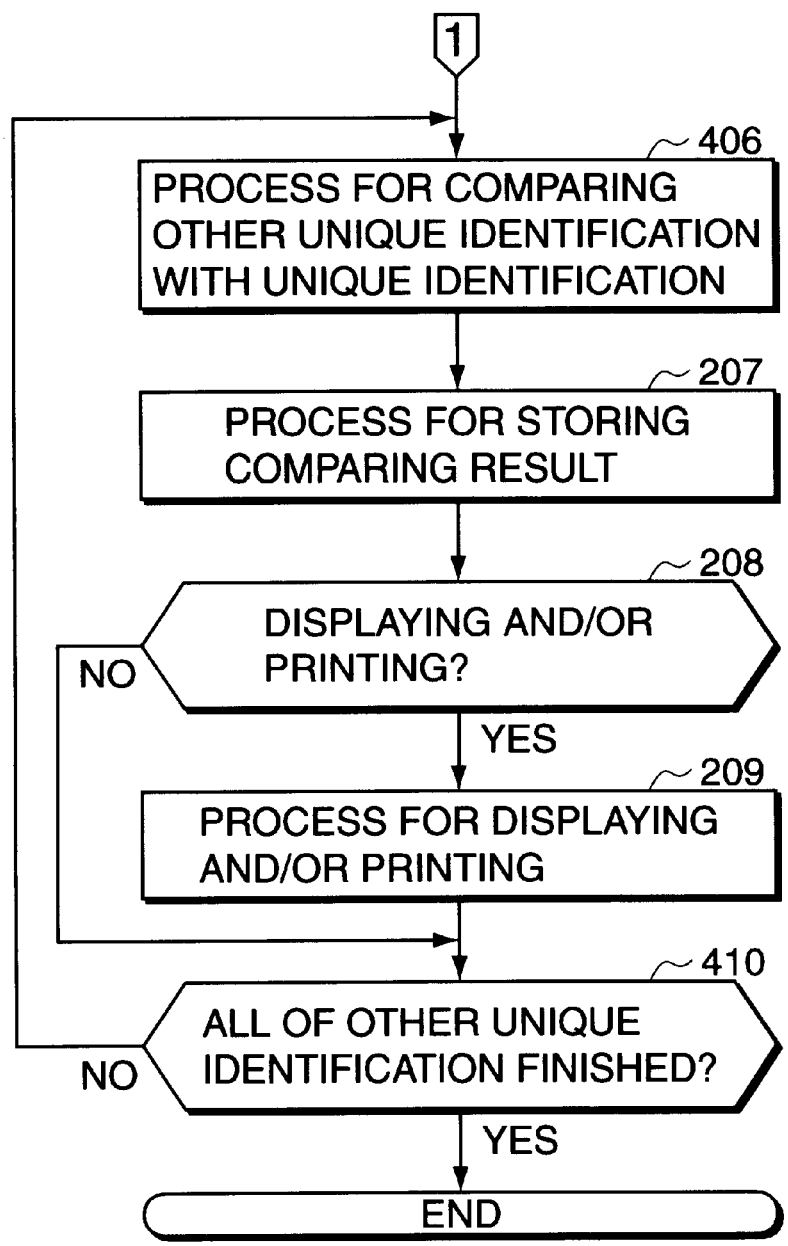
FIG. 47B is a flowchart of the process in the apparatus for retrieving moving image according to the present invention.

FIGS. 47A and 47B are flowcharts of the process in the apparatus for monitoring television commercials to the present invention described in FIG. 46. Still, an identical step number is appended to the step having the identical process in FIGS. 47A and 47B with FIGS. 4A and 4B. In FIGS. 46, 47A and 47B, at first the extracting unit 302A for extracting the DC component fetches the MPEG-2 stream (the television broadcasting) 301A to be a retrieval key for identifying the compressed moving image (in the step 401A). Then, the extracting unit 302A extracts the information (the DC component) 303A of the feature quantity of the compressed moving image, which includes the only DC components of the DCT coefficients of each frame, from the MPEG-2 stream 301A (in the step 402A).

Next, the extracting unit (the calculating unit for calculating the average color information) 304A for extracting the information of the unique identification of the compressed moving image calculates an average value by using the DC components of each frame, which is included in the information 303A. Then, the extracting unit 304A arranges the average values on the time axis and extracts the arrangement of the average values on the time axis as the information (the time series information of the average color information) 305A of the unique identification of the compressed moving image to be used for identifying the compressed moving image (in the step 403A).

The storing unit 306 for storing the information of the unique identification of the compressed moving image stores the information 305A extracted by the extracting unit 304A (in the step 404).

In the twenty-third embodiment, the information (the time series information of the average color information) 305A of the unique identification of the compressed moving image consists of three kinds of time series information, which are information of luminance and color difference (Y, Cb, Cr). By making a graph of each time series information, which it makes the horizontal line to be time and makes the vertical line to be a value of the average color information, the information 305A is shown by three graphs.

On the other hand, the information (the time series information of the average color information of the television commercial) 308A of the unique identification of the compressed moving image is extracted from the MPEG-2 stream of the television commercial (the object compressed moving image data for retrieving) (in the step 405). This extracting process can be executed by the processing equal to the foregoing steps 401A to 404.

The MPEG-2 stream of the television commercial is provided by encoding the current television broadcasting equal to the above mentioned MPEG-2 stream 301A.

Then, the retrieving unit 309 for retrieving the information of the unique identification of the compressed moving image compares the information 305A of the unique identification of the compressed moving image stored in the storing unit 306 with the information 308A of the unique identification of the compressed moving image extracted from the other moving image data (in the step 406).

The apparatus for retrieving the moving image of the twenty-third embodiment is considered that is realized using the simple facility as PC (Personal Computer). Consequently, in the present television broadcasting, ghost phenomenon, in which image is multiply reflected by reflection and multipath of the television radio wave, and color slippage and the like state arise. A little effect is also generated in the information 305A extracted using the television broadcasting.

As mentioned above, the information 305A is shown by 3 graphs, and effect is also generated in the graph. However, since there is sufficient information of unique identification of moving image to be used for identifying the moving image in the graph, it is possible to be difficult to receive the effect by expanding and reducing the graph.

This comparing result is stored in the storing unit 110 for storing the retrieving result (in the step 207). In the case of displaying and/or printing the comparing result (in the step 208), it is outputted by the output unit 111 for displaying and/or printing the retrieving result (in the step 209).

The process of the above mentioned steps 406 to 209 is executed for all of the information 308A of the unique identification of the compressed moving image extracted from the other moving image data (in the step 410).

The apparatus and the method for retrieving the moving image according to the invention are explained the above.

The experimental system shown in FIG. 46 was mounted, and the experiment testing the effectiveness of this invention was executed. In the following, the result of the experiment is shown.

In the experiment for retrieving the television commercials that are 152 in number and 37 in type from the television broadcasting of 26 hours 15 minutes which is ground wave television broadcasting, the number of omission was 0 and the number of over-detection was 0.

In the above mentioned methods and apparatuses for retrieving the moving image, which are referred from in the first embodiment to in the twenty-third embodiment, a process for dividing an image into a plurality of frames is executed. It is also possible to execute a process for dividing each of the frames into "n" ("n" is a natural number 2 or over) regions in addition to the above mentioned process. In this case, the information of the unique identification of the moving image and/or the information of the unique identification of the compressed moving image for identifying the moving image are extracted respectively from the divided regions, and then, the extracted information is applied to the information 105 of the unique identification of the moving image and/or the information 305 and 305A of the unique identification of the compressed moving image. And, a retrieving unit 109 for retrieving the information of the unique identification of the moving image and/or a retrieving unit 309 for retrieving the information of the unique identification of the compressed moving image retrieve the identical information with the information 105 and/or the information 305 and 305A from the information 108 of the unique identification of the moving image and/or the information 308 and 308A of the unique identification of the compressed moving image beforehand extracted. In this retrieving process, the identical information with the information 105 and/or the information 305 and 305A may be extracted with corresponding in all regions of the information 105 and/or the information 305 and 305A. Like the above, by retrieving a frame with a plurality of information values, the precision of the retrieving process may be further improved.

And more, by dividing each of the frames into "n" regions and extracting the information 105 and/or the information 305 and 305A from each of the regions, it is possible to shorten time series information included in the information 105 and/or the information 305 and 305A.

Moreover, when the information 105 and/or the information 305 and 305A are extracted from "n" regions of each of the frames and a process of extracting moving image is executed by using the information 105 and/or the information 305 and 305A of limited regions over "n-m" (1≦m≦(n-1)), it is possible to retrieve similar moving image with the difference in a part of regions. That is to say, the retrieving process may be executed with corresponding in the part of the regions selected as objects for retrieving, consequently, it is possible to retrieve similar moving image.

Until now, the methods and the apparatuses for retrieving the moving image, which are referred from in the first embodiment to in the twenty-third embodiment, are explained. A program for executing processes of the above mentioned methods for retrieving the moving image may be executed by a computer system.

Still, in the above mentioned embodiments according to the invention, although either the uncompressed moving image data or the compressed moving image data was applied as the object moving image data for retrieving, both the uncompressed moving image data and the compressed moving image data may be applied as the object moving image data for retrieving.

And, in the above mentioned embodiments according to the invention, the information 105 or 305 was extracted by using over one information from each of the frames. However, the information 105 or 305 will be extracted by using over two information from each of the frames, consequently, the precision of the retrieving process may be improved.

In addition, when the information 105 or 305 is extracted by using over two information from each frame, the retrieving unit 109 or 309 may retrieve similar moving image according to comparing the information 105 or 305 by using a part of the information values from each of the frames.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus for retrieving moving image to retrieve pre-determined moving image from object moving image, comprising:

first extracting means for extracting the information of the feature quantity of each frame from said pre-determined moving image;

second extracting means for extracting the information of the unique identification created by arranging one or more physical quantity of said information of the feature quantity, extracted by said first extracting means, on a time axis;

retrieving means for retrieving a position of said pre-determined moving image on said time axis from said object moving image by comparing the arrangement of said information of the unique identification, extracted by said second extracting means, with that of the information of the unique identification prepared in accordance with said object moving image;

detecting means for detecting cut points of the moving image from said pre-determined moving image and dividing said pre-determined moving image into a plurality of shots at each of the cut points; and judging means for judging whether said pre-determined moving image is compressed or uncompressed moving image data;

wherein said first extracting means includes;

first uncompression extracting means for extracting the information of the feature quantity of each frame from the uncompressed moving image data; and first compression extracting means for extracting the DCT (Discrete Cosine Transform) coefficients of each frame as the information of the feature quantity from the compressed moving image data;

said detecting means includes;

uncompression detecting means for detecting cut points of the moving image from the uncompressed moving image data and dividing said predetermined moving image into a plurality of shots at each of the cut points; and compression detecting means for detecting cut points of the moving image from the compressed moving image data and dividing said pre-determined moving image into a plurality of shots at each of the cut points; and said second extracting means includes;

second uncompression extracting means for extracting the information of the unique identification to identify the moving image at each of the shots, divided by said uncompression detecting means, in accordance with said information of the feature quantity of moving image, extracted by said first uncompression extracting means; and second compression extracting means for arranging at least one information of the feature quantity, extracted by said first compression extracting means, on the time axis at each of the shots, divided by said compression detecting means, and extracting the information of the unique identification to identify the moving image from the information of the feature quantity arranged on said time axis.

2. An apparatus for retrieving moving image to retrieve pre-determined moving image from object moving image, comprising:

first extracting means for extracting the information of the feature quantity of each frame from said pre-determined moving image;

second extracting means for extracting the information of the unique identification created by arranging one or more physical quantity of said information of the feature quantity, extracted by said first extracting means, on a time axis;

retrieving means for retrieving a position of said pre-determined moving image on said time axis from said object moving image by comparing the arrangement of said information of the unique identification, extracted by said second extracting means, with that of the information of the unique identification prepared in accordance with said object moving image; and judging means for judging whether said pre-determined moving image is compressed or uncompressed moving image data;

wherein said first extracting means includes;

first uncompression extracting means for extracting the information of the feature quantity of each frame from the uncompressed moving image data; and first compression extracting means for extracting the DCT (Discrete Cosine Transform) coefficients of each frame as the information of the feature quantity from the compressed moving image data; and said second extracting means includes;

second uncompression extracting means for arranging at least one information of the feature quantity, extracted by said first uncompression extracting means, on the time axis, and extracting the information of the unique identification to identify the moving image from the information of the feature quantity arranged on said time axis; and second compression extracting means for arranging at least one information of the feature quantity, extracted by said first compression extracting means, on the time axis, and extracting the information of the unique identification to identify the moving image from the information of the feature quantity arranged on said time axis.

3. The apparatus for retrieving the moving image of claim 2, wherein:

said first compression extracting means extracts the DCT (Discrete Cosine Transform) coefficients and the information of motion compensation of each frame, as the information of the feature quantity, from the compressed moving image data.

4. The apparatus for retrieving the moving image of claim 2, wherein:

said pre-determined moving image is uncompressed moving image data;

said first uncompression extracting means extracts the DCT (Discrete Cosine Transform) coefficients of each frame as the information of the feature quantity from said uncompressed moving image data; and said second uncompression extracting means arranges at least one information of the feature quantity, extracted by said first uncompression extracting means, on the time axis, and extracts the information of the unique identification to identify the moving image from the information of the feature quantity arranged on said time axis.

5. The apparatus for retrieving the moving image of claim 2, wherein:

said pre-determined moving image is uncompressed moving image data;

said first uncompression extracting means extracts the DCT (Discrete Cosine Transform) coefficients and the information of motion compensation of each frame, as the information of the feature quantity, from said uncompressed moving image data; and said second uncompression extracting means arranges at least one information of the feature quantity, extracted by said first uncompression extracting means, on the time axis, and extracts the information of the unique identification to identify the moving image from the information of the feature quantity arranged on said time axis.

6. The apparatus for retrieving the moving image of claim 2, wherein:

said pre-determined moving image is uncompressed moving image data;

said first uncompression extracting means obtains the information of motion compensation as a block unit of M×N pixels (M and N are natural numbers) from said uncompressed moving image data, and the information of pixel value, such as the information of average color (R, G, B) or the information of average luminance and color difference (y, Cb, Cr), as a block unit of M'×N' pixels (M' and N' are natural numbers) from said uncompressed moving image data, and extracts these information as the information of feature quantity; and said second uncompression extracting means arranges at least one information of the feature quantity, extracted by said first uncompression extracting means, on the time axis, and extracts the information of the unique identification to identify the moving image from the information of the feature quantity arranged on said time axis.

7. The apparatus for retrieving the moving images of claim 2, wherein:

said pre-determined moving image is uncompressed moving image data;

said first uncompression extracting means extracts the DCT (Discrete Cosine Transform) coefficients as the information of the feature quantity by executing a DCT operation at a block unit of M×N pixels (M and N are natural numbers) from said uncompressed moving image data; and said second uncompression extracting means arranges at least one information of the feature quantity, extracted by said first uncompression extracting means, on the time axis, and extracts the information of the unique identification to identify the moving image from the information of the feature quantity arranged on said time axis.

8. The apparatus for retrieving the moving image of claim 2, wherein:

said pre-determined moving image is uncompressed moving image data;

said first uncompression extracting means extracts the information of pixel value, such as the information of average color (R, G, B) or the information of average luminance and color difference (Y, Cb, Cr), as a block unit of M×N pixels (M and N are natural numbers) from said uncompressed moving image data, as the information of feature quantity; and said second uncompression extracting means arranges at least one information of the feature quantity, extracted by said first uncompression extracting means, on the time axis, and extracts the information of the unique identification to identify the moving image from the information of the feature quantity arranged on said time axis.

9. A method for retrieving moving image to retrieve pre-determined moving image from object moving image, comprising:

(A0) judging whether said pre-determined moving image is compressed or uncompressed moving image data;

(A) extracting the information of the feature quantity of each frame from said pre-determined moving image;

(A1) detecting cut points of the moving image from said pre-determined moving image and dividing said pre-determined moving image into a plurality of shots at each of the cut points;

(B) extracting the information of the unique identification created by arranging one or more physical quantity of said information of the feature quantity, extracted by said step (A), on a time axis; and (C) retrieving a position of said pre-determined moving image on said time axis from said object moving image by comparing the arrangement of said information of the unique identification, extracted by said step (B), with that of the information of the unique identification prepared in accordance with said object moving image, wherein said step (A) includes the steps of;

(A-1) extracting the information of the feature quantity of each frame from the uncompressed moving image data; and (A-2) extracting the DCT (Discrete Cosine Transform) coefficients of each frame as the information of the feature quantity from the compressed moving image data;

said step (A1) includes the steps of;

(A1-1) detecting cut points of the moving image from the uncompressed moving image data and dividing said pre-determined moving image into a plurality of shots at each of the cut points; and (A1-2) detecting cut points of the moving image from the compressed moving image data and dividing said pre-determined moving image into a plurality of shots at each of the cut points; and said step (B) includes the steps of;

(B-1) extracting the information of the unique identification to identify the moving image at each of the shots, divided by said step (A1-1), in accordance with said information of the feature quantity of moving image, extracted by said step (A-1); and (B-2) arranging at least one information of the feature quantity, extracted by said step (A-2), on the time axis at each of the shots, divided by said step (A1-2), and extracting the information of the unique identification to identify the moving image from the information of the feature quantity arranged on said time axis.

10. A method for retrieving moving image to retrieve pre-determined moving image from object moving image, comprising the steps of:

(A0) judging whether said pre-determined moving image is compressed or uncompressed moving image data;

(A) extracting the information of the feature quantity of each frame from said pre-determined moving image;

(B) extracting the information of the unique identification created by arranging one or more physical quantity of said information of the feature quantity, extracted by said step (A), on a time axis; and (C) retrieving a position of said pre-determined moving image on said time axis from said object moving image by comparing the arrangement of said information of the unique identification, extracted by said step (B), with that of the information of the unique identification prepared in accordance with said object moving image, wherein said step (A) includes the steps of;

(A-1) extracting the information of the feature quantity of each frame from the uncompressed moving image data; and (A-2) extracting the DCT (Discrete Cosine Transform) coefficients of each frame as the information of the feature quantity from the compressed moving image data; and said step (B) includes the steps of;

(B-1) arranging at least one information of the feature quantity, extracted by said step (A-1), on the time axis, and extracting the information of the unique identification to identify the moving image from the information of the feature quantity arranged on said time axis; and (B-2) arranging at least one information of the feature quantity, extracted by said step (A-2), on the time axis, and extracting the information of the unique identification to identify the moving image from the information of the feature quantity arranged on said time axis.

11. Program products for retrieving moving image to retrieve pre-determined moving image from object moving image, which is executed by computer system, comprising the steps of:

(A0) judging whether said pre-determined moving image is compressed or uncompressed moving image data;

(A) extracting the information of the feature quantity of each frame from said pre-determined moving image;

(A1) detecting cut points of the moving image from said pre-determined moving image and dividing said pre-determined moving image into a plurality of shots at each of the cut points;

(B) extracting the information of the unique identification created by arranging one or more physical quantity of said information of the feature quantity, extracted by said step (A), on a time axis; and (C) retrieving a position of said pre-determined moving image on said time axis from said object moving image by comparing the arrangement of said information of the unique identification, extracted by said step (B), with that of the information of the unique identification prepared in accordance with said object moving image, wherein said step (A) includes the steps of;

(A-1) extracting the information of the feature quantity of each frame from the uncompressed moving image data; and (A-2) extracting the DCT (Discrete Cosine Transform) coefficients of each frame as the information of the feature quantity from the compressed moving image data;

said step (A1) includes the steps of;

(A1-1) detecting cut points of the moving image from the uncompressed moving image data and dividing said pre-determined moving image into a plurality of shots at each of the cut points; and (A1-2) detecting cut points of the moving image from the compressed moving image data and dividing said pre-determined moving image into a plurality of shots at each of the cut points; and said step (B) includes the steps of;

(B-1) extracting the information of the unique identification to identify the moving image at each of the shots, divided by said step (A1-1), in accordance with said information of the feature quantity of moving image, extracted by said step (A-1); and (B-2) arranging at least one information of the feature quantity, extracted by said step (A-2), on the time axis at each of the shots, divided by said step (A1-2), and extracting the information of the unique identification to identify the moving image from the information of the feature quantity arranged on said time axis.

12. Program products for retrieving moving image to retrieve pre-determined moving image from object moving image, which is executed by computer system, comprising the steps of:

(A0) judging whether said pre-determined moving image is compressed or uncompressed moving image data;

(A) extracting the information of the feature quantity of each frame from said pre-determined moving image;

(B) extracting the information of the unique identification created by arranging one or more physical quantity of said information of the feature quantity, extracted by said step (A), on a time axis; and (C) retrieving a position of said pre-determined moving image on said time axis from said object moving image by comparing the arrangement of said information of the unique identification, extracted by said step (B), with that of the information of the unique identification prepared in accordance with said object moving image, wherein said step (A) includes the steps of;

(A-1) extracting the information of the feature quantity of each frame from the uncompressed moving image data; and (A-2) extracting the DCT (Discrete Cosine Transform) coefficients of each frame as the information of the feature quantity from the compressed moving image data; and said step (B) includes the steps of;

(B-1) arranging at least one information of the feature quantity, extracted by said step (A-1), on the time axis, and extracting the information of the unique identification to identify the moving image from the information of the feature quantity arranged on said time axis; and (B-2) arranging at least one information of the feature quantity, extracted by said step (A-2), on the time axis, and extracting the information of the unique identification to identify the moving image from the information of the feature quantity arranged on said time axis.

* * * * *